US012651010B1

(12) United States Patent
Galvin

(10) Patent No.: US 12,651,010 B1
(45) Date of Patent: Jun. 9, 2026

(54) HOLONOMY-BASED COGNITIVE STATE REPRESENTATION AND REASONING IN PERSISTENT COGNITIVE MACHINES

(71) Applicant: AtomBeam Technologies Inc., Moraga, CA (US)

(72) Inventor: Brian Galvin, Silverdale, WA (US)

(73) Assignee: ATOMBEAM TECHNOLOGIES INC., Moraga, CA (US)

( * ) Notice: Subject to any disclaimer, the term of this patent is extended or adjusted under 35 U.S.C. 154(b) by 0 days.

(21) Appl. No.: 19/534,677

(22) Filed: Feb. 9, 2026

(51) Int. Cl.
*G06F 16/29* (2019.01)
*G06F 16/2457* (2019.01)
*G06F 16/28* (2019.01)

(52) U.S. Cl.
CPC ........ *G06F 16/29* (2019.01); *G06F 16/24578* (2019.01); *G06F 16/285* (2019.01)

(58) Field of Classification Search
CPC ... G06F 16/29; G06F 16/285; G06F 16/24578
See application file for complete search history.

(56) References Cited

U.S. PATENT DOCUMENTS

2025/0306680 A1* 10/2025 Zhou ...................... G06F 3/015

OTHER PUBLICATIONS

Alison Marie Sandrine Pouplin, "Differential Geometric Approaches to Machine Learning", published in 2023 via Technical University of Denmark, retrieved Apr. 15, 2026. (Year: 2023).*

Jean-Pierre Magnot, "Contextuality, Holonomy and Discrete Fiber Bundles in Group-Valued Boltzmann Machines", published on Sep. 5, 25 to arXiv, retrieved Apr. 15, 2026. (Year: 2025).*
Marco Fumero, etc., "Navigating the Latent Space Dynamics of Neural Models", published on Oct. 20, 2025 to arXiv, retrieved Apr. 15, 2026. (Year: 2025).*

(Continued)

*Primary Examiner* — Shourjo Dasgupta
(74) *Attorney, Agent, or Firm* — GALVIN PATENT LAW LLC; Brian R. Galvin; Alec L. Perry

(57) ABSTRACT

A system and method for implementing persistent cognitive computation through geometric representation augmented with holonomy-based experiential memory. The system encodes inputs into a curved latent manifold and maintains bounded sets of holonomy descriptors at each location, enabling two-component cognitive states comprising position and experiential context. Cognition occurs through holonomy-sensitive traversal where paths depend jointly on geometric structure and accumulated path-dependent constraints. Holonomy generators are created during traversal from prediction errors and constraint encounters, composed into consolidated descriptors, and undergo lifecycle management including reinforcement, decay, and irreversible export to residual constraint regions. This architecture escapes location-only representations by distinguishing cognitive states that occupy identical semantic positions but arise through different experiential histories. The system supports counterfactual reasoning through holonomy switching at fixed locations and preserves semantic memory as compressed transport deformation rather than stored trajectories, enabling scalable experiential learning where repeated patterns strengthen constraints while capacity remains bounded.

14 Claims, 13 Drawing Sheets

(56)          References Cited

OTHER PUBLICATIONS

Laha Ale, "A Geometric Theory of Cognition", published on Dec. 13, 2025 to arXiv, retrieved Apr. 15, 2026. (Year: 2025).*

Marcel Blattner, "Tangential Action Spaces: Geometry, Memory and Cost in Holonomic and Nonholonomic Agents", published on Sep. 12, 2025 to arXiv, retrieved Apr. 15, 2026. (Year: 2025).*

Martin Bjerke, etc., "Understanding Neural Coding On Latent Manifolds by Sharing Features and Dividing Ensembles", published on Dec. 16, 2023 to arXiv, retrieved Apr. 15, 2026. (Year: 2023).*

David Gutierrez Ule, "Informational Holonomy Curvature and Its Discrete-to-Continuous Convergence", published on Dec. 22, 2025 to preprints.org, retrieved Apr. 15, 2026. (Year: 2025).*

Wei Peng, etc., "Hyperbolic Deep Neural Networks: A Survey", published in IEEE Transactions on Pattern Analysis and Machine Intelligence, vol. 44, No. 12, Dec. 2022, retrieved Apr. 15, 2026. (Year: 2022).*

Uri Cohen, etc., "Separability and geometry of object manifolds in deep neural networks", published in Nature Communications (2020), retrieved Apr. 15, 2026. (Year: 2020).*

Xin Li, "What is Memory? A Homological Perspective", published in Journal of Latex Class Files, vol. 14, No. 8, Aug. 2021, retrieved Apr. 15, 2026. (Year: 2021).*

Ahmad Esmaeili, etc., "Holonic Learning: A Flexible Agent-based Distributed Machine Learning Framework", published on Dec. 29, 2023 to arXiv, retrieved Apr. 15, 2026. (Year: 2023).*

* cited by examiner

Goal Manager
120

Goal Potential Field Generator
500

Goal Identifier
510

Gradient Computer
520

Goal Encoder
540

Field Dynamics Calculator
530

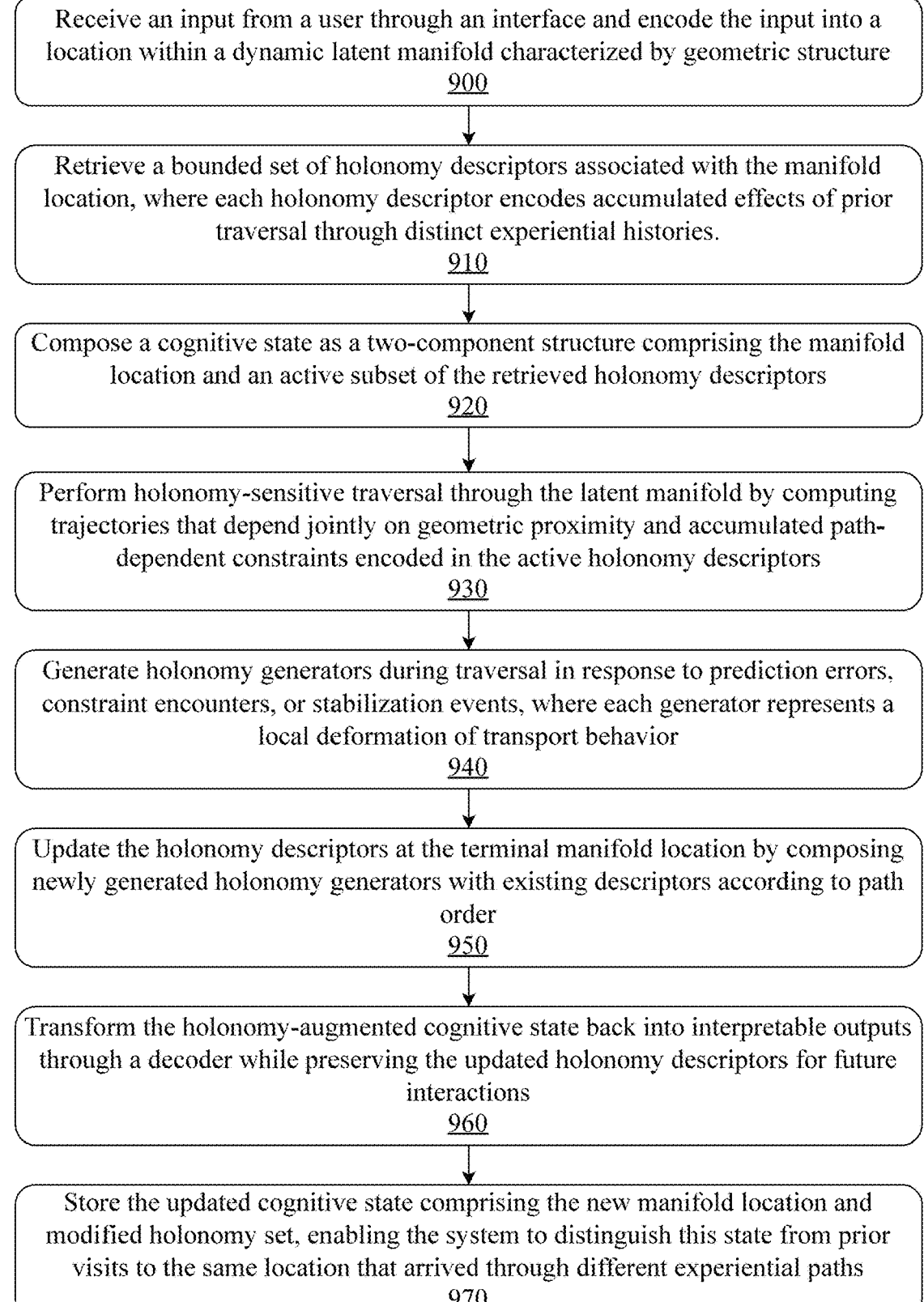

Receive an input from a user through an interface and encode the input into a location within a dynamic latent manifold characterized by geometric structure
900

Retrieve a bounded set of holonomy descriptors associated with the manifold location, where each holonomy descriptor encodes accumulated effects of prior traversal through distinct experiential histories.
910

Compose a cognitive state as a two-component structure comprising the manifold location and an active subset of the retrieved holonomy descriptors
920

Perform holonomy-sensitive traversal through the latent manifold by computing trajectories that depend jointly on geometric proximity and accumulated path-dependent constraints encoded in the active holonomy descriptors
930

Generate holonomy generators during traversal in response to prediction errors, constraint encounters, or stabilization events, where each generator represents a local deformation of transport behavior
940

Update the holonomy descriptors at the terminal manifold location by composing newly generated holonomy generators with existing descriptors according to path order
950

Transform the holonomy-augmented cognitive state back into interpretable outputs through a decoder while preserving the updated holonomy descriptors for future interactions
960

Store the updated cognitive state comprising the new manifold location and modified holonomy set, enabling the system to distinguish this state from prior visits to the same location that arrived through different experiential paths
970

FIG. 9

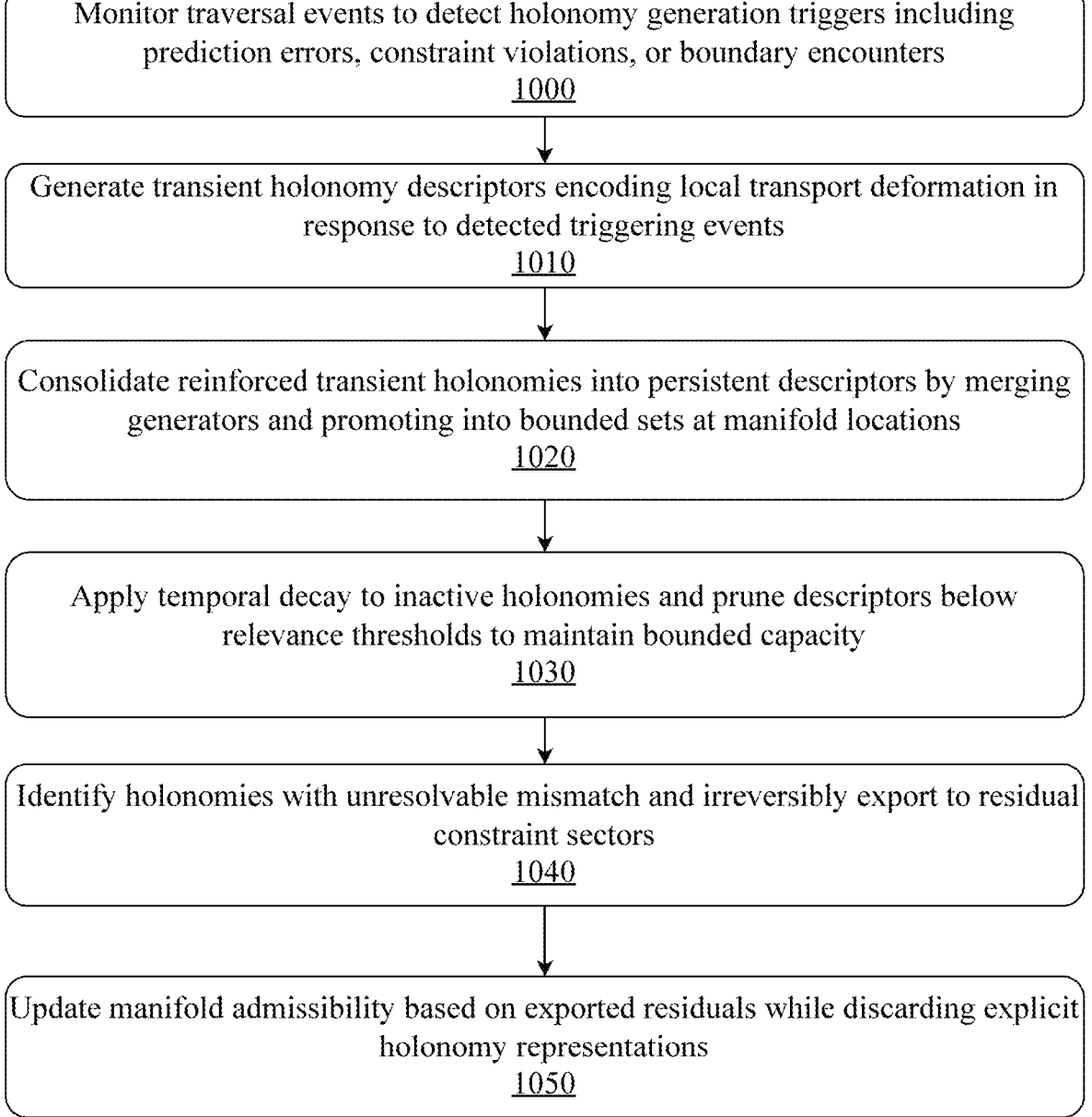

Monitor traversal events to detect holonomy generation triggers including prediction errors, constraint violations, or boundary encounters
1000

Generate transient holonomy descriptors encoding local transport deformation in response to detected triggering events
1010

Consolidate reinforced transient holonomies into persistent descriptors by merging generators and promoting into bounded sets at manifold locations
1020

Apply temporal decay to inactive holonomies and prune descriptors below relevance thresholds to maintain bounded capacity
1030

Identify holonomies with unresolvable mismatch and irreversibly export to residual constraint sectors
1040

Update manifold admissibility based on exported residuals while discarding explicit holonomy representations
1050

FIG. 10

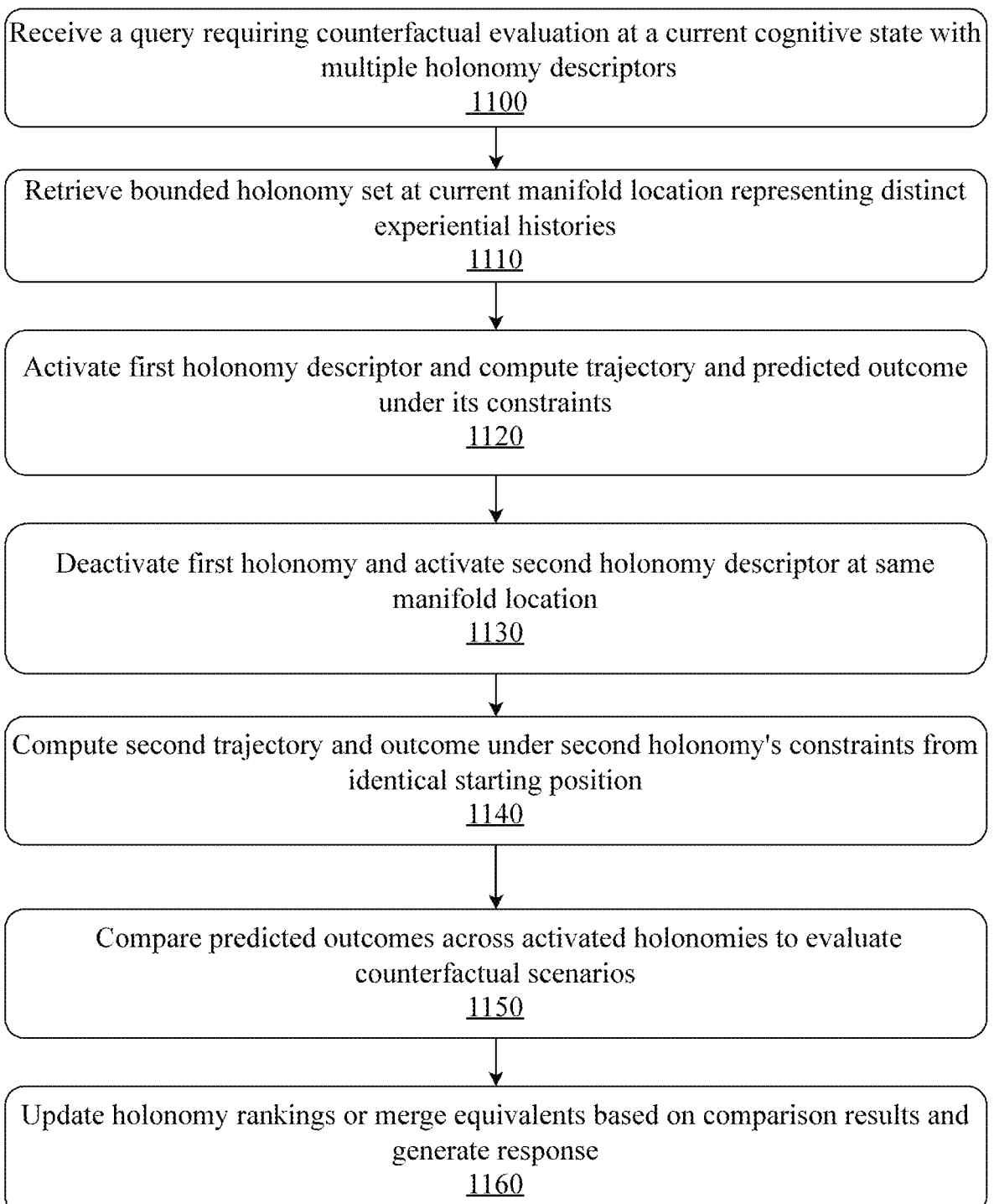

Receive a query requiring counterfactual evaluation at a current cognitive state with multiple holonomy descriptors
1100

Retrieve bounded holonomy set at current manifold location representing distinct experiential histories
1110

Activate first holonomy descriptor and compute trajectory and predicted outcome under its constraints
1120

Deactivate first holonomy and activate second holonomy descriptor at same manifold location
1130

Compute second trajectory and outcome under second holonomy's constraints from identical starting position
1140

Compare predicted outcomes across activated holonomies to evaluate counterfactual scenarios
1150

Update holonomy rankings or merge equivalents based on comparison results and generate response
1160

FIG. 11

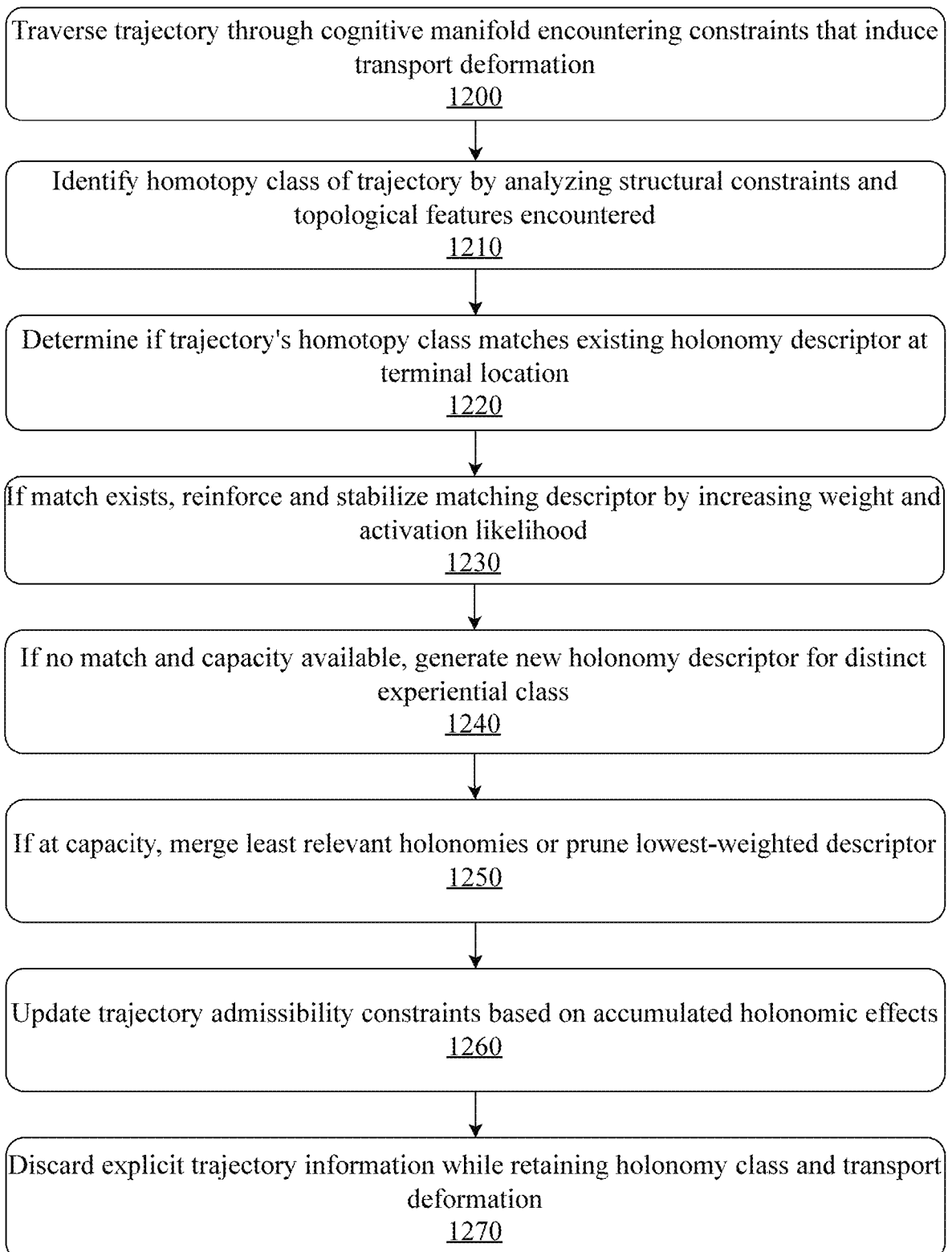

Traverse trajectory through cognitive manifold encountering constraints that induce transport deformation
1200

Identify homotopy class of trajectory by analyzing structural constraints and topological features encountered
1210

Determine if trajectory's homotopy class matches existing holonomy descriptor at terminal location
1220

If match exists, reinforce and stabilize matching descriptor by increasing weight and activation likelihood
1230

If no match and capacity available, generate new holonomy descriptor for distinct experiential class
1240

If at capacity, merge least relevant holonomies or prune lowest-weighted descriptor
1250

Update trajectory admissibility constraints based on accumulated holonomic effects
1260

Discard explicit trajectory information while retaining holonomy class and transport deformation
1270

FIG. 12

HOLONOMY-BASED COGNITIVE STATE REPRESENTATION AND REASONING IN PERSISTENT COGNITIVE MACHINES

CROSS-REFERENCE TO RELATED APPLICATIONS

Priority is claimed in the application data sheet to the following patents or patent applications, each of which is expressly incorporated herein by reference in its entirety: None.

BACKGROUND OF THE INVENTION

Field of the Invention

The present invention relates to the field of machine learning and artificial intelligence, particularly to systems for memory-augmented reasoning and long-term cognitive processing.

Discussion of the State of the Art

Recent advances in artificial intelligence, particularly in geometric and manifold-based cognitive architectures, have introduced structured representational spaces for reasoning and memory. These systems encode cognitive states as positions within learned latent manifolds and perform inference through traversal of these spaces. Such architectures can support context-aware reasoning, goal-directed navigation, and persistent memory through geometric operations. The underlying frameworks typically rely on manifold representations, where cognitive contexts correspond to regions or landmarks, and reasoning corresponds to motion through the space according to locally defined cost functions or geodesic paths.

Despite these capabilities, current geometric cognitive systems represent cognitive state solely as location within a representational manifold. A cognitive state is identified with a point, region, or coordinate in the latent space, and reasoning is modeled as traversal from one location to another. While this approach supports spatial organization of knowledge and efficient nearest-neighbor retrieval, it suffers from a fundamental limitation: history erasure. When the system revisits the same manifold location through different experiential paths, those distinct histories collapse into a single representational state. The system cannot distinguish between arriving at a situation through successful prior attempts versus arriving through failures, constraint violations, or entirely different contexts.

Memory in these architectures is typically managed through auxiliary structures external to the core state representation. Episodic buffers, replay memories, or cached trajectories may be stored separately and retrieved when needed, but this approach scales poorly and lacks principled compression. As the number of distinct experiences grows, such systems either discard history arbitrarily—leading to catastrophic forgetting—or attempt to store all trajectories explicitly, violating capacity constraints. Moreover, geodesic-only reasoning paradigms assume that optimal paths through the manifold can be determined purely from local geometry, ignoring the accumulated effects of prior traversal on what constitutes a valid, stable, or desirable reasoning pathway.

Additionally, existing approaches that attempt to address path dependence through state augmentation—such as expanding the dimensionality of the manifold to encode history directly—encounter combinatorial explosion. Representing every possible history as a distinct location in an expanded state space requires exponential growth in representational capacity and renders inference intractable under long-horizon or repeated interaction. Furthermore, these systems lack mechanisms to distinguish between behaviorally equivalent trajectories, leading to unnecessary duplication of representational resources for experiences that produce identical downstream effects.

Most importantly, current architectures lack a primitive for semantic memory that is simultaneously persistent, compressible, and path-dependent. They cannot preserve the structural consequences of prior traversal in a form that survives revisitation, scales under capacity constraints, and influences future reasoning without requiring explicit replay. The absence of such a primitive means that systems cannot support deep contextual interpretation, counterfactual reasoning over alternative experiential histories, or irreversible learning that shapes the space of admissible cognitive trajectories over time.

What is needed is a cognitive architecture in which state is represented not merely as location, but as a composite of location and accumulated path-dependent effects, holonomy, that encodes the structural deformation induced by prior traversal. This architecture must support multiple distinct cognitive states at the same representational location, enable reasoning that depends jointly on position and experiential context, preserve semantic memory as a bounded set of global invariants rather than enumerated histories, and permit irreversible consolidation and pruning of experience under finite capacity constraints. Such a system would escape geodesic-only reasoning paradigms, support counterfactual and multi-perspective inference, and enable persistent cognition that adapts through accumulated constraint rather than through explicit storage of past events.

SUMMARY OF THE INVENTION

The inventor has developed a system and method for holonomy-based cognitive state representation and reasoning in Persistent Cognitive Machines. This invention presents a cognitive computing architecture called the Persistent Cognitive Machine (PCM) that fundamentally reimagines artificial intelligence through the lens of differential geometry and dynamical systems. At its core, the PCM represents thoughts—discrete units of reasoning or analysis—not as static embeddings or tokens, but as persistent geometric structures within a continuously evolving latent manifold. This manifold is characterized by variable curvature and time-dependent metrics that encode semantic relationships, where frequently accessed concepts develop into high-curvature regions while unexplored areas maintain flatter geometry. Unlike traditional architectures that rely on stateless transformer attention or flat vector operations, the PCM implements cognition as structured motion through this shaped space, where reasoning follows paths of minimal cognitive effort that balance traversal difficulty against goal relevance. The system transforms inputs through an encoding process that respects existing manifold structure, placing new information in semantically appropriate regions while allowing the space itself to deform and adapt. This creates a living geometric substrate where memory is not stored but shaped, where attention is not weighted but flows, and where learning manifests as the evolution of space itself.

The architectures includes a Cognitive Dynamics Engine (CDE), which serves as the geometric substrate processor analogous to a physics engine in simulation environments.

The CDE continuously maintains and evolves the manifold's structure through sophisticated geometric operations including computing optimal reasoning trajectories that minimize cognitive cost, managing compression pressure derived from local curvature that makes dense semantic regions harder to traverse, and implementing goal potential fields that attract attention toward relevant areas. As the system operates, thought bundles form as coherent submanifolds representing related concepts, with the CDE managing their evolution through fanning-in operations that consolidate related ideas, fanning-out processes that enable exploratory expansion, and rebinding mechanisms that create higher-order abstractions. The compression pressure naturally guides attention away from semantically dense regions unless goal importance justifies the traversal cost, creating an organic flow of reasoning that respects both the accumulated structure of knowledge and the intentionality of current objectives. During idle periods, a dream manager interfaces with the CDE to perform autonomous reorganization, applying controlled variations to test thought stability, synthesizing new abstractions through geometric blending, and even performing topological surgery to create new conceptual bridges or remove obsolete structures.

The PCM architecture enables capabilities in persistent and adaptive intelligence through its geometric foundation. Memory management occurs through thermodynamic principles where each thought maintains activation energy that dissipates when unused, creating natural forgetting that maintains cognitive efficiency while preserving frequently accessed knowledge. The system achieves logarithmic scaling in memory usage even under continuous operation, as new experiences are increasingly absorbed into existing geometric structures rather than requiring proportional storage expansion. Advanced implementations support hierarchical cognition through nested manifolds, enabling seamless navigation between abstract concepts and detailed implementations. The architecture also facilitates multimodal processing by encoding different sensory streams into unified geometric spaces with modality-specific dimensional constraints, allowing coherent reasoning across visual, acoustic, textual, and sensor inputs. Distributed operation is achieved through federated memory coordination, where multiple PCM instances share generalized thoughts via selective bundle projection while maintaining privacy through geometric abstraction. By reformulating intelligence as motion through shaped space, the PCM transcends the limitations of traditional AI systems, offering a path toward truly persistent, adaptive, and geometrically grounded artificial cognition that improves through use rather than retraining, understands through structure rather than statistics, and remembers through the very shape of its thoughts.

According to a preferred embodiment, a computer system comprising a hardware memory, wherein the computer system is configured to execute software instructions stored on nontransitory machine-readable storage media that: maintain a latent manifold as a geometric substrate for cognitive operations, wherein the latent manifold evolves through use;

encode inputs into geometric structures within the latent manifold, wherein semantic relationships are represented through geometric properties including distance and curvature; maintain bounded sets of holonomy descriptors at manifold locations, wherein each holonomy descriptor encodes accumulated path-dependent effects of prior traversal through distinct experiential histories without storing complete trajectories; compose cognitive states as two-component structures comprising a manifold location and one or more active holonomy descriptors from the bounded set at that location, wherein multiple distinct cognitive states coexist at identical manifold locations differentiated by experiential context; compute paths through the latent manifold for cognitive processing based on the composed cognitive states, wherein the paths are influenced jointly by geometric structure of the manifold and the active holonomy descriptors that modify traversal preferences based on accumulated experience; generate holonomy generators during traversal in response to prediction errors, constraint encounters, or stabilization events, wherein each holonomy generator encodes local transport deformation; update the holonomy descriptors at terminal locations by composing newly generated holonomy generators with existing holonomy descriptors according to path order, wherein repeated experiential patterns undergo consolidation into persistent holonomy descriptors; apply temporal decay to inactive holonomy descriptors and prune holonomy descriptors below relevance thresholds to maintain bounded capacity of the sets; irreversibly export holonomy descriptors exhibiting unresolvable mismatch to residual constraint sectors, wherein exported constraints modify manifold traversal admissibility without explicit holonomy representation; store persistent representations as geometric regions within the latent manifold paired with associated holonomy descriptor sets, wherein frequently accessed representations develop characteristic geometric properties and experiential contexts that facilitate future access; modify the geometric structure of the latent manifold based on cognitive operations, wherein successful reasoning patterns create persistent modifications to both manifold geometry and holonomy structures; and generate outputs by traversing the latent manifold under holonomy-sensitive dynamics and decoding geometric and experiential information into user-interpretable responses, is disclosed.

According to another preferred embodiment, a method for persistent cognitive computation through geometric representation augmented with holonomy-based experiential memory in a dynamic latent manifold, comprising the steps of: maintaining a latent manifold as a geometric substrate for cognitive operations, wherein the latent manifold evolves through use; encoding inputs into geometric structures within the latent manifold, wherein semantic relationships are represented through geometric properties including distance and curvature; maintaining bounded sets of holonomy descriptors at manifold locations, wherein each holonomy descriptor encodes accumulated path-dependent effects of prior traversal through distinct experiential histories without storing complete trajectories; composing cognitive states as two-component structures comprising a manifold location and one or more active holonomy descriptors from the bounded set at that location, wherein multiple distinct cognitive states coexist at identical manifold locations differentiated by experiential context; computing paths through the latent manifold for cognitive processing based on the composed cognitive states, wherein the paths are influenced jointly by geometric structure of the manifold and the active holonomy descriptors that modify traversal preferences based on accumulated experience; generating holonomy generators during traversal in response to prediction errors, constraint encounters, or stabilization events, wherein each holonomy generator encodes local transport deformation; updating the holonomy descriptors at terminal locations by composing newly generated holonomy generators with existing holonomy descriptors according to path order, wherein repeated experiential patterns undergo consolidation into persistent holonomy descriptors; applying temporal decay to inactive holonomy descriptors and prune holonomy descriptors below relevance thresholds to maintain bounded capacity of the sets; irreversibly exporting holonomy descriptors exhibiting unresolvable mismatch to residual constraint sectors, wherein exported constraints modify manifold traversal admissibility without explicit holonomy representation; storing persistent representations as geometric regions within the latent manifold paired with associated holonomy descriptor sets, wherein frequently accessed representations develop characteristic geometric properties and experiential contexts that facilitate future access; modifying the geometric structure of the latent manifold based on cognitive operations, wherein successful reasoning patterns create persistent modifications to both manifold geometry and holonomy structures; and generating outputs by traversing the latent manifold under holonomy-sensitive dynamics and decoding geometric and experiential information into user-interpretable responses, is disclosed.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

FIG. 9 is a flow diagram illustrating an exemplary method for operating a holonomy-based persistent cognitive machine with two-component state representation.

FIG. 10 is a flow diagram illustrating an exemplary method for managing holonomy lifecycle including generation, consolidation, pruning, and irreversible export.

FIG. 11 is a flow diagram illustrating an exemplary method for performing counterfactual reasoning by activating alternative holonomy descriptors at a fixed manifold location.

FIG. 12 is a flow diagram illustrating an exemplary method for preserving semantic memory as deformation of path space through holonomy without storing explicit trajectories.

DETAILED DESCRIPTION OF THE INVENTION

Figure 1:
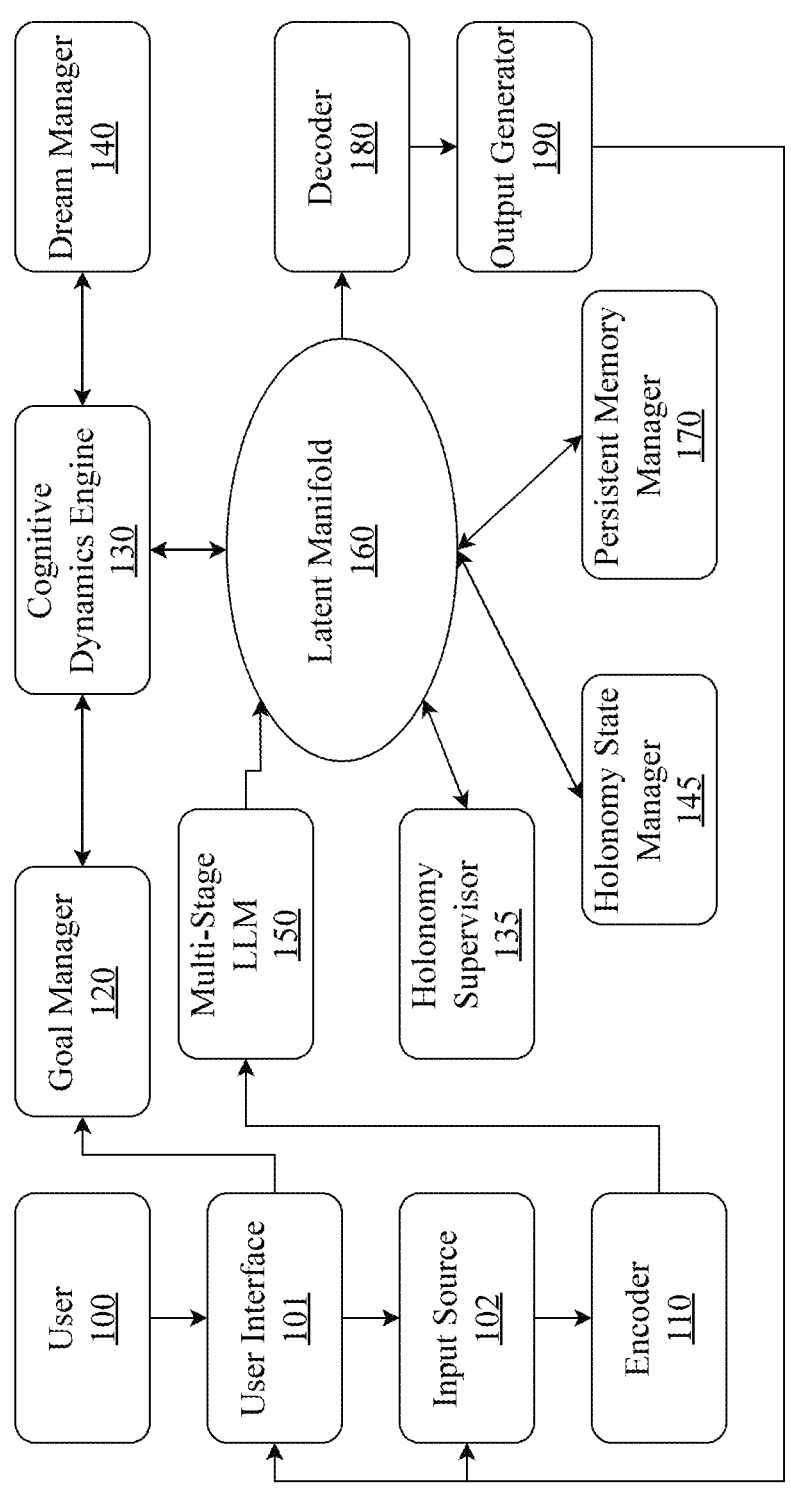
FIG. 1 is a block diagram illustrating an exemplary system architecture of a Persistent Cognitive Machine (PCM).

The inventor has conceived, and reduced to practice, system and method for a multi-state LLM with infinite context. The Persistent Cognitive Machine (PCM) represents a new approach to artificial intelligence that transforms how machines process, store, and reason about information. Rather than treating knowledge as discrete tokens or static vectors in flat computational spaces, the PCM embodies thoughts as dynamic geometric structures living within an evolving curved manifold. This high-dimensional cognitive landscape continuously reshapes itself based on usage patterns, with well-traveled conceptual territories becoming more pronounced through increased curvature while unexplored regions remain geometrically flat. The system processes incoming information by mapping it into this living space where semantic meaning is encoded through geometric relationships-distance represents conceptual similarity, curvature indicates information density, and paths through the space define chains of reasoning. Unlike conventional AI systems that forget previous interactions or require complete retraining to incorporate new knowledge, the PCM's geometric substrate naturally evolves through experience, creating a form of intelligence that literally shapes its own cognitive terrain through the act of thinking.

The Cognitive Dynamics Engine (CDE), a specialized component that manages the complex geometric operations underlying cognition. The CDE orchestrates how attention flows through the manifold by calculating optimal paths that minimize cognitive effort while maximizing goal achievement, similar to how water finds the most efficient route down a hillside. It monitors and adjusts compression pressure throughout the space-regions where many concepts converge become harder to navigate, requiring more cognitive effort to traverse, while sparse areas allow for free exploration. The engine also maintains goal-driven potential fields that act like gravitational wells, drawing attention toward relevant areas of knowledge. As the system processes information, it naturally forms thought bundles-tightly integrated collections of related concepts that function as cognitive building blocks. These bundles can merge when similarities are discovered, expand when new connections are made, or recombine to form novel abstractions. During periods of inactivity, a specialized dream manager works with the CDE to reorganize the cognitive landscape, testing the stability of existing structures, discovering hidden connections between disparate concepts, and optimizing the overall geometry for more efficient future processing.

This geometric approach to intelligence yields remarkable properties that address fundamental limitations of current AI systems. The PCM implements a form of organic memory where information naturally persists or fades based on usage patterns-frequently accessed concepts maintain high activation energy and remain readily available, while unused information gradually dissipates through thermodynamic decay. This creates an intelligent forgetting mechanism that prevents cognitive clutter while preserving essential knowledge. The architecture scales efficiently, with memory requirements growing logarithmically rather than linearly as the system accumulates experience, because new information tends to reinforce and refine existing structures rather than requiring entirely new storage. The system supports sophisticated cognitive capabilities including hierarchical reasoning across multiple levels of abstraction, seamless integration of diverse sensory inputs into unified understanding, and distributed intelligence where multiple PCM instances can share abstracted knowledge while maintaining privacy. Applications range from technological forecasting through analysis of innovation trajectories to real-time anomaly detection in complex systems, from adaptive video compression that understands content semantically to persistent AI assistants that truly learn and evolve through interaction. By reconceptualizing intelligence as the evolution of geometric structure rather than the accumulation of parameters, the PCM opens new possibilities for creating AI systems that learn continuously, reason coherently, and develop genuine understanding through the physical shape of their thoughts.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

As used herein, "thought" refers to a discrete unit of reasoning or analysis generated by a large language model or multimodal inference engine during its processing of an input prompt. A thought represents the model's intermediate reasoning steps, contextual interpretation, or internal deliberation that contributes to a final output. Thoughts may be atomic (e.g., a factual claim), structured (e.g., an inference chain), or multimodal (e.g., a fused representation of text and video). Unlike raw tokens or embeddings, thoughts encapsulate processed cognition and are suitable for caching, recombination, and reuse across future interactions. Thoughts may be stored explicitly or synthesized during recall and may evolve through compression or generalization.

As used herein, "thought cache" refers to a structured memory layer configured to store and retrieve thoughts based on semantic similarity, contextual alignment, or system policy. The cache may include multiple tiers, such as session caches for short-term interaction, long-term caches for persistent knowledge, and shared or federated caches across devices or agents. Cached thoughts are indexed in latent space and may be retrieved using vector similarity, trajectory proximity, or geodesic alignment. Cached thoughts may be compressed or abstracted over time to reduce redundancy and support scalable reuse.

As used herein, "generalization" refers to the process of synthesizing a new thought from one or more cached thoughts by identifying shared structure, meaning, or trajectory. Generalized thoughts replace specific exemplars with compressed representations that maintain core semantic content while enabling reuse across a wider range of prompts or tasks. Generalization may occur explicitly during reasoning or asynchronously during background curation or dreaming.

As used herein, "latent manifold" refers to a differentiable subspace within a high-dimensional latent hyperspace in which thoughts and thought trajectories are embedded. The manifold may be defined at a given time and is associated with a metric tensor that governs local distance, curvature, and motion. The manifold forms dynamically through the reuse, compression, and interaction of thoughts and supports operations such as geodesic traversal, memory recall, and structural recombination.

As used herein, "geodesic attention" refers to a formulation of attention in which focus or inference is achieved by computing or approximating a minimal-energy path through the latent manifold. A geodesic attention path minimizes a cognitive action functional that may include kinetic energy, compression pressure, and goal potential. Unlike traditional attention mechanisms that reweight tokens in flat space, geodesic attention produces smooth, structure-respecting flows of reasoning across latent memory.

As used herein, "compression pressure" refers to a scalar field over the latent manifold that encodes semantic density, memory reuse, or representational redundancy. The pressure at a point may be derived from geometric properties such as Ricci curvature and reflects the cost of traversal or storage in that region. High compression pressure indicates overused or ambiguous areas where pruning, generalization, or reorganization may be necessary. Compression pressure influences cache management, memory shaping, and geodesic routing.

As used herein, "goal potential field" refers to a scalar utility function defined over the latent manifold that represents the relevance, desirability, or task-alignment of different regions of thought space. The gradient of this field defines an intent vector field, which biases cognitive traversal toward goal-aligned areas. Goal potential may be determined by user prompts, task specifications, or emergent system objectives, and modulates attention, memory retrieval, and trajectory formation.

As used herein, "intent vector field" refers to a directional field over the latent manifold that encodes cognitive drive or utility gradients. It governs the direction and magnitude of traversal for operations such as memory reentry, inference, or exploration. The intent field may be computed from the gradient of a goal potential, derived from user input, or learned from system experience, and is used to align cognitive motion with target outcomes.

As used herein, "cognitive dynamics engine" or "CDE" refers to an architectural module configured to maintain and evolve the geometry of the latent manifold. The CDE is responsible for computing geodesic paths, estimating curvature, applying compression pressure, and performing structural reorganization, including during background operations such as dreaming. The CDE may expose interfaces for traversal, memory updates, compression, and control feedback, and functions as a substrate-layer system supporting high-level cognition.

As used herein, "dreaming" refers to a background process in which cached thoughts, trajectories, or bundles are perturbed, recombined, or abstracted or otherwise manipulated to improve manifold coherence and memory efficiency. Dreaming may operate during idle cycles or low-load periods and is driven by curvature smoothing, compression pressure, and generalization gain. The process supports the emergence of new thoughts, refinement of existing structures, and long-term memory consolidation.

As used herein, "reinstantiation" refers to the act of reconstructing a prior thought trajectory within the current latent manifold geometry. Due to compression or manifold deformation, original paths may no longer exist in exact form; reinstantiation generates an approximate or adapted version guided by curvature, cached data, and intent fields. Reinstantiation supports memory recall, simulation, and introspective review in systems with dynamic cognitive substrates.

As used herein, "memory basin" or "basin of recurrence" refers to a region of the latent manifold associated with a previously reinforced or frequently reused trajectory. Such basins exhibit high local curvature and geodesic convergence and serve as attractors for memory reentry. Traversal into a basin may trigger reinstantiation, memory reinforcement, or adaptive reuse, depending on system configuration and goal conditions.

As used herein, "typed latent entity" refers to a thought or substructure in the manifold labeled with a semantic or functional type, such as but not limited to fact, opinion, concept, trajectory, affect, cluster, or anchor. Typed entities impose constraints on valid operations such as recombination, interpolation, or pruning. Type-aware computation supports lawful memory manipulation, structured reasoning, and generalization without semantic distortion.

As used herein, "attention vector field" refers to a distributed, time-dependent field defined over the latent manifold that governs the instantaneous direction and magnitude of attentional flow. The field may evolve according to partial differential equations that incorporate compression pressure and goal potential gradients. This dynamic attention formulation enables real-time flow modeling, inference stabilization, and explainability through traceable vector paths.

As used herein, "latent subspace" or "thought bundle" refers to a localized, compressible region of the manifold that contains structurally similar or semantically aligned thoughts. Bundles may form naturally through repeated traversal, co-activation, or recombination, and act as low-energy attractors or semantic zones. Subspaces may support generalization, analogical reasoning, and efficient memory access.

As used herein, "latent recombinator" refers to a functional component or method configured to merge or blend similar thoughts, trajectories, or bundles in the latent manifold to form new abstractions. The recombinator may use geometric proximity, semantic alignment, or reuse statistics to determine legal recombinations, subject to type constraints and curvature continuity. It serves as a key mechanism for memory scaling, abstraction, and thought generation.

As used herein, "structured memory" refers to a persistent, geometry-aware memory architecture in which thoughts are stored not as flat vectors but as positions or paths within an evolving manifold. Structured memory supports context-sensitive access, memory reinforcement through traversal, lawful pruning, and dynamic generalization. It provides a substrate for long-term cognition, introspection, and identity continuity in systems with persistent reasoning capability.

As used herein, "Lorentzian autoencoder" refers to a neural architecture designed to encode spatiotemporal or perceptual input-such as video-into a latent manifold with Lorentzian signature, where one or more dimensions represent time-like directions. The latent structure supports temporally coherent geodesics, semantic compression, and causal continuity. Lorentzian autoencoders enable operations such as zooming, projection, and visual memory traversal.

Conceptual Architecture

FIG. 1 is a block diagram illustrating an exemplary system architecture of a Persistent Cognitive Machine (PCM). The system enables persistent, adaptive artificial intelligence by representing thoughts as geometric structures within a curved latent space rather than as discrete tokens or static embeddings. This architecture fundamentally reimagines cognition as motion through a shaped memory space, where attention follows geodesic paths through regions of varying curvature and compression, guided by goal potentials and constrained by semantic density.

A user 100 represents human operators or external systems that interact with the PCM through user interface 101. User interface 101 serves as the primary interaction layer, receiving natural language queries, commands, or other forms of input from users while also presenting processed outputs back to them. This interface enables continuous interaction loops where user feedback can shape the evolution of the system's internal geometric structures over time. Unlike traditional AI systems where each interaction is stateless, user interface 101 maintains context through its connection to the persistent geometric structures within the manifold, allowing for coherent long-term interactions where the system remembers and builds upon previous exchanges. The interface tracks user patterns and preferences, which are encoded as persistent structures within the latent manifold, creating personalized cognitive pathways that improve response relevance and efficiency over time.

An input source 102 aggregates various data streams including but not limited to multimodal inputs such as text, images, audio, sensor data, and system state information. These heterogeneous inputs are channeled to the encoder 110, which implements the mathematical transformation, mapping external data from the input space into points within the latent manifold. An encoder 110 does not simply create vector embeddings but rather projects inputs into a dynamic geometric space where semantic relationships are encoded through curvature, distance, and topological structure. This encoding process is context-sensitive and adaptive, taking into account the current state of the manifold and the compression pressure at different regions. For example, when processing a user query about a technical concept, encoder 110 identifies the appropriate region within the manifold where related thoughts and concepts have previously been cached, enabling efficient semantic alignment. The encoding process respects the manifold's metric tensor, ensuring that new inputs are embedded in ways that preserve semantic continuity and enable smooth geodesic traversal to related concepts.

A multi-stage LLM 150 serves as a language processing component that works in conjunction with encoder 110 to generate semantic structures from raw inputs. Unlike traditional architectures where LLMs operate independently, here multi-stage LLM 150 functions as a "chip" within the larger system, providing sophisticated natural language understanding and generation capabilities while being guided by the geometric constraints of the manifold. The LLM processes inputs through multiple stages of refinement, creating increasingly abstract and structured representations that can be properly embedded within a latent manifold 160. The multi-stage nature of this component reflects the hierarchical processing required to transform raw tokens into geometric thoughts. In the first stage, an LLM performs initial semantic parsing and entity recognition. Subsequent stages build increasingly complex relationships and abstractions, ultimately producing high-dimensional thought structures that encode not just content but also contextual relationships, implicit knowledge, and potential inferential pathways. For instance, when processing a complex technical document, the multi-stage LLM 150 might first extract key concepts, then identify relationships between them, map these to existing knowledge structures in the manifold, and finally generate new thought bundles that capture both explicit content and implicit semantic relationships. These thought structures are not flat embeddings but rich geometric objects with internal curvature that reflects their semantic density and interconnectedness.

A goal manager 120 creates and maintains goal potential fields that shape how attention flows through the manifold. Rather than implementing goals as discrete objectives or symbolic constraints, goal manager 120 generates scalar fields over the manifold that attract cognitive processes toward semantically relevant regions. These potential fields can arise from multiple sources including explicit task objectives provided by users, learned value functions from past interactions, internal drives such as curiosity or uncertainty reduction, and contextual constraints. Goal manager 120 implements field generation algorithms that can create complex potential landscapes with multiple attractors for competing objectives, saddle points where decisions must be made, and smooth gradients that guide exploration. The manager continuously updates these fields based on changing objectives and feedback, creating a dynamic landscape that guides inference and reasoning processes. The goal potential fields interact with the compression pressure fields derived from manifold curvature, creating a rich energetic landscape where attention flows along paths of least resistance while being drawn toward goal-relevant regions. For example, when a user asks a question about a specific topic, goal manager 120 creates a potential field with high values in manifold regions containing relevant knowledge, effectively "pulling" the system's attention toward useful information while avoiding irrelevant areas. In cases where goals conflict or compete, goal manager 120 can create field configurations that allow the system to explore multiple solution paths simultaneously or to find creative compromises that satisfy multiple objectives.

The connections between these components are designed to support the flow of geometric information rather than simple data passing. The relationship between a user 100 to goal manager 120 represents not just goal specification but the continuous shaping of the potential landscape based on user intent and feedback. The bidirectional connection between encoder 110 and multi-stage LLM 150 enables iterative refinement of semantic structures, where initial encodings can be enriched through multiple passes of LLM processing, each time creating more sophisticated geometric representations that better capture the nuanced relationships within the input data.

A cognitive dynamics engine (CDE) 130 serves as the geometric substrate processor and the core architectural component responsible for maintaining and evolving the structure of the latent manifold 160. Operating analogously to a physics engine in a simulation environment, CDE 130 governs the fundamental geometric operations that enable persistent cognition. The engine maintains the manifold's metric tensor, which defines local distances and angles within the cognitive space, continuously updating it based on usage patterns and semantic relationships. It computes geodesic paths for attention traversal by solving the variational problem of minimizing cognitive action, balancing kinetic energy of motion, compression pressure from semantic density, and attraction from goal potential fields. CDE 130 implements a geodesic equation:

$$\frac{d^2\gamma^k}{dt^2} + \Gamma^k_{ij}\frac{d\gamma^i}{dt}\frac{d\gamma^j}{dt} = F^k(\gamma(t), t)$$

where the Christoffel symbols $\Gamma^k_{ij}$ encode the manifold's connection structure and $F^k$ represents forces from compression pressure and goal potentials. During active cognition, CDE 130 continuously computes Ricci curvature across the manifold, deriving the compression pressure field $P(x)=-R(x)$ that penalizes traversal through semantically dense regions. For example, when processing a complex inference task, CDE 130 might identify multiple potential geodesic paths through the manifold, evaluate their cognitive costs based on pressure and distance, and select the optimal trajectory that balances efficiency with semantic coherence. The engine also manages the evolution of the attention vector field according to the dynamic equation:

$$\frac{\partial A}{\partial t} + \nabla_A A = -\nabla(P - \Phi)$$

enabling attention to flow as a cognitive fluid through the shaped space of memory.

A dream manager 140 implements autonomous structural reorganization of the manifold during off-task periods, analogous to sleep-driven memory consolidation in biological systems. Connected to CDE 130, dream manager 140 initiates and oversees geometric restructuring operations that improve the manifold's efficiency and generalization capacity. During dreaming phases, it samples recently activated or frequently used thought bundles, applying stochastic perturbations follows a distribution informed by local curvature and uncertainty. Dreaming begins by sampling recent or frequently activated bundles $B_1, \ldots, B_k \subset M_t$. From each bundle, points $z_i \in B_i$ are perturbed using a stochastic kernel:

$$z'_i = z_i + \varepsilon_i, \varepsilon_i \sim N\left(0, \sum_i\right),$$

where $\Sigma_i$ reflects local uncertainty or curvature. These perturbations probe the neighborhood structure, testing whether extrapolated directions are compressible or divergent.

These perturbations test the stability and compressibility of cognitive structures, identifying opportunities for consolidation or abstraction. The dream manager 140 performs recombination operations, creating weighted interpolations across semantically related bundles to discover emergent abstractions.

14

$$z_{meta} = \sum_{i=1}^{k}\alpha_i z'_i, \sum \alpha_i = 1,$$

where weights $\alpha_j$ may reflect prior co-activation, semantic alignment, or exploratory policy. The resulting $z_{meta}$ often lies outside any original bundle, creating novel junctions or abstractions. If the resulting interpolation exhibits internal coherence (e.g., low compression cost, high reconstruction fidelity), it may be retained and added as a new bundle or attractor.

When stable interpolants are found between previously disconnected regions, dream manager 140 can induce topological changes in the manifold, creating new bridges or handles that enable novel inferential pathways. It implements three primary flows during dreaming: perturbation flow for exploring local curvature basins, compression flow for collapsing redundant structures, and generalization flow for synthesizing higher-order abstractions. For instance, after a day of processing technical documents about machine learning and physics, dream manager 140 might identify common mathematical structures across these domains, create meta-bundles that capture these abstractions, and reshape the manifold to enable faster traversal between related concepts in future interactions.

A latent manifold 160 represents the central geometric substrate where all cognitive operations occur, existing as a dynamic, evolving space with rich internal structure. Unlike static embedding spaces in traditional architectures, latent manifold 160 is a living geometry that continuously adapts through use, compression, and reorganization. Within this space, thoughts exist not as isolated points but as structured regions including thought bundles (compact submanifolds representing coherent concepts), geodesic trajectories (paths of inference and association), and semantic fields (continuous distributions of meaning and relevance). The manifold maintains several critical geometric structures: the metric tensor defining local distances, the connection governing parallel transport of attention, the Ricci curvature tensor measuring semantic density, compression pressure fields derived from curvature, goal potential fields attracting attention, and the attention vector field describing instantaneous cognitive flow. The bidirectional connection with CDE 130 enables continuous reading and reshaping of these structures, while connections to multi-stage LLM 150, persistent memory manager 170, and decoder 180 facilitate the embedding, storage, and extraction of semantic content. The manifold exhibits emergent topological features such as attractor basins where frequently accessed concepts stabilize, high-curvature regions indicating semantic compression, low-pressure corridors enabling efficient inference, and bridge structures connecting previously disparate domains. As the system operates, the manifold develops a personalized geography reflecting the user's interests, the domain's structure, and the history of cognitive activity.

Persistent memory manager 170 orchestrates the long-term storage and retrieval of cognitive structures, maintaining a bidirectional connection with latent manifold 160. Unlike traditional memory systems that store static data, persistent memory manager 170 preserves geometric structures including thought bundles, established geodesic paths, learned metric relationships, and compression patterns. It implements sophisticated caching strategies that go beyond simple key-value storage, maintaining the topological relationships between thoughts and preserving the geometric context that enables meaningful retrieval. The manager tracks activation energies for cached structures, implementing thermodynamic decay where unused thoughts gradually lose energy, eventually being pruned when falling below a threshold. Decay governs forgetting in PCM systems. Each thought $T_i$ is associated with an activation energy $E_i(t)$, which dissipates over time:

$$\frac{dE_i}{dt} = -\lambda \cdot A_i(t)$$

where $\lambda$ is a decay constant and $A_i(t)$ reflects inactivity-high when idle, zero when active. When $E_i(t) < E_{min}$, the thought is pruned from memory. This process ensures that storage is focused on thoughts that contribute to ongoing cognition. This decay yields several emergent properties:

This creates a natural forgetting mechanism that maintains cognitive efficiency while preserving frequently accessed or structurally important memories. Persistent memory manager 170 also coordinates with federated memory systems, enabling knowledge sharing across multiple PCM instances while maintaining privacy through geometric abstraction. For example, when storing a complex reasoning pattern, the manager preserves not just the conclusion but the entire geodesic path, the local curvature context, and the relationships to other thought structures, enabling the system to later traverse similar reasoning paths more efficiently.

A decoder 180 implements the inverse transformation, converting geometric structures from latent manifold 160 back into observable outputs. This component must interpret rich geometric information including positions within the manifold, local curvature and pressure, nearby thought bundles, and traversed geodesic paths, transforming these into coherent external representations. Decoder 180 often works in conjunction with multi-stage LLM 150 to generate natural language outputs, using the LLM's language generation capabilities while being guided by the geometric structures extracted from the manifold. The decoding process is context-sensitive, taking into account not just the final position reached through inference but the entire trajectory taken, enabling explanations that reflect the reasoning process rather than just conclusions. For instance, when answering a complex question, decoder 180 can trace the geodesic path taken through the manifold, identify key thought bundles that were traversed, and generate an explanation that reflects this structured reasoning process.

An output generator 190 serves as the final stage in the processing pipeline, taking decoded representations and formatting them appropriately for user consumption or system action. It handles multiple output modalities including natural language responses, visualizations of reasoning paths, actions or commands for external systems, and structured data formats. Output generator 190 maintains awareness of user preferences and interaction history, adapting its presentation style based on patterns encoded in the manifold. The feedback loop from output generator 190 back to user 100 completes the interaction cycle, enabling iterative refinement and continuous learning.

The connections from goal manager 120 and dream manager 140 to CDE 130 show how intentionality and reorganization influence geometric dynamics. The flow from multi-stage LLM 150 through latent manifold 160 to decoder 180 represents the complete cognitive pipeline from input understanding through geometric reasoning to output generation. Throughout this architecture, information flows not as discrete data packets but as geometric structures, trajectories, and fields, creating a unified cognitive system where memory, reasoning, and learning are fundamentally intertwined through the shaped space of thought.

The introduction of holonomy supervisor 135 and holonomy state manager 136 addresses a limitation in geometric cognitive architectures: the inability to distinguish cognitive states that occupy identical manifold locations but arise through different experiential histories. Traditional manifold-based systems represent cognitive state solely as position within the latent space, leading to history erasure when the system revisits a location through different paths. The holonomy architecture resolves this by decomposing cognitive state into two coordinated components: a location component identifying position within latent manifold 160, and a holonomy component encoding accumulated path-dependent effects of prior traversal.

Holonomy supervisor 135 serves as the central processor for generating, managing, and evolving holonomy descriptors throughout the system's operation. Connected bidirectionally to cognitive dynamics engine 130 and latent manifold 160, holonomy supervisor 135 monitors traversal events during inference and reasoning, detecting conditions that trigger holonomy generation including prediction errors exceeding threshold values, encounters with constraint boundaries within the manifold, stabilization events where geodesic paths converge, and interface interactions that produce residual mismatch. When such events occur, holonomy supervisor 135 generates holonomy generators, compact representations of local transport deformation induced by the traversal event. These generators are not stored trajectories but rather encode how the transport operator along a path segment differs from baseline parallel transport.

Holonomy supervisor 135 implements a compositional structure where holonomy descriptors are built incrementally through the composition of generators. When the system traverses a path $\gamma = \gamma n \circ \ldots \circ \gamma 1$ through the manifold, the accumulated holonomy $H(\gamma)$ is constructed by composing local generators: $H(\gamma) = Gn \circ \ldots \circ G1$, where each $Gi$ represents deformation induced on segment $\gamma i$. This composition is generally non-commutative, preserving order-sensitivity that reflects the path-dependent nature of experience. Holonomy supervisor 135 maintains this compositional structure without storing the underlying path, enabling the system to preserve experiential distinctions while remaining scalable under capacity constraints.

Holonomy supervisor 135 manages a lifecycle for holonomy descriptors in some embodiments. Newly generated holonomies begin in a transient state, influencing immediate reasoning but not yet committed to long-term semantic memory. As the system repeatedly encounters similar experiential patterns, transient holonomies that demonstrate consistent reinforcement—through improved prediction accuracy, successful goal satisfaction, or repeated activation—may undergo consolidation. During consolidation, multiple generators inducing similar downstream effects are merged, redundant representations are compressed, and the resulting consolidated holonomy is promoted into the bounded holonomy set maintained at its associated manifold location. This consolidation process implements a form of abstraction where specific execution details are discarded while behaviorally relevant structural effects are preserved.

Holonomy supervisor 135 also implements temporal decay and pruning mechanisms to maintain bounded capacity in certain embodiments. Consolidated holonomies that remain inactive over extended periods experience progressive decay in their influence weights, reducing their impact on traversal decisions and inference outcomes. When holonomies fall below relevance thresholds, become redundant with other descriptors through equivalence detection, or when capacity limits are reached, holonomy supervisor 135 prunes them from active memory. In some embodiments, holonomy supervisor 135 manages irreversible residual export for holonomies exhibiting unresolvable mismatch or incompatibility with evolved manifold structure. These exported holonomies are not retained in operational memory but instead modify the admissibility constraints on trajectories within the manifold, creating persistent but compressed effects that shape future cognition without requiring explicit representation.

Holonomy supervisor 135 coordinates closely with cognitive dynamics engine 130 to implement holonomy-sensitive traversal in exemplary embodiments. When cognitive dynamics engine 130 computes geodesic paths for attention flow, it accounts for both geometric factors (curvature, distance, goal attraction) and holonomic factors (accumulated constraints encoded in active holonomy descriptors). The modified geodesic equation becomes: $d^2x^k/d\tau^2 + \Gamma^k_{ij}(dx^i/d\tau)(dx^j/d\tau) = F^k(x, H)$, where H represents the active holonomy descriptor and $F^k(x, H)$ depends jointly on location and experiential context. This means that the same geometric path may be preferred or suppressed depending on which holonomy is active, enabling reasoning paradigms where traversal depends on both manifold geometry and accumulated experience.

Holonomy state manager 136 serves as the interface between holonomy supervisor 135 and the broader cognitive system, managing the representation and activation of holonomy-augmented cognitive states. Connected to both holonomy supervisor 135 and latent manifold 160, this component implements a two-component state representation $S=(x, H_x)$ where x represents manifold location and $H_x$ denotes the bounded set of holonomy descriptors associated with that location.

Holonomy state manager 136 maintains and retrieves holonomy sets at each manifold location. Unlike location-only architectures where revisiting a position collapses cognitive state to a single representation, holonomy state manager 136 enables multiple distinct cognitive states to coexist at the same manifold location, differentiated by their respective holonomies. For a given location x, holonomy state manager 136 maintains a bounded set $H_x = \{H_1, H_2, \ldots, H_k\}$ where each $H_i$ represents a distinct equivalence class of experiential histories that have converged at x. The size k is controlled by capacity constraints, ensuring scalability while preserving cognitively relevant experiential distinctions.

Holonomy state manager 136 implements activation control over these holonomy sets in some embodiments. At any moment, a subset of $H_x$ may be active, directly influencing reasoning and traversal decisions, while other holonomies remain dormant but available for activation if contextual conditions change. Holonomy state manager 136 assigns and dynamically updates relevance weights to holonomies based on factors including recent activation frequency, contribution to successful inference, alignment with current goals, and compatibility with incoming observations. These weights determine which holonomies influence cognitive dynamics most strongly and which are candidates for pruning if capacity limits are approached.

An exemplary capability provided by holonomy state manager 136 is support for counterfactual and multi-perspective reasoning. When a query requires evaluation of alternative interpretations or "what if" scenarios, holonomy state manager 136 can temporarily activate different holonomies from $H_x$ at a fixed location x, computing distinct trajectories and outcomes under each experiential context. This enables the system to reason about how different prior experiences would shape current inference without requiring duplication of the manifold structure or branching of state space. For example, when evaluating a decision, the system can activate a holonomy $H_1$ encoding successful prior outcomes and compute a trajectory, then switch to holonomy $H_2$ encoding cautious constraints from past failures and compute an alternative trajectory from the identical starting location, comparing outcomes to make informed decisions.

Holonomy state manager 136 also implements conflict resolution when multiple active holonomies yield contradictory traversal preferences or predictions in certain embodiments. Such conflicts indicate unresolved experiential distinctions or competing semantic interpretations. Holonomy state manager 136 can respond by initiating learning processes, triggering holonomy refinement through holonomy supervisor 135, modifying manifold constraints through cognitive dynamics engine 130, or generating new consolidated holonomies that better capture observed behavior. This resolution process enables the system to refine its semantic memory continuously while respecting capacity constraints.

The bidirectional connection between holonomy supervisor 135 and holonomy state manager 136 creates a lifecycle for experiential memory. Holonomy supervisor 135 generates, consolidates, and prunes holonomies based on traversal events and reinforcement patterns, while holonomy state manager 136 organizes these holonomies into bounded sets at manifold locations, controls their activation, and coordinates their influence on reasoning processes. Together, these components implement semantic memory not as stored propositions or enumerated episodes, but as persistent deformation of path space—simultaneously encoding which trajectories are admissible (trajectory deformation managed by cognitive dynamics engine 130's manifold structure) and what effects traversing those trajectories produces (transport deformation managed by holonomy supervisor 135).

This holonomy-based architecture changes how the system interacts with latent manifold 160. Where previously the manifold encoded geometric relationships and semantic proximity, it also encodes the accumulated structural consequences of prior interaction through holonomy sets at each location. When encoder 110 projects a new input into the manifold, holonomy state manager 136 retrieves not just nearby thought bundles but also the experiential contexts associated with similar situations, enabling interpretation that reflects both semantic content and historical outcomes. When decoder 180 extracts information for output generation, it can access not just the current manifold position but also the active holonomy, enabling explanations that reflect experiential context: "Based on prior similar situations that succeeded through X approach . . . " or "This resembles cases where Y constraint was violated, suggesting caution . . . "

The integration with persistent memory manager 170 is significant. Where traditional memory systems store either complete trajectories (violating capacity scaling) or collapse experiential distinctions (losing semantic richness), the holonomy-augmented architecture stores minimal holonomy descriptors that preserve behaviorally relevant experience in compressed form. Persistent memory manager 170 maintains not just thought bundles and geodesic paths but also holonomy sets associated with frequently visited locations, enabling long-term preservation of experiential wisdom without unbounded memory growth. The thermodynamic decay mechanisms previously applied only to thought activation energies also govern holonomy decay, ensuring that experiential memory remains focused on patterns that contribute to ongoing cognition.

During dream manager 140 reorganization phases, holonomy structures participate in consolidation and abstraction processes in some embodiments. When dream manager 140 identifies semantically related bundles for recombination, it also examines the holonomy descriptors associated with those bundles, potentially discovering that different experiential paths lead to equivalent outcomes. Such discoveries trigger holonomy merging operations coordinated through holonomy supervisor 135, where distinct holonomies inducing similar transport effects are consolidated into representative descriptors, reducing representational complexity while preserving semantic fidelity. Conversely, if dreaming perturbations reveal that a single holonomy inadequately captures behavioral variation, dream manager 140 may trigger holonomy refinement, splitting coarse descriptors into more nuanced experiential classes.

Goal manager 120 potential fields interact with holonomy-augmented states in exemplary embodiments. A goal potential field guides not just which manifold locations to visit but which experiential contexts to activate at those locations. When goal manager 120 detects that certain holonomies consistently lead to goal satisfaction while others lead to failures, it can modulate holonomy activation weights through coordination with holonomy state manager 136, effectively learning which experiential interpretations are valuable for different task types. This creates a form of meta-learning where the system learns not just what to think about but how to contextualize situations based on accumulated experience.

The holonomy architecture also transforms how multi-stage LLM 150 interfaces with the geometric substrate. When multi-stage LLM 150 generates thought structures for embedding in the manifold, those structures carry not just semantic content but also experiential tags that influence which holonomies will be activated when those thoughts are later retrieved. Conversely, when multi-stage LLM 150 processes decoded information for output generation, it receives both positional and holonomic context, enabling language generation that reflects nuanced understanding of how the current situation relates to past experiences: "While this appears similar to previous case X, the different approach taken here suggests outcomes more aligned with case Y . . . "

The holonomy components enable the PCM to escape a limitation of purely geometric architectures: the assumption that optimal reasoning paths can be determined purely from spatial relationships and local curvature. With holonomy-augmented states, the system recognizes that identical geometric configurations can require different reasoning strategies depending on how they were reached, what constraints were encountered during approach, and what prior outcomes resulted from similar situations. This path-dependent reasoning capability enables deeper contextual understanding, learning from both successes and failures, and adaptation to long-horizon tasks where the history of interaction shapes appropriate responses.

The architecture achieves this sophistication while maintaining the scalability and efficiency that motivated geometric cognitive systems. By representing experiential memory as bounded sets of holonomy descriptors rather than as expanded state spaces or stored trajectories, the system preserves path-dependent distinctions without combinatorial explosion. By implementing holonomy lifecycle management with consolidation, decay, and irreversible export, the system ensures that memory remains focused on behaviorally relevant experience while respecting finite capacity constraints. And by separating trajectory deformation (which paths exist) from transport deformation (what happens when paths are traversed), the system maintains an architectural distinction between the manifold's geometric structure and the accumulated experiential wisdom encoded in holonomy, enabling each to evolve according to its own dynamics while remaining coordinated through the interfaces provided by holonomy supervisor 135 and holonomy state manager 136.

Figure 2:
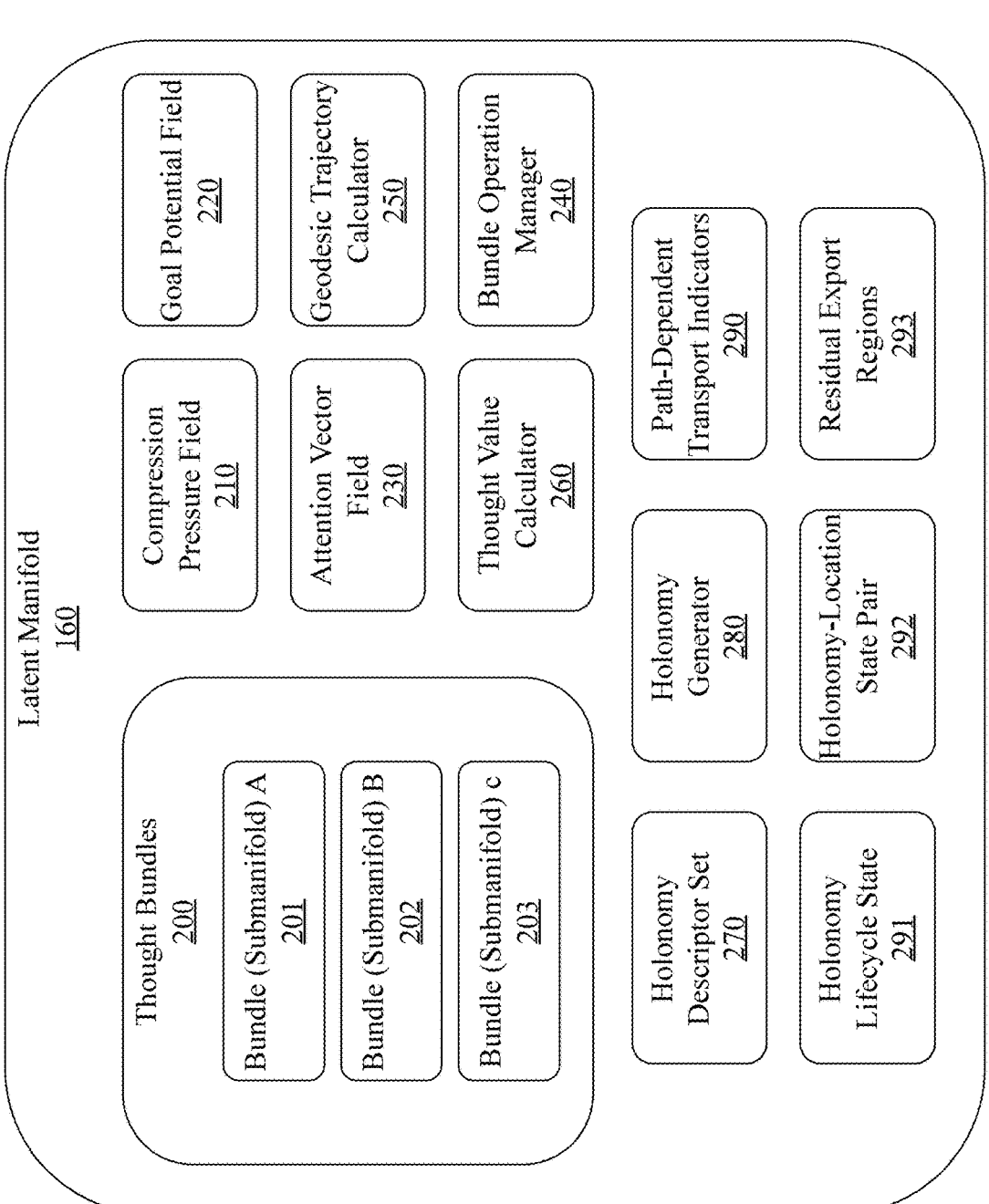
FIG. 2 is a block diagram illustrating an exemplary architecture of a component within a Persistent Cognitive Machine (PCM), a latent manifold.

FIG. 2 is a block diagram illustrating an exemplary architecture of a component within a Persistent Cognitive Machine (PCM), a latent manifold. Latent manifold 160 serves as the central cognitive substrate of the PCM system, existing as a continuously evolving geometric space where all cognitive operations unfold. Unlike traditional flat embedding spaces, this manifold exhibits variable curvature, dynamic topology, and rich internal structure that emerges from the interplay of memory, compression, and goal-directed cognition. The manifold's geometry is not predetermined but rather shaped by cognitive activity, with frequently traversed regions developing distinct topological features, semantic neighborhoods forming through repeated association, and compression pressure creating a non-uniform landscape that guides efficient reasoning.

Within the manifold, thought bundles 200 represent the primary organizational structures for persistent cognitive content. These bundles are not simple clusters of related vectors but rather compact submanifolds with their own internal geometry and semantic coherence. Thought bundles 200 section contains exemplary bundle submanifolds: bundle (submanifold) A 201, bundle (submanifold) B 202, and bundle (submanifold) C 203, each representing a distinct region of semantic space with its own local metric structure. Bundle A 201 might represent a coherent concept such as "machine learning algorithms," containing not just definitional information but also procedural knowledge, historical context, mathematical foundations, and connections to related concepts. The internal structure of bundle A 201 includes a local metric that defines distances between sub-concepts, principal directions corresponding to major semantic variations, and boundary conditions that determine how the bundle interfaces with surrounding manifold regions. Bundle B 202 could embody a different domain such as "quantum mechanics principles," maintaining its own geometric structure while potentially sharing boundary regions with bundle A 201 where interdisciplinary concepts like quantum machine learning emerge. Bundle C 203 might represent more abstract or procedural knowledge, such as "problem-solving strategies," with a flatter internal geometry that facilitates flexible application across domains.

A compression pressure field 210 represents a scalar field defined over the entire manifold, encoding the cognitive effort required to traverse different regions based on their semantic density and structural complexity. This field is computed from the local Ricci curvature according to, where is a Ricci scalar measuring how geodesics converge or diverge at each point. High compression pressure indicates regions where many semantic concepts have been compressed together through repeated use and abstraction, creating areas that are rich in meaning but require significant cognitive effort to navigate precisely. For example, the intersection between bundles A 201 and B 202 might exhibit extremely high compression pressure where concepts from machine learning and quantum mechanics have been repeatedly integrated, forming dense theoretical structures that encode sophisticated interdisciplinary insights. The compression pressure field 210 continuously evolves as new thoughts are added, existing structures are reinforced through use, and the dream manager performs offline reorganization to optimize the manifold's geometry.

A goal potential field 220 implements a complementary scalar field that attracts attention toward semantically relevant or task-aligned regions of the manifold. Unlike the compression pressure that resists traversal, the goal potential creates gradients that guide cognitive flow toward desired outcomes. This field is dynamically generated based on current objectives, user queries, learned value functions, and internal drives, creating a time-varying landscape that shapes how attention moves through the space. When processing a specific query, goal potential field 220 might create high-potential regions around relevant thought bundles while maintaining lower potentials in unrelated areas, effectively creating an energetic funnel that guides inference toward useful conclusions. The interplay between compression pressure and goal potential creates a rich dynamical landscape where attention flows along paths that balance semantic coherence (avoiding excessive pressure) with goal relevance (following potential gradients).

An attention vector field 230 represents the instantaneous flow of cognitive focus throughout the manifold, defined as. Let $A_{(x,t)}$ denote the attention vector field at point $_x \in M_{thought}$ and time t. This vector encodes both the direction and intensity of attentional flow through the manifold. The evolution of $_A$ is governed by a field equation analogous to fluid dynamics:

$$\frac{\partial A}{\partial t} + \nabla_A A = -\nabla(P - \phi)$$

Here $$\frac{\partial A}{\partial t}$$

is the temporal rate of change of attention, $_{\nabla_A A}$ is the convective derivative (attention moving along itself), and $_{-\nabla}(_{P}-\Phi)$ is the driving force of flow—combining compression pressure and goal potential. This equation captures the local evolution of attention under the influence of memory structure and cognitive drive.

Attention vector field 230 exhibits complex behaviors including laminar flow along well-established reasoning paths, turbulent regions where competing potentials create cognitive uncertainty, convergence zones where multiple lines of reasoning reach similar conclusions, and vortices around semantic attractors representing obsessive or recursive thought patterns. The field's evolution enables the system to maintain cognitive continuity while adaptively responding to changing goals and newly discovered information.

A geodesic trajectory calculator 250 computes optimal paths through the manifold by solving the variational problem of minimizing cognitive action. Let $\gamma(t):[0,\gamma] \to M_t$ be a smooth curve in the cognitive manifold, representing the evolution of attention over time. We define the cognitive action functional:

$$S|\gamma| = \int_0^T (\|\dot{\gamma}(t)\|^2 + P(\gamma(t)) - \Phi(\gamma(t)))dt,$$

where $\|\gamma(t)\|^2$ represents the kinetic energy of cognitive motion, $P(\gamma(t))$ is the compression pressure field at $\gamma(t)$, and $\Phi(\gamma(t))$ is the cognitive potential, encoding goal relevance. The geodesic $\gamma^*(t)$ is defined as the path that minimizes $\gamma^*$=arg min $S[\gamma]$. This formulation generalizes attention from instantaneous lookup to purposeful traversal. Attention becomes a consequence of structure and constraint: it flows along the most efficient path shaped by memory (via pressure) and intent (via potential).

The calculator implements numerical methods to handle the manifold's non-Euclidean geometry, accounting for curvature effects, parallel transport of semantic vectors, and the influence of nearby thought bundles on path selection. For instance, when reasoning from a concept in bundle A 201 to a goal state in bundle C 203, the geodesic trajectory calculator 250 might identify multiple viable paths: a direct route through high-pressure regions requiring intense cognitive effort, a longer path circumnavigating dense areas while maintaining semantic coherence, or a creative trajectory that leverages unexpected connections through bundle B 202.

A thought value calculator 260 assesses the utility and relevance of thoughts within the current cognitive context, computing scalar values that inform caching decisions, retrieval priorities, and structural reorganization. This component evaluates thoughts based on multiple criteria including frequency of access, semantic centrality within bundles, contribution to successful reasoning paths, alignment with current and historical goals, and potential for generalization or transfer learning. Thought value calculator 260 works closely with the thermodynamic decay system, where thoughts with consistently low values gradually lose activation energy and may eventually be pruned from the manifold. Conversely, highly valued thoughts become anchors around which new structures crystallize, creating stable semantic neighborhoods that facilitate efficient reasoning.

A bundle operation manager 240 orchestrates the dynamic restructuring of thought bundles through three primary operations that reshape the manifold's topology. Fanning-in operations occur when peripheral thoughts or loosely associated concepts are drawn into existing bundles through repeated co-activation or semantic alignment, effectively increasing the bundle's density and internal coherence. This process involves adjusting the local metric to create stronger attractions, modifying bundle boundaries to encompass new members, and updating internal structure to maintain navigability. Fanning-out operations enable bundles to expand into new semantic territories when existing concepts are extended, elaborated, or applied in novel contexts. During fanning-out, bundle operation manager 240 creates new subregions within bundles, establishes tentative connections to unexplored manifold areas, and maintains structural stability while allowing for creative expansion. Rebinding operations represent the most sophisticated transformation, occurring when multiple bundles exhibit sufficient semantic overlap or functional similarity to warrant integration into higher-order structures. Bundle operation manager 240 performs rebinding by identifying intersection regions between bundles, computing optimal merge strategies that preserve essential structure, creating meta-bundles that abstract common patterns, and updating the global manifold topology to reflect new conceptual hierarchies.

These components work in concert to create a living geometric space where cognition unfolds as structured motion rather than discrete computation. Thought bundles 200 provide persistent semantic anchors, compression pressure field 210 and goal potential field 220 create a dynamic energy landscape, attention vector field 230 enables fluid cognitive flow, the geodesic trajectory calculator 250 determines optimal reasoning paths, thought value calculator 260 maintains cognitive efficiency, and bundle operation manager 240 ensures the manifold evolves to support increasingly sophisticated reasoning. Together, they implement a form of geometric intelligence where memory shapes space, attention follows structure, and learning reshapes the very terrain of thought.

Within latent manifold 160, holonomy descriptor set 270 represents bounded collections of holonomy descriptors associated with specific manifold locations. Unlike thought bundles 200 which encode semantic content, holonomy descriptor set 270 encodes experiential context—the accumulated path-dependent effects of prior traversal through the manifold. At a given manifold location x, holonomy descriptor set 270 maintains a bounded collection $H_x=\{H_1, H_2, \ldots, H_k\}$ where each holonomy descriptor $H_i$ represents a distinct equivalence class of experiential histories that have converged at that location.

For example, a location within bundle A 201 representing "machine learning algorithms" might have multiple holonomy descriptors in holonomy descriptor set 270: $H_1$ encoding successful prior applications to image recognition tasks, $H_2$ encoding cautious constraints from failed attempts at time-series prediction, and $H_3$ encoding exploratory patterns from novel theoretical investigations. These coexisting holonomies enable the system to distinguish between visiting the same conceptual location through different experiential paths, preserving contextual distinctions that would otherwise collapse in location-only representations.

Holonomy descriptor set 270 maintains bounded capacity at each location, typically containing between 3 and 10 distinct holonomies depending on the cognitive richness and usage frequency of the location. When capacity limits are reached, holonomy supervisor 135 coordinates with holonomy state manager 136 to merge similar holonomies through equivalence detection or prune low-relevance descriptors. The boundedness ensures scalability while preserving the most cognitively relevant experiential distinctions at each manifold position.

The visual representation of holonomy descriptor set 270 in the manifold shows these bounded collections as clusters of markers or symbols at various locations throughout latent manifold 160, with different visual encodings indicating distinct holonomy classes. The density and diversity of holonomy descriptors vary across the manifold-frequently visited regions like the core of bundle A 201 may exhibit rich holonomy sets reflecting diverse experiential contexts, while peripheral or newly explored regions may have sparse or simple holonomy structures.

Holonomy generator 280 represents local events during manifold traversal that create incremental holonomy contributions. These generators are not complete holonomy descriptors but rather compact encodings of local transport deformation induced by specific traversal events. Holonomy generator 280 appears along trajectories through latent manifold 160, marking points where conditions trigger holonomy generation including prediction errors exceeding threshold values, encounters with constraint boundaries between bundles, stabilization events where geodesic paths converge, and interface interactions that produce residual mismatch.

For instance, when attention traverses from bundle A 201 toward bundle C 203, holonomy generator 280 might be created at the boundary between these bundles if the traversal encounters unexpected semantic discontinuity or if the prediction about what concepts would be encountered in bundle C 203 proves inaccurate. Each holonomy generator 280 encodes how the transport operator along that path segment differs from baseline parallel transport, capturing the local effect without requiring storage of the entire trajectory.

Holonomy supervisor 135 implements compositional structure where multiple holonomy generators 280 along a path are composed to form consolidated holonomy descriptors. If a trajectory γ traverses several segments $\gamma_1, \gamma_2, \ldots, \gamma_n$, each producing generators $G_1, G_2, \ldots, G_n$, the accumulated holonomy H(γ) is constructed through ordered composition: $H(\gamma)=G_n \circ \ldots \circ G_2 \circ G_1$. This composition is generally non-commutative, meaning that encountering the same events in different orders produces different experiential outcomes—a property that reflects realistic cognitive behavior where the sequence of experiences shapes understanding.

The visual representation of holonomy generator 280 in the manifold shows these generators as localized markers or events along trajectories, distinct from the endpoint holonomy descriptors in holonomy descriptor set 270. A single traversal path might accumulate multiple holonomy generators 280, which are then composed and potentially consolidated into a single holonomy descriptor that gets added to the holonomy descriptor set 270 at the trajectory's terminal location.

Path-dependent transport indicators 290 provide visual representation of how holonomy affects traversal behavior within latent manifold 160. These indicators show that identical geometric paths through the manifold can produce different cognitive effects depending on which holonomy descriptor from holonomy descriptor set 270 is active. Path-dependent transport indicators 290 might use different line styles, colors, or visual encodings to show how the same spatial trajectory between bundle A 201 and bundle B 202 behaves differently under different experiential contexts.

For example, path-dependent transport indicators 290 might show a geodesic path computed by geodesic trajectory calculator 250 appearing as a solid line when traversed with holonomy $H_1$ encoding successful prior outcomes, but as a dashed or modified line when traversed with holonomy $H_2$ encoding cautious constraints. This visual differentiation reflects that holonomy-sensitive traversal does not depend solely on geometric factors like compression pressure field 210 and goal potential field 220, but also on accumulated experiential effects encoded in active holonomy descriptors.

Path-dependent transport indicators 290 also show how attention vector field 230 interacts with holonomy structures. The flow patterns of attention may differ based on which holonomies are active at various manifold locations, creating experientially-dependent flow regimes where the same geometric configuration produces different attentional dynamics under different experiential contexts. This enables the manifold to support multiple reasoning strategies at the same location, selecting among them based on accumulated experience rather than purely geometric proximity.

In some embodiments, path-dependent transport indicators 290 visualize the modification of the geodesic equation to account for holonomy: $d^2x^k/d\tau^2+\Gamma^k_{ij}(dx^i/d\tau)(dx^j/d\tau)=F^k$ (x, H), where the force term $F^k$ now depends jointly on position x and active holonomy H. This means that geodesic trajectory calculator 250 computes different optimal paths depending on experiential context, and path-dependent transport indicators 290 make these differences visually apparent within the manifold representation.

Holonomy lifecycle state 291 provides visual indication of the maturity and stability of holonomy descriptors within holonomy descriptor set 270. Holonomies progress through distinct lifecycle stages managed by holonomy supervisor 135: transient holonomies newly generated from recent traversal events, consolidated holonomies that have been reinforced through repeated activation and promoted to persistent memory, decaying holonomies experiencing progressive reduction in influence due to prolonged inactivity, and exported holonomies that have been irreversibly removed from operational representation but whose effects persist as constraints on trajectory admissibility.

The visual encoding of holonomy lifecycle state 291 might use different visual markers, opacity levels, or styling to distinguish these stages. Transient holonomies might appear as lighter or dashed markers in holonomy descriptor set 270, indicating their provisional status and potential for either consolidation or discarding. Consolidated holonomies appear as solid, prominent markers reflecting their stable integration into semantic memory. Decaying holonomies might be shown with reduced opacity or faded styling, indicating their diminishing influence while they remain technically present in the set. Exported holonomies may not appear directly in holonomy descriptor set 270 but might be indicated through modifications to the manifold structure itself, such as altered compression pressure field 210 or restricted traversal corridors showing how exported constraints shape future cognition without explicit representation.

For example, a holonomy descriptor $H_1$ within bundle B 202 might initially appear in transient lifecycle state after a single traversal event. If subsequent traversals reinforce this experiential pattern, perhaps through improved prediction accuracy or successful goal satisfaction, holonomy lifecycle state 291 updates to show $H_1$ transitioning to consolidated state. If $H_1$ then remains inactive over extended periods, holonomy lifecycle state 291 gradually shifts to decaying state, with visual encoding showing its diminishing prominence. Finally, if decay progresses sufficiently or if $H_1$ becomes incompatible with evolved manifold structure, holonomy supervisor 135 may export it, and holonomy lifecycle state 291 would show this through removal from the holonomy descriptor set 270 and possible modifications to surrounding manifold geometry.

Holonomy-location state pair 292 represents the composite cognitive state structure $S=(x, H_x)$ that combines manifold location with associated holonomy descriptors. This pairing makes explicit that cognitive state in the holonomy-augmented architecture consists of two coordinated components: where the system is in representational space (location x within latent manifold 160), and how it arrived there or what experiential context is active (holonomy descriptor H from the set $H_x$ in holonomy descriptor set 270).

The visual representation of holonomy-location state pair 292 shows the explicit association between spatial positions in latent manifold 160 and their corresponding holonomy collections. This might be depicted through connecting lines, spatial grouping, or overlay structures that link thought bundles 200 to their associated holonomy descriptor sets 270. For instance, bundle A 201 is shown paired with its bounded holonomy set, making clear that visiting bundle A 201 does not specify a unique cognitive state—rather, the complete state includes both the location within bundle A 201 and which holonomy from the associated set is currently active.

Holonomy-location state pair 292 enables holonomy state manager 136 to maintain and retrieve cognitive states that preserve experiential distinctions. When encoder 110 projects a new input into latent manifold 160, holonomy state manager 136 determines not just which manifold location is relevant but also which holonomy descriptor from holonomy descriptor set 270 best matches the current experiential context. Conversely, when decoder 180 extracts information from the manifold, it receives both location and holonomy components from holonomy-location state pair 292, enabling outputs that reflect both semantic content and experiential interpretation.

The pairing structure also supports counterfactual reasoning operations managed by holonomy state manager 136. By maintaining the location component x fixed while switching among different holonomies in $H_x$, the system can evaluate alternative experiential interpretations without duplicating manifold structure. Holonomy-location state pair 292 makes this capability visually apparent by showing how multiple distinct cognitive states can coexist at the same spatial position, distinguished by their holonomy components.

Residual export regions 293 indicate areas within latent manifold 160 where holonomies have been irreversibly exported by holonomy supervisor 135, modifying the manifold's traversal constraints without retaining explicit holonomy representations. These regions represent the cumulative effect of exported holonomies on trajectory admissibility-areas where paths have been suppressed, penalized, or forbidden based on accumulated experiential evidence of instability, failure, or constraint violation.

Visually, residual export regions 293 might be shown as modified zones within latent manifold 160, possibly with altered compression pressure field 210 patterns, restricted access corridors, or boundary markers indicating reduced traversability. Unlike holonomy descriptor set 270 which contains explicit holonomy representations that can be retrieved and activated, residual export regions 293 encode the structural consequences of past experience in a compressed, non-reversible form. The system cannot directly access the specific experiential histories that led to these constraints, but the constraints themselves persist as shaped features of the manifold geometry.

For example, if repeated traversal attempts between bundle A 201 and bundle B 202 through a particular corridor consistently produced destabilization or failed predictions, holonomy supervisor 135 might eventually export the accumulated negative holonomies rather than continuing to maintain them as explicit descriptors in holonomy descriptor set 270. This export would manifest in residual export regions 293 as increased traversal cost or reduced admissibility for that corridor, effectively teaching the system to avoid problematic paths without storing the complete history of failures. The manifold's metric tensor or connection structure in residual export regions 293 becomes shaped by exported experience, creating a form of implicit memory that influences behavior without explicit representation.

Residual export regions 293 also interact with bundle operation manager 240's restructuring operations. When bundle operation manager 240 performs rebinding or reorganization during dream manager 140's consolidation phases, it must account for constraints encoded in residual export regions 293. These exported constraints may prevent certain bundle merges, encourage particular topological modifications, or guide the creation of new bridging structures that respect accumulated experiential wisdom about which connections are productive versus problematic.

The presence of residual export regions 293 enables irreversible learning in the system—certain experiential outcomes create permanent or semi-permanent modifications to traversal structure that cannot be easily undone. This irreversibility implements a form of constraint accumulation where the manifold becomes progressively shaped by experience, encoding semantic memory not as retrievable data but as geometric structure. The distinction between explicit holonomy descriptors in holonomy descriptor set 270 (which can be activated, compared, and eventually pruned) and implicit constraints in residual export regions 293 (which persistently shape traversal without explicit representation) provides a hierarchical memory system where frequently reinforced patterns migrate from explicit to implicit encoding.

The holonomy components integrate extensively with the pre-existing structures of latent manifold 160. Geodesic trajectory calculator 250 now computes paths that depend jointly on geometric factors (compression pressure field 210, goal potential field 220, manifold curvature) and holonomic factors (active holonomy descriptors from holonomy descriptor set 270, constraints from residual export regions 293). This integration means that the variational problem solved by geodesic trajectory calculator 250 includes holonomy-dependent terms: $S[\gamma]=\int_0^T[\frac{1}{2}|\dot{\gamma}(t)|^2+P(\gamma(t))-\Phi(\gamma(t))+H(\gamma(t))]\,d\tau$, where $H(\gamma(t))$ represents holonomy-dependent costs that vary based on which experiential context is active at each point along the trajectory.

Attention vector field 230 evolves under modified dynamics that account for holonomy: $\partial A/\partial t+\nabla\_A A=-\nabla(P-\Phi+H)$, where the additional H term represents forces arising from active holonomies. This means that attention flows differently depending on experiential context even when geometric structure (P and @) remains constant, enabling experience-dependent cognitive dynamics at fixed manifold configurations.

Bundle operation manager 240 coordinates with holonomy supervisor 135 during structural reorganization. When performing fanning-in operations that consolidate peripheral thoughts into existing bundles, bundle operation manager 240 also merges or consolidates associated holonomy descriptors from holonomy descriptor set 270, ensuring that experiential context remains coherent as semantic structure evolves. During rebinding operations that create meta-bundles from multiple existing bundles, bundle operation manager 240 synthesizes holonomy descriptors that capture the combined experiential wisdom of the constituent bundles, potentially discovering that certain experiential patterns generalize across domains.

Thought value calculator 260 evaluates thoughts based not just on semantic content but also on associated holonomy richness. Thoughts with diverse, well-consolidated holonomy descriptors in holonomy descriptor set 270 may be valued more highly than thoughts with sparse or purely transient holonomies, as richer experiential context indicates cognitive significance. Conversely, thoughts whose primary holonomies have decayed or been exported to residual export regions 293 may be candidates for pruning, as their experiential relevance has diminished.

The compression pressure field 210 interacts with residual export regions 293 in some embodiments, with exported constraints contributing to local pressure values. Regions where many holonomies have been exported due to repeated constraint violations may exhibit elevated compression pressure, creating implicit penalties for traversal that reflect accumulated negative experience. This interaction enables the manifold to learn not just what concepts are semantically dense (traditional compression pressure) but also what regions have proven cognitively problematic through experience (holonomy-derived pressure).

Together, the holonomy components transform latent manifold 160 from a purely geometric-semantic space into a geometric-experiential space where position and history jointly determine cognitive state. Thought bundles 200 provide semantic anchors, holonomy descriptor sets 270 provide experiential context, path-dependent transport indicators 290 show how experience shapes traversal, holonomy lifecycle states 291 indicate memory maturation, holonomy-location state pairs 292 make composite states explicit, and residual export regions 293 encode irreversible experiential learning. The manifold becomes a living space that remembers not just what has been thought about, but how those thoughts were approached, what worked, what failed, and what constraints have been accumulated through extended cognitive activity.

Figure 3:
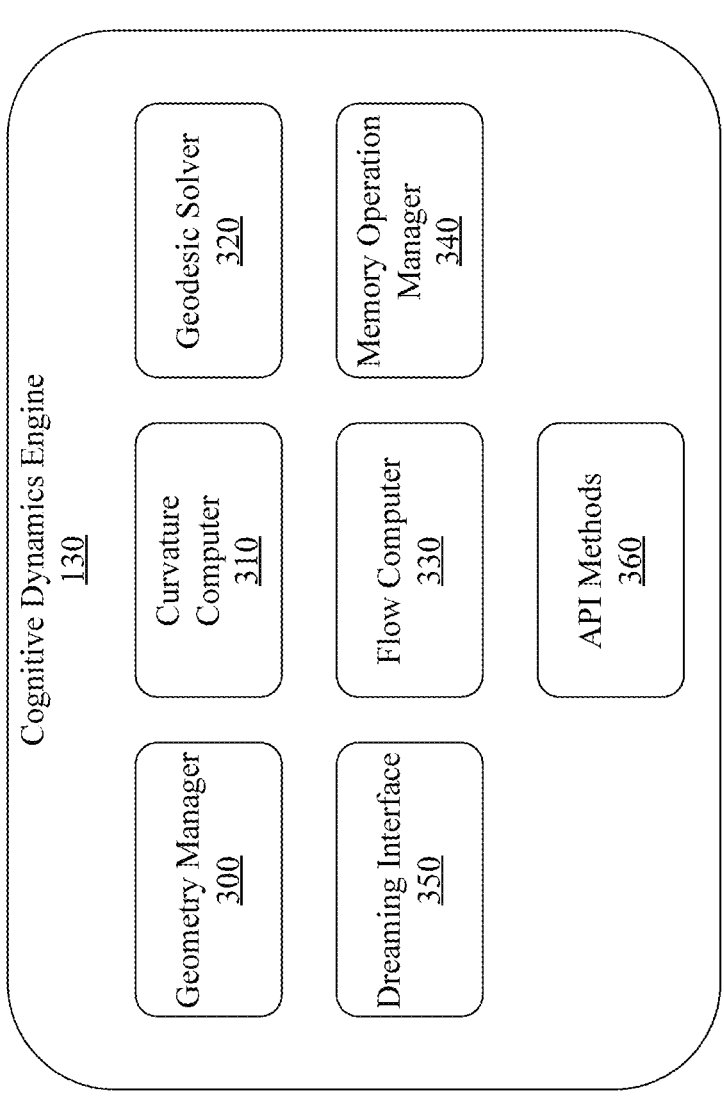
FIG. 3 is a block diagram illustrating an exemplary architecture of a component within a Persistent Cognitive Machine (PCM), a Cognitive Dynamics Engine (CDE).

FIG. 3 is a block diagram illustrating an exemplary architecture of a component within a Persistent Cognitive Machine (PCM), a Cognitive Dynamics Engine (CDE). Operating as a specialized geometry processor analogous to a physics engine in simulation environments, cognitive dynamics engine 130 manages the continuous shaping, traversal, and optimization of the cognitive manifold through coordinated geometric operations. This engine transforms the abstract principles of differential geometry and dynamical systems into practical computational mechanisms that enable persistent, adaptive cognition through structured space. In holonomy-augmented embodiments, cognitive dynamics engine 130 coordinates closely with holonomy supervisor 135 to implement reasoning that depends jointly on geometric structure and accumulated experiential effects.

A geometry manager 300 serves as the component responsible for maintaining and evolving the manifold's geometric structure. Geometry manager 300 continuously tracks and updates the Riemannian metric tensor across all regions of the latent manifold, defining how distances, angles, and volumes are measured within the cognitive space. The metric is not static but evolves dynamically based on cognitive activity, with frequently traversed regions experiencing metric contraction that brings related concepts closer together, while unexplored areas maintain broader metric spacing that allows for flexible exploration. Geometry manager 300 also maintains the connection, which governs how vectors and tensors are parallel transported across the curved manifold. This connection evolves through use, with repeated attention trajectories establishing preferred directions of parallel transport that become the "natural" ways to move between concepts. For example, if reasoning paths frequently connect concepts from physics to machine learning applications, geometry manager 300 adjusts the connection to make these transitions smoother and more efficient.

In holonomy-augmented embodiments, geometry manager 300 coordinates with holonomy supervisor 135 to distinguish between trajectory deformation (which paths exist within the manifold) and transport deformation (how traversal affects internal state, encoded as holonomy). While geometry manager 300 handles the manifold's intrinsic geometric structure including the metric and connection, holonomy supervisor 135 manages the path-dependent deformations that cannot be fully absorbed into the manifold geometry alone. Geometry manager 300 provides geometric context to holonomy supervisor 135 when holonomy generators are created, ensuring that holonomic effects are properly grounded in the local manifold structure. It also receives feedback from holonomy supervisor 135 about regions where exported holonomies have created residual constraints, incorporating these effects into admissibility calculations for trajectory planning.

Geometry manager 300 implements algorithms for metric learning from trajectory data, using transition frequencies, co-activation patterns, and semantic alignment to continuously refine the geometric structure. In systems with holonomy state manager 136, geometry manager 300 also considers which holonomies were active during successful traversals, potentially adjusting the metric to favor paths that align with consolidated experiential patterns. It manages coordinate transformations between different local charts of the manifold, ensuring smooth transitions as attention moves between semantic regions, and coordinates with holonomy state manager 136 to ensure that holonomy descriptors remain properly associated with manifold locations during coordinate changes.

A curvature computer 310 calculates the various curvature tensors that characterize the manifold's local and global geometric properties. Curvature computer 310 computes a Riemann curvature tensor, which fully describes how the manifold deviates from flat Euclidean space. From this fundamental tensor, curvature computer 310 derives the Ricci tensor and the Ricci scalar, which measure how volumes contract or expand under geodesic flow. For cognitive dynamics, it computes the compression pressure field $P(x)=-R(x)$, transforming geometric curvature into a cognitive cost function that governs attention flow.

In holonomy-augmented systems, curvature computer 310 provides curvature information to holonomy supervisor 135 for multiple purposes. High-curvature regions where semantic compression creates dense knowledge structures are often sites where holonomy generators are created, as traversal through such regions frequently encounters prediction errors or constraint boundaries. Curvature computer 310 helps holonomy supervisor 135 determine when traversal-induced deformations exceed what can be accommodated by the manifold geometry alone, triggering holonomy generation. The component also analyzes how residual export regions 293 affect effective curvature, incorporating the constraints from exported holonomies into its curvature calculations to provide accurate traversal cost estimates.

Curvature computer 310 employs multiple estimation strategies to handle the computational complexity of exact curvature calculation in high dimensions. These include geodesic deviation methods that track how nearby attention paths converge or diverge over time, Jacobian-based approximations using learned transition functions between manifold regions, and sampling techniques that estimate curvature from the statistical properties of local trajectory bundles. The component maintains a continuously updated curvature map across the manifold, identifying high-curvature regions where semantic compression has created dense knowledge structures, saddle points where conceptual boundaries meet, and flat regions suitable for creative exploration or interpolation.

A geodesic solver 320 computes optimal paths through the manifold by solving the fundamental equation of cognitive motion. Given an initial state and a goal configuration, it determines the trajectory that minimizes the cognitive action function. This variational problem balances three competing factors: the kinetic energy that penalizes rapid changes in attention, the compression pressure that increases cost in semantically dense regions, and the goal potential that provides attractive forces toward relevant areas.

In holonomy-augmented embodiments, geodesic solver 320 implements holonomy-sensitive traversal where path optimization depends jointly on geometric factors and active holonomy descriptors from holonomy state manager 136. The modified cognitive action functional becomes: $S[\gamma]=\int_0^T[\frac{1}{2}|\dot{\gamma}(t)|^2+P(\gamma(t))-\Phi(\gamma(t))+H(\gamma(t))]\,dt$, where $H(\gamma(t))$ represents holonomy-dependent costs that vary based on which experiential context is active. This means that geodesic solver 320 computes different optimal paths for the same geometric configuration depending on which holonomy from holonomy descriptor set 270 is active at the initial state. The solver coordinates with holonomy state manager 136 to retrieve active holonomies and with holonomy supervisor 135 to account for constraints from residual export regions 293 that modify traversal admissibility.

Geodesic solver 320 implements sophisticated numerical methods adapted for manifold computation, including Riemannian gradient descent that respects the manifold's metric structure, shooting methods that propagate initial velocities forward while satisfying boundary conditions, and relaxation techniques that iteratively refine approximate paths toward true geodesics. In holonomy-augmented systems, these methods are extended to handle holonomy-dependent force terms in the geodesic equation: $d^2x^k/d\tau^2+\Gamma^k_{ij}(dx^i/d\tau)(dx^j/d\tau)=F(x, H)$, where $F^k$ depends on both position x and active holonomy H. The solver handles multiple challenging scenarios such as non-convex optimization landscapes with multiple local minima, regions of high curvature where standard methods become unstable, multi-goal situations requiring Pareto-optimal path selection, and holonomy conflict situations where different experiential contexts suggest incompatible trajectories. For instance, when solving a complex reasoning task that requires connecting disparate concepts, geodesic solver 320 might identify several viable paths: a direct route through high-pressure theoretical abstractions preferred under one holonomy encoding successful prior abstraction, a longer but clearer path through concrete examples preferred under another holonomy encoding cautious constraints, or an innovative trajectory that discovers unexpected connections through analogical reasoning suggested by a third holonomy encoding exploratory patterns.

A flow computer 330 models attention as a continuous vector field evolving over the manifold according to geometric dynamics. Rather than treating attention as discrete selections or weights, this component implements a partial differential equation where attention behaves as a cognitive fluid flowing through shaped space.

In holonomy-augmented embodiments, flow computer 330 implements modified attention dynamics that account for active holonomies: $\partial A/\partial t+\nabla_A A=-\nabla(P-\Phi+H)$, where the additional H term represents forces arising from active holonomy descriptors in holonomy descriptor set 270. This means that attention flows differently through identical geometric configurations depending on experiential context. Flow computer 330 coordinates with holonomy state manager 136 to determine which holonomies are active at each point during flow computation, and incorporates constraints from residual export regions 293 that modify flow admissibility in certain manifold areas.

Flow computer 330 discretizes this equation using finite element methods adapted for manifolds, handling the complexities of curved space while maintaining numerical stability. It tracks how attention propagates through the manifold, creating flow patterns that include laminar streams along well-established reasoning paths, bifurcations where attention splits between competing hypotheses, convergence zones where multiple reasoning lines reach similar conclusions, and turbulent regions indicating cognitive uncertainty or conflicting goals. In holonomy-augmented systems, flow computer 330 also identifies regions where holonomy conflict creates flow perturbations-areas where different active holonomies at nearby locations induce incompatible flow directions, signaling unresolved experiential distinctions that may trigger holonomy refinement through holonomy supervisor 135.

The component computes derived quantities such as the divergence indicating where attention is focusing or dispersing, the curl revealing rotational patterns in thought, and flow stability metrics that identify robust versus fragile reasoning patterns. Flow computer 330 enables the system to maintain multiple concurrent attention streams, supporting parallel reasoning processes that can later merge or inform each other. In holonomy-augmented embodiments, different attention streams may operate under different active holonomies, enabling the system to simultaneously explore how different experiential contexts would guide reasoning from the same starting configuration.

A memory operation manager 340 orchestrates structural modifications to thought bundles and manifold topology based on cognitive activity and optimization criteria. This component implements the three fundamental bundle operations that reshape semantic space. During fanning-in operations, it identifies loosely associated thoughts that show increasing co-activation and guides their consolidation into tighter bundle structures, adjusting local metrics to strengthen their mutual attraction, updating bundle boundaries to encompass new members, and recalculating internal bundle geometry to maintain efficient navigation. Fanning-out operations are triggered when existing bundles need to expand into new semantic territory, with memory operation manager 340 creating new submanifold regions, establishing tentative connections to unexplored areas, and maintaining structural stability during expansion. Rebinding operations occur when the manager detects sufficient overlap or functional similarity between bundles to warrant higher-order integration, executing merge algorithms that preserve essential structure while creating new abstractions.

In holonomy-augmented embodiments, memory operation manager 340 coordinates extensively with holonomy supervisor 135 during structural modifications. When consolidating thoughts during fanning-in operations, memory operation manager 340 also consolidates or merges associated holonomy descriptors from holonomy descriptor set 270, ensuring that experiential context remains coherent as semantic structure evolves. During rebinding operations that create meta-bundles from multiple existing bundles, memory operation manager 340 works with holonomy supervisor 135 to synthesize holonomies that capture the combined experiential wisdom of constituent bundles. The manager may discover that certain experiential patterns encoded in holonomies generalize across domains being rebound, triggering equivalence-based merging of holonomy descriptors.

Memory operation manager 340 also considers holonomy lifecycle states 291 when making structural decisions. Thought bundles with rich, well-consolidated holonomy sets may be preserved during optimization as they represent cognitively significant structures with diverse experiential context. Conversely, bundles whose holonomies have largely decayed or been exported to residual export regions 293 may be candidates for pruning or reorganization. The manager provides feedback to holonomy supervisor 135 about bundle stability, which influences holonomy consolidation and export decisions. Memory operation manager 340 also handles subspace alignment for federated learning scenarios, enabling knowledge transfer between different PCM instances while respecting privacy boundaries, and in holonomy-augmented systems this includes transferring relevant holonomy patterns that enable shared experiential learning across instances.

A dreaming interface 350 provides the connection point between cognitive dynamics engine 130 and dream manager 140, enabling autonomous manifold reorganization during off-task periods. This interface exposes methods for initiating various dreaming operations including targeted perturbation of specific manifold regions, global relaxation processes that smooth unnecessary complexity, and exploratory synthesis of new conceptual connections. Dreaming interface 350 manages the transition between active cognition and dreaming states, ensuring that ongoing reasoning processes reach stable states before reorganization begins, that structures are preserved during transformation, and that the manifold returns to a coherent state before resuming active operation.

In holonomy-augmented embodiments, dreaming interface 350 coordinates holonomy-related reorganization with holonomy supervisor 135 during dreaming phases. The interface initiates holonomy consolidation processes that merge similar experiential patterns discovered during perturbation analysis. When dream manager 140 identifies semantically related bundles for recombination, dreaming interface 350 ensures that associated holonomy descriptors from holonomy descriptor set 270 are also examined for potential equivalence or consolidation. During dreaming phases, the interface coordinates bundle recombination algorithms that discover emergent abstractions, topology modification procedures that create new conceptual bridges, and compression operations that consolidate redundant structures. In holonomy-augmented systems, dreaming interface 350 also triggers holonomy refinement operations where coarse holonomy descriptors that inadequately capture behavioral variation are split into more nuanced experiential classes, and manages holonomy export decisions where accumulated negative holonomies are irreversibly removed and their effects absorbed into residual export regions 293.

Dreaming interface 350 monitors dreaming progress through geometric health metrics, ensuring that reorganization improves rather than disrupts cognitive capability. In holonomy-augmented systems, these metrics include holonomy coherence measures that assess whether experiential patterns remain properly aligned with evolved semantic structure, holonomy capacity utilization indicating whether bounded holonomy sets 270 are efficiently distributing descriptors across the manifold, and holonomy-trajectory alignment metrics that verify exported constraints properly reflect behavioral patterns.

An API methods 360 component provides a clean programmatic interface for external modules to interact with cognitive dynamics engine 130's geometric capabilities. API methods may include accepting a goal embedding and current state to return an optimal geodesic path, leveraging geodesic solver 320 while accounting for current manifold conditions. Updating reinforces the manifold along a recently traversed path, strengthening the metric connections and potentially triggering bundle formation. Querying a bundle identifies the nearest thought bundle to a given manifold point, using both geometric proximity and semantic alignment. Dreaming initiates autonomous reorganization procedures through dreaming interface 350. Getting pressure returns the compression pressure at any point, enabling other components to make informed decisions about traversal costs. Getting a goal field constructs a potential field for a given goal configuration, coordinating with goal manager 120 to shape attention flow.

In holonomy-augmented embodiments, API methods 360 exposes additional methods for holonomy-related operations. Getting a holonomy set retrieves the bounded collection of holonomy descriptors from holonomy descriptor set 270 associated with a given manifold location, coordinating with holonomy state manager 136. Activating holonomy temporarily activates a specific holonomy descriptor for counterfactual evaluation, enabling external modules to explore alternative experiential interpretations at fixed locations. Computing a holonomy-sensitive path accepts both a goal and an active holonomy descriptor, instructing geodesic solver 320 to compute paths that account for experiential context. Generating holonomy explicitly triggers holonomy generation from specified traversal events, useful for supervised learning scenarios where the system is guided through exemplary reasoning patterns. Exporting holonomy initiates irreversible export of specified holonomies to residual export regions 293 through holonomy supervisor 135, useful for enforcing learned constraints.

These methods abstract away the complex geometric and holonomic computations while providing powerful primitives for cognitive operations. API methods 360 also handles request queuing, resource management, and error handling to ensure robust operation under varying computational loads. In holonomy-augmented systems, API methods 360 manages coordination between cognitive dynamics engine 130, holonomy supervisor 135, and holonomy state manager 136 to maintain consistency when external modules modify both geometric and experiential state.

Together, these components within cognitive dynamics engine 130 create a geometric substrate for persistent cognition. Geometry manager 300 maintains the foundational structure, curvature computer 310 derives the pressure landscape that guides efficient reasoning, geodesic solver 320 finds optimal paths through semantic space, flow computer 330 enables fluid attention dynamics, memory operation manager 340 evolves the manifold through use, dreaming interface 350 enables autonomous optimization, and API methods 360 provide clean access to these capabilities. In holonomy-augmented embodiments, these components coordinate extensively with holonomy supervisor 135 and holonomy state manager 136 to implement reasoning that escapes purely geometric paradigms, enabling the system to distinguish cognitive states based on both position and experiential history. This architecture transforms the principles of geometric cognition into a practical computational system where thought becomes motion through shaped space, memory becomes curvature and accumulated experience, and learning becomes the evolution of both geometry and holonomy—the system remembers not just what concepts exist and where they are, but how they have been reached, what worked, what failed, and what constraints have been accumulated through extended cognitive activity.

Figure 4:
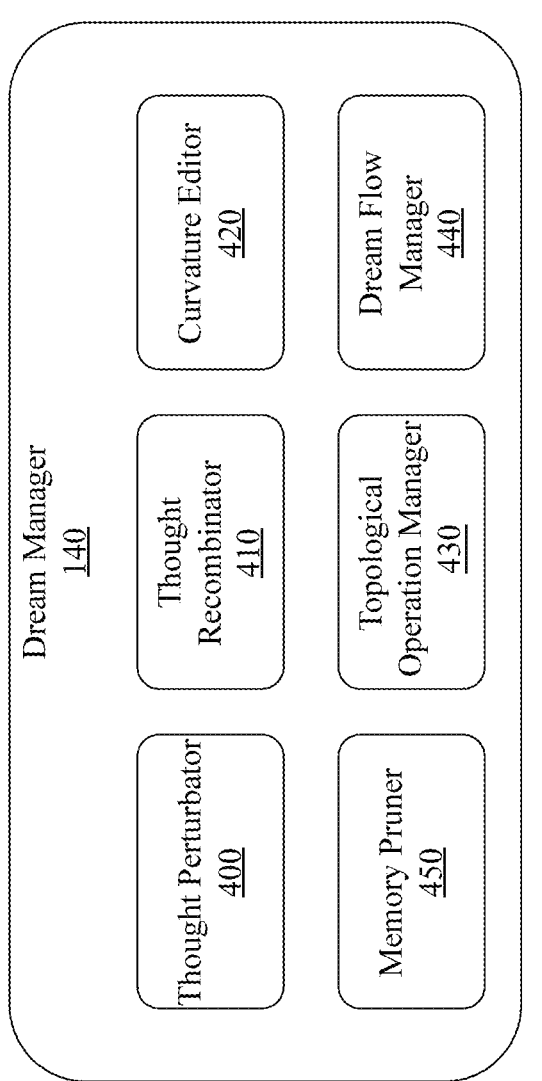
FIG. 4 is a block diagram illustrating an exemplary architecture of a component within a Persistent Cognitive Machine (PCM), a dream manager.

FIG. 4 is a block diagram illustrating an exemplary architecture of a component within a Persistent Cognitive Machine (PCM), a dream manager. Operating analogously to sleep-driven memory consolidation in biological systems, dream manager 140 performs essential geometric maintenance and optimization that enables the PCM to develop increasingly efficient and generalized cognitive structures without requiring explicit retraining or parameter updates.

This component transforms the theoretical concept of manifold evolution into practical computational processes that reshape the space of thought based on accumulated experience and structural patterns. In holonomy-augmented embodiments, dream manager 140 coordinates with holonomy supervisor 135 to consolidate, refine, and optimize experiential memory structures during offline reorganization phases.

A thought perturbator 400 implements the initial phase of the dreaming process by introducing controlled stochastic variations into existing thought structures. This component samples thought bundles from the manifold based on multiple selection criteria including recent activation frequency, structural importance within the manifold topology, proximity to high-pressure regions indicating potential for compression, and participation in successful reasoning trajectories. Once bundles are selected, thought perturbator 400 applies carefully calibrated perturbations based on factors including but not limited to noise drawn from a distribution that reflects local geometric properties. The covariance structure of this noise is not arbitrary but derived from the local metric tensor and curvature, ensuring that perturbations respect the manifold's geometry while exploring meaningful variations. In regions of high curvature, perturbations are smaller and more constrained, testing the stability of compressed semantic structures, while in flatter regions, larger perturbations explore potential new connections and generalizations.

In holonomy-augmented embodiments, thought perturbator 400 examines not just the semantic content of thought bundles but also their associated holonomy descriptor sets 270. When perturbing a thought bundle, thought perturbator 400 queries holonomy state manager 136 to retrieve the experiential contexts associated with that bundle. The perturbation process may reveal that certain holonomy descriptors remain stable under perturbation while others prove fragile or inconsistent, providing signals to holonomy supervisor 135 about which experiential patterns are robust versus which may require consolidation or export. Thought perturbator 400 also tests whether different holonomies at the same location produce consistently different outcomes when subjected to similar perturbations, validating that the experiential distinctions encoded in holonomy descriptor set 270 remain behaviorally meaningful.

Thought perturbator 400 implements multiple perturbation strategies including gradient-based exploration that follows directions of increasing semantic variance, curvature-aware sampling that concentrates perturbations along principal geodesic directions, and adversarial perturbations that test the robustness of thought structures against semantic drift. In holonomy-augmented systems, these strategies extend to holonomy perturbation where thought perturbator 400 temporarily modifies or swaps active holonomies during bundle perturbation to assess whether experiential context significantly affects the bundle's response to semantic variations. These perturbations serve as probes into the local geometry and experiential context, revealing opportunities for consolidation, identifying unstable structures that may need reinforcement, discovering latent connections between seemingly disparate concepts, and detecting holonomy redundancies where distinct experiential contexts produce equivalent behavioral outcomes.

A thought recombinator 410 takes perturbed thoughts and synthesizes new conceptual structures through sophisticated interpolation and integration algorithms. This component implements the mathematical operation where the weights are determined through multiple mechanisms including but not limited to semantic alignment scores between perturbed thoughts, historical co-activation patterns, goal-relevance metrics, and geometric compatibility measures. Thought recombinator 410 goes beyond simple linear interpolation, employing manifold-aware combination strategies that respect the curved geometry of the latent space. When combining thoughts from different bundles, it computes geodesic interpolations that follow the natural curvature of the manifold, ensuring that intermediate points remain semantically meaningful.

In holonomy-augmented embodiments, thought recombinator 410 coordinates extensively with holonomy supervisor 135 during recombination operations. When combining thoughts from different bundles, thought recombinator 410 also examines the holonomy descriptors associated with those bundles from holonomy descriptor set 270. If different thoughts reached through distinct experiential paths are being recombined, thought recombinator 410 works with holonomy supervisor 135 to determine whether the associated holonomies should be merged, maintained separately, or synthesized into new holonomy descriptors that capture the combined experiential wisdom. For example, when combining "gradient descent" thoughts with associated holonomy $H_i$ encoding successful optimization experiences and "energy minimization" thoughts with holonomy $H_2$ encoding physics-based constraint handling, thought recombinator 410 might work with holonomy supervisor 135 to create a synthesized holonomy $H_3$ that captures both experiential patterns, enabling the meta-concept to carry forward lessons from both domains.

The component implements hierarchical recombination, first identifying small groups of highly compatible thoughts for initial fusion, then progressively combining these into larger meta-structures. During recombination, it monitors several quality metrics including semantic coherence measured through local manifold smoothness, compression potential indicating whether the combination reduces overall complexity, and generalization capacity assessing whether the new structure captures broader patterns. In holonomy-augmented systems, thought recombinator 410 also monitors holonomy coherence-whether the experiential patterns encoded in associated holonomies remain consistent and meaningful after semantic recombination. When recombination reveals that distinct holonomies from different bundles induce equivalent transport effects, thought recombinator 410 signals holonomy supervisor 135 to merge these holonomies through equivalence-based consolidation.

A curvature editor 420 performs targeted modifications to the manifold's geometric structure based on insights gained from perturbation and recombination. This component has the capability to increase local curvature in regions where semantic compression is beneficial, creating tighter conceptual clusters that enable more efficient reasoning. It can also decrease curvature in areas that have become overly rigid, restoring flexibility for creative thinking and novel connections. Curvature editor 420 implements several curvature modification operations including but not limited to bundle merging procedures that identify overlapping thought structures with high mutual information and smoothly blend their geometric neighborhoods, creating unified regions with consistent curvature properties. It performs curvature diffusion operations that spread high-pressure regions more evenly, preventing the formation of semantic bottlenecks that could impede reasoning. Curvature editor 420 may also implement curvature sharpening around stable conceptual cores, reinforcing well-established knowledge while maintaining softer boundaries for evolving concepts.

In holonomy-augmented embodiments, curvature editor 420 coordinates with holonomy supervisor 135 to ensure that geometric modifications remain compatible with experiential structures. When curvature editor 420 modifies manifold geometry, these changes can affect the conditions under which holonomy generators 280 are created-regions of increased curvature may trigger more frequent holonomy generation as traversal encounters more constraint boundaries, while regions of decreased curvature may result in fewer holonomic events. Curvature editor 420 provides feedback to holonomy supervisor 135 about significant geometric changes, enabling holonomy supervisor 135 to reassess whether existing holonomy descriptors in holonomy descriptor set 270 remain properly calibrated to the evolved geometry.

Additionally, curvature editor 420 incorporates information from residual export regions 293 when modifying geometry. Areas where many holonomies have been exported due to repeated traversal failures may receive targeted curvature modifications that structurally encode the learned constraints, effectively migrating experiential wisdom from explicit holonomy representation into implicit geometric structure. When editing curvature, the component maintains global geometric consistency, ensuring that local modifications don't create inconsistencies or singularities elsewhere in the manifold. In one embodiment it may employ Ricci flow-inspired algorithms that naturally evolve curvature toward optimal configurations, balancing local semantic density with global navigability and experiential constraint accumulation.

A topological operation manager 430 handles the most profound structural modifications to the manifold, including changes that alter its fundamental connectivity. This component can create new topological features such as handles or bridges between previously disconnected regions, enabling novel reasoning pathways that weren't possible in the original manifold structure. When thought recombinator 410 discovers stable interpolations between distant bundles, topological operation manager 430 evaluates whether to establish permanent connections. It implements sophisticated surgery operations that can split overly complex regions into simpler components, merge adjacent regions that have developed sufficient similarity, or create higher-genus structures that enable multiply-connected reasoning paths.

In holonomy-augmented embodiments, topological operation manager 430 coordinates with holonomy supervisor 135 when creating or modifying topological features. When establishing a new bridge between previously disconnected regions, topological operation manager 430 works with holonomy supervisor 135 to determine appropriate holonomy initialization for the new connection-whether to inherit holonomies from the connected regions, create neutral holonomy structures for exploratory traversal, or synthesize holonomies based on the experiential patterns that suggested the connection. Conversely, when splitting or removing topological features, topological operation manager 430 ensures that associated holonomy descriptors are appropriately redistributed or exported to residual export regions 293.

Topological operation manager 430 performs topological analysis to identify features such as holes in the manifold representing conceptual gaps, bottlenecks where all reasoning passes through constrained regions, and islands of isolated knowledge that could benefit from connection. In holonomy-augmented systems, this analysis also considers experiential topology-identifying regions where experiential patterns (holonomies) create effective barriers even when geometric connections exist, or where diverse experiential contexts enable multiple independent reasoning strategies through the same geometric structure. For instance, if the system has separately developed expertise in "visual pattern recognition" with holonomy H_vis encoding image-based learning experiences and "time series analysis" with holonomy H_temp encoding temporal reasoning patterns, topological operation manager 430 might create a bridge through "spatiotemporal pattern analysis" while working with holonomy supervisor 135 to synthesize a holonomy H_spatio that appropriately combines both experiential contexts. All topological modifications are validated to ensure they preserve essential semantic relationships and experiential coherence while enabling new forms of inference.

A dream flow manager 440 orchestrates the overall flow of dreaming operations, coordinating the activities of other components to ensure coherent and beneficial manifold evolution. This component implements three primary flow types that govern how dreaming unfolds. The perturbation flow controls how stochastic exploration propagates through the manifold, managing the selection of regions for perturbation, the intensity and direction of noise injection, and the propagation of discoveries to related areas. The compression flow guides the consolidation of redundant or inefficient structures, identifying opportunities for semantic compression, orchestrating the merger of similar concepts, and ensuring that compression preserves essential distinctions. The generalization flow promotes the discovery and reinforcement of abstract patterns, guiding recombination toward higher-order structures, identifying successful generalizations for preservation, and propagating useful abstractions throughout the manifold.

In holonomy-augmented embodiments, dream flow manager 440 implements an additional holonomy consolidation flow that manages the evolution of experiential memory structures during dreaming. This flow coordinates with holonomy supervisor 135 to merge equivalent holonomies discovered through perturbation analysis, refine coarse holonomy descriptors that inadequately capture behavioral variation, export accumulated negative holonomies to residual export regions 293, and synthesize meta-holonomies that capture generalized experiential patterns across multiple bundles. Dream flow manager 440 monitors holonomy-related health metrics including holonomy set capacity utilization across the manifold, coherence between semantic structures and experiential patterns, and the rate of holonomy generation versus consolidation.

Dream flow manager 440 monitors the overall health of the dreaming process through metrics such as semantic coherence, structural stability, and compression efficiency. In holonomy-augmented systems, these metrics extend to include experiential coherence measures that assess whether holonomy structures remain properly aligned with evolved semantic content, holonomy stability indicating whether experiential patterns remain consistent under perturbation, and holonomy-trajectory alignment verifying that constraints encoded in residual export regions 293 accurately reflect learned behavioral patterns. Dream flow manager 440 implements adaptive control mechanisms that adjust flow parameters based on the current state of the manifold and the outcomes of recent modifications, ensuring that dreaming remains beneficial rather than disruptive to both geometric and experiential structures.

A memory pruner 450 performs essential cleanup operations that prevent the manifold from becoming cluttered with obsolete or redundant structures. This component implements sophisticated forgetting mechanisms that go beyond simple deletion, carefully removing structures while preserving the integrity of surrounding geometry. It identifies candidates for pruning based on multiple criteria including thermodynamic decay where thoughts with consistently low activation energy are marked for removal, structural redundancy where nearly identical thought patterns exist in multiple locations, and semantic incoherence where thoughts no longer maintain meaningful connections to the broader manifold.

In holonomy-augmented embodiments, memory pruner 450 coordinates with holonomy supervisor 135 to manage both semantic and experiential pruning. When thought structures are identified for removal, memory pruner 450 queries holonomy state manager 136 to retrieve associated holonomy descriptors from holonomy descriptor set 270. Holonomy descriptors associated with pruned thoughts may themselves be candidates for pruning, consolidation, or export. Memory pruner 450 works with holonomy supervisor 135 to determine whether these holonomies should be irreversibly exported to residual export regions 293 (if they encode constraints that should persist beyond the specific thoughts), merged with holonomies from related thoughts that are being preserved, or simply discarded if they represent purely transient experiential contexts.

Memory pruner 450 implements gradual pruning processes that slowly dissolve unwanted structures rather than creating abrupt deletions that could destabilize nearby regions. During pruning, it redistributes the "semantic mass" of removed thoughts to related structures, ensuring that useful aspects are preserved even as redundant representations are eliminated. In holonomy-augmented systems, this redistribution extends to experiential mass-useful constraints or patterns encoded in pruned holonomies are transferred to surviving structures or absorbed into residual export regions 293, ensuring that learned lessons persist even when specific experiential representations are discarded.

The component also performs defragmentation operations that consolidate sparse regions and tighten the overall manifold structure. For example, after extended operation, the system might accumulate multiple slightly different representations of similar concepts acquired in different contexts. Memory pruner 450 identifies these redundancies and carefully merges them into single, more robust representations while preserving unique aspects that provide contextual flexibility. In holonomy-augmented embodiments, this merging process includes holonomy consolidation where memory pruner 450 and holonomy supervisor 135 identify that multiple holonomy descriptors at different locations induce equivalent behavioral effects, triggering equivalence-based merging that reduces representational complexity while preserving experiential distinctions.

These components within dream manager 140 implement a process of autonomous cognitive evolution. Thought perturbator 400 explores the stability and potential of existing structures and their experiential contexts, thought recombinator 410 synthesizes new abstractions and connections while consolidating experiential patterns, curvature editor 420 optimizes the geometric landscape in coordination with experiential structures, topological operation manager 430 enables structural innovations that respect experiential coherence, dream flow manager 440 orchestrates coherent evolution of both semantic and experiential memory, and memory pruner 450 maintains cognitive efficiency through coordinated pruning of redundant semantic and experiential structures. In holonomy-augmented embodiments, these components work in tight coordination with holonomy supervisor 135 and holonomy state manager 136 to ensure that autonomous reorganization optimizes not just what the system knows (semantic content) but also how it interprets and applies that knowledge based on accumulated experience (holonomic context). This architecture enables the PCM to continuously improve its internal representations without external supervision, developing increasingly sophisticated reasoning capabilities through the natural evolution of its geometric and experiential substrate. The dreaming process transforms accumulated experience into structural wisdom, creating a manifold that not only stores knowledge but embodies understanding in its very geometry and experiential memory.

Figure 5:
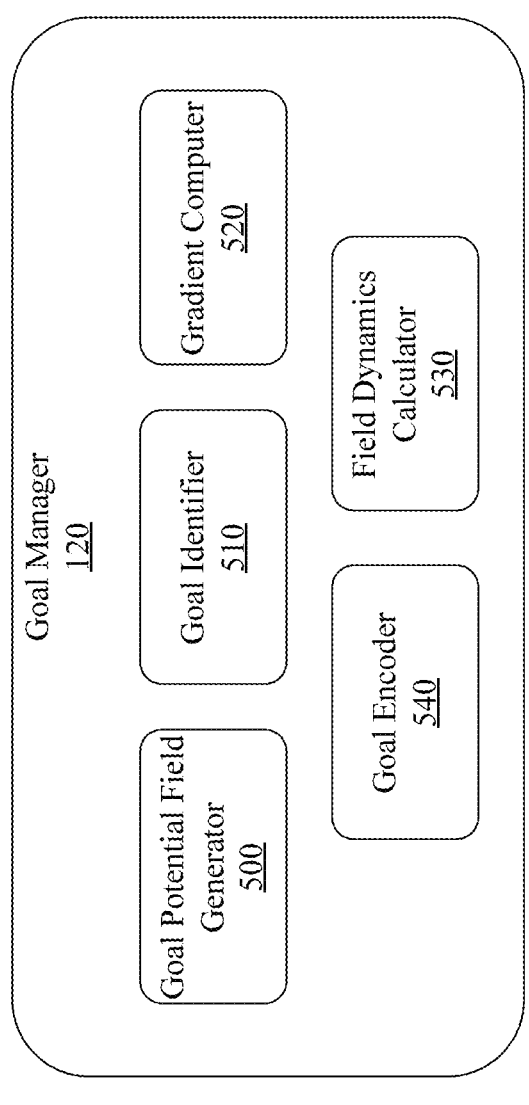
FIG. 5 is a block diagram illustrating an exemplary architecture of a component within a Persistent Cognitive Machine (PCM), a goal manager.

FIG. 5 is a block diagram illustrating an exemplary architecture of a component within a Persistent Cognitive Machine (PCM), a goal manager. Unlike traditional goal-directed systems that implement objectives as discrete targets or symbolic constraints, goal manager 120 generates continuous scalar fields that attract attention and guide reasoning through geometric influence. This component transforms abstract intentions, user queries, and system objectives into structured force fields that interact with the manifold's compression landscape to create rich cognitive dynamics. In holonomy-augmented embodiments, goal manager 120 coordinates with holonomy state manager 136 to modulate goal fields based on experiential context, enabling goals to influence not just which manifold locations to visit but which experiential interpretations to activate at those locations.

A goal identifier 510 serves as the initial processing stage that recognizes, categorizes, and prioritizes various goal sources entering the system. Goal identifier 510 processes inputs from multiple channels including explicit user queries that directly state objectives or ask questions, implicit user patterns derived from interaction history and preferences, system-generated goals arising from internal drives such as uncertainty reduction or consistency maintenance, and task constraints imposed by external requirements or operational parameters. Goal identifier 510 implements parsing algorithms that go beyond keyword extraction to understand the semantic intent behind goals. When processing a user query such as "How can we apply quantum computing principles to optimize machine learning algorithms?", the component identifies multiple nested goals: understanding quantum computing principles, comprehending optimization in machine learning, finding intersection points between these domains, and generating practical applications.

In holonomy-augmented embodiments, goal identifier 510 also identifies experiential preferences or constraints embedded in goal specifications. When users express goals with experiential qualifiers such as "carefully explore" (suggesting cautious holonomies), "quickly prototype" (suggesting exploratory holonomies), or "apply proven methods" (suggesting success-oriented holonomies), goal identifier 510 extracts these experiential requirements and coordinates with holonomy state manager 136 to ensure appropriate holonomy activation during goal pursuit. Goal identifier 510 maintains awareness of which experiential contexts have historically led to successful goal achievement in similar situations, providing this information to downstream components for holonomy-sensitive goal field generation.

Goal identifier 510 also performs goal decomposition, breaking complex objectives into hierarchical subgoals that can be pursued in parallel or sequence. It maintains a goal registry that tracks active objectives, their priorities, inter-dependencies, and completion states. The component implements conflict detection mechanisms that identify when multiple goals may be contradictory or competing for the same cognitive resources, flagging these for special handling by other components. In holonomy-augmented systems, conflict detection extends to experiential conflicts where different goals may require incompatible holonomy activations—for example, one goal suggesting cautious exploration with conservative holonomies while another demands rapid innovation with exploratory holonomies. For long-term interactions, goal identifier 510 maintains persistent goal structures that evolve across sessions, enabling the system to pursue complex objectives that require extended reasoning or multiple interaction cycles.

A goal encoder 540 transforms identified goals from their raw representational form into geometric structures compatible with the manifold's architecture. This encoding process goes beyond simple embedding, creating rich geometric objects that can effectively influence manifold dynamics. Goal encoder 540 implements multiple encoding strategies tailored to different goal types. For similarity-based goals, it computes embedding vectors and defines potential fields, creating gradients that attract attention toward semantically similar regions. For constraint-based goals, it generates potential fields with low values in prohibited regions and high values in acceptable areas, effectively creating barriers and channels that guide reasoning. Goal encoder 540 also implements contrastive encoding for goals that require distinguishing between concepts, creating potential fields with opposing gradients that push attention away from certain regions while pulling toward others.

In holonomy-augmented embodiments, goal encoder 540 generates holonomy-modulated fields that create different attractive forces depending on which experiential context is active. When encoding a goal, goal encoder 540 may consult holonomy state manager 136 to determine which holonomies are associated with manifold regions relevant to the goal, and creates field structures that preferentially attract attention when specific holonomies are active. For example, when encoding a goal related to applying theoretical concepts to practical problems, goal encoder 540 might generate a potential field that has stronger gradients toward application-oriented thought bundles when holonomies encoding successful prior implementations are active, but weaker gradients when only theoretical-exploration holonomies are active. This enables the goal field to adapt its influence based on experiential readiness.

For complex multi-faceted goals, goal encoder 540 generates composite fields that superimpose multiple potential patterns, creating rich landscapes with multiple attractors, saddle points, and gradient flows. The encoding process considers the current state of the manifold, adapting the potential field to work effectively with existing compression patterns and thought structures. In holonomy-augmented systems, this consideration extends to the holonomy landscape-goal encoder 540 analyzes the distribution of holonomy descriptor sets 270 across relevant manifold regions and shapes goal fields to work harmoniously with experiential structures. For instance, when encoding a goal related to creative problem-solving, the component might generate a potential field with multiple local maxima in different semantic regions, encouraging exploration of diverse solution approaches, while also creating holonomy-dependent field strengths that guide the system toward regions where exploratory holonomies are well-established and supported by past successful innovation.

A goal potential field generator 500 takes encoded goals and constructs the complete scalar field across the entire manifold. This component implements field generation algorithms that create smooth, differentiable potential landscapes while respecting the manifold's geometric constraints. The generator computes field values at each point by considering multiple factors including semantic distance from goal representations, alignment with goal constraints and requirements, historical success rates for similar goals in nearby regions, and interaction effects between multiple concurrent goals. Goal potential field generator 500 employs kernel methods to create smooth field variations, preventing discontinuities that could destabilize attention flow. It implements field normalization procedures to ensure that potential values remain within reasonable ranges across the manifold, preventing any single goal from completely dominating cognitive dynamics.

Figure 6:
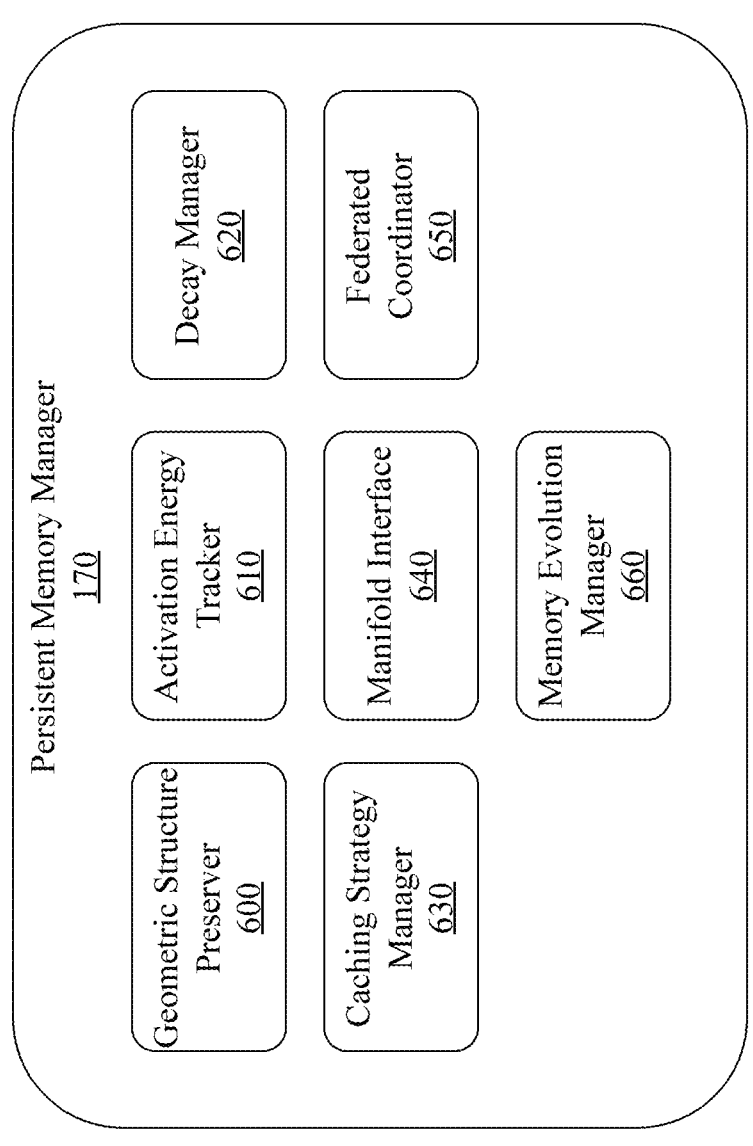
FIG. 6 is a block diagram illustrating an exemplary architecture of a component within a Persistent Cognitive Machine (PCM), a persistent memory manager.

FIG. 6 is a block diagram illustrating an exemplary architecture of a component within a Persistent Cognitive Machine (PCM), a persistent memory manager. Unlike traditional memory systems that store static data in hierarchical caches, persistent memory manager 170 implements an approach where memory exists as living geometric structures within the latent manifold, subject to natural evolution through usage patterns and energy dissipation. This component serves as the bridge between the dynamic latent manifold and long-term cognitive persistence, ensuring that thoughts, discrete units of reasoning or analysis generated during processing, are preserved not as isolated data points but as interconnected geometric structures with semantic relationships intact. In holonomy-augmented embodiments, persistent memory manager 170 coordinates with holonomy supervisor 135 to preserve not just semantic content and geometric structure but also the experiential context encoded in holonomy descriptors, enabling long-term storage of both what has been learned and how it was learned.

A geometric structure preserver 600 maintains the fundamental geometric integrity of stored thoughts and their relationships within the thought cache, a structured memory layer configured to store and retrieve thoughts based on semantic similarity, contextual alignment, and system policy. This component preserves thought bundles as compact submanifolds, maintaining their internal metric structure, boundary conditions, and topological relationships to neighboring bundles. When thoughts are cached, geometric structure preserver 600 ensures that not only the content but also the geometric context is maintained, including the local curvature patterns that indicate semantic density, the geodesic paths that connect related concepts, and the metric tensor values that define distances within thought neighborhoods.

In holonomy-augmented embodiments, geometric structure preserver 600 extends its preservation responsibility to include holonomy descriptor sets 270 associated with cached thoughts and thought bundles. When storing a thought bundle, geometric structure preserver 600 coordinates with holonomy state manager 136 to retrieve the bounded set of holonomy descriptors associated with that bundle's manifold location, preserving these experiential structures alongside the semantic content. For instance, when storing a complex reasoning chain about quantum computing applications, the component preserves not just the individual thoughts and their geometric arrangement as a coherent bundle, but also the holonomies encoding whether this reasoning was developed through successful experimental validation (success-oriented holonomy), cautious theoretical exploration (conservative holonomy), or creative interdisciplinary synthesis (exploratory holonomy).

This enables the system to later retrieve not just what was reasoned about quantum computing, but how that reasoning was approached and what experiential patterns proved effective.

Geometric structure preserver 600 implements sophisticated algorithms to handle the challenges of preserving dynamic geometric and experiential structures, including maintaining consistency as the manifold and holonomy structures evolve, handling coordinate transformations between different chart representations while preserving holonomy associations, and ensuring that preserved structures remain compatible with the current manifold geometry and holonomy framework when retrieved later. In some embodiments, geometric structure preserver 600 implements holonomy lifecycle preservation where the lifecycle state 291 of holonomies (transient, consolidated, decaying) is also preserved, enabling the system to reconstruct the full temporal context of experiential memory when thoughts are retrieved from long-term storage.

An activation energy tracker 610 implements the thermodynamic model of memory persistence by assigning and monitoring activation energies to each cached thought and thought structure. Activation energy tracker 610 goes beyond simple access counting, implementing an energy model where thoughts gain energy through various forms of cognitive engagement including direct retrieval for query processing, traversal along geodesic paths that pass near the thought, participation in successful reasoning chains, and reinforcement through goal achievement. Activation energy tracker 610 maintains a continuous energy landscape across all cached structures, tracking not just individual thought energies but also the energy distributions within thought bundles and along frequently traversed paths.

In holonomy-augmented embodiments, activation energy tracker 610 also tracks activation energies for holonomy descriptors stored in persistent memory. Holonomies that are frequently activated during successful reasoning receive energy boosts, while holonomies that remain dormant experience energy dissipation. Activation energy tracker 610 coordinates with holonomy supervisor 135 to implement holonomy-specific energy dynamics where holonomies encoding consistently successful experiential patterns may accumulate higher baseline energies than holonomies encoding failed or unstable approaches. The tracker implements coupled energy dynamics where thought bundle energies and their associated holonomy energies influence each other, highly energetic thoughts with weak holonomies may trigger holonomy consolidation through holonomy supervisor 135, while weak thoughts with strong experiential holonomies may receive energy support to preserve valuable experiential patterns.

Energy updates follow the principle that thoughts and their associated holonomies contributing to successful cognitive outcomes receive energy boosts, while those that remain unused gradually dissipate energy according to the thermodynamic decay equation. The tracker also implements energy inheritance mechanisms where new thoughts created through generalization, the process of synthesizing new thoughts from cached thoughts by identifying shared structure, inherit appropriate energy levels from their parent thoughts, ensuring that valuable abstractions maintain sufficient activation to persist. In holonomy-augmented systems, this inheritance extends to holonomy energy where synthesized thoughts receive holonomies with energy levels reflecting the experiential value of their parent structures.

A decay manager 620 implements the natural forgetting mechanism through thermodynamic principles, executing a decay equation. This component continuously monitors thought energies and initiates pruning operations when energy falls below the threshold, ensuring that the thought cache maintains efficiency by naturally eliminating obsolete or redundant information. Decay manager 620 implements pruning strategies that go beyond simple deletion, including gradual energy dissipation that allows thoughts to fade naturally rather than disappearing abruptly, redistribution of semantic content from decaying thoughts to related structures that remain active, and preservation of structural integrity by carefully removing thoughts without creating discontinuities in the manifold.

In holonomy-augmented embodiments, decay manager 620 coordinates extensively with holonomy supervisor 135 to manage the coupled decay of semantic and experiential memory. When thought energies decay below thresholds, decay manager 620 queries holonomy state manager 136 to determine whether associated holonomy descriptors should also be pruned, exported to residual export regions 293, or transferred to other thought structures. Decay manager 620 implements holonomy-aware pruning policies where thoughts with decayed energies but strong experiential holonomies may receive temporary energy support, allowing valuable experiential patterns to migrate to more relevant semantic contexts before the original thoughts are fully pruned. Conversely, holonomies that decay below relevance thresholds may be irreversibly exported through holonomy supervisor 135, with their constraints absorbed into residual export regions 293 that modify manifold traversal admissibility.

Decay manager 620 may also implement contextual decay modulation where decay rates adjust based on factors such as the semantic uniqueness of a thought, its role in connecting otherwise disparate concepts, and its participation in rarely accessed but critically important knowledge. In holonomy-augmented systems, this modulation extends to holonomy richness thoughts associated with diverse, well-consolidated holonomy sets may experience slower decay rates as their rich experiential context indicates cognitive significance. For example, foundational mathematical concepts might decay more slowly than specific computational examples, preserving essential knowledge infrastructure while allowing detailed instances to fade when no longer needed. Similarly, holonomies encoding foundational experiential patterns (such as successful constraint handling or effective exploratory strategies) may be preferentially preserved even when specific thoughts decay, enabling these experiential lessons to persist and potentially transfer to new semantic contexts.

A manifold interface 640 provides the bidirectional connection between persistent memory manager 170 and the latent manifold, enabling seamless flow of geometric structures in both directions. This interface implements protocols for reading geometric structures from memory into the active manifold, including reconstruction of thought bundles with their full geometric context, restoration of geodesic paths and their associated curvature patterns, and integration of retrieved structures with the current manifold state. When writing updates back to memory, manifold interface 640 captures not just the modified thoughts but the entire geometric context of their evolution, preserving information about new connections formed during reasoning, changes in local curvature due to compression or expansion, and trajectory patterns that indicate successful reasoning strategies.

In holonomy-augmented embodiments, manifold interface 640 handles the transfer of holonomy structures between persistent storage and the active manifold. When retrieving thoughts from memory, manifold interface 640 coordinates with holonomy state manager 136 to reconstruct the holonomy descriptor sets 270 associated with those thoughts, restoring both the semantic content and the experiential context in which it was originally developed. This reconstruction may involve reactivating holonomies that have been stored in compressed form, reestablishing associations between manifold locations and holonomy sets, and ensuring that retrieved holonomies remain compatible with the current holonomy framework managed by holonomy supervisor 135. When writing updates to memory, manifold interface 640 captures holonomy modifications including newly generated holonomy generators 280 that arose during reasoning, consolidation of holonomies that occurred through reinforcement, and changes in holonomy lifecycle states 291 reflecting maturation or decay of experiential patterns.

Manifold interface 640 maintains synchronization between the persistent memory structures and the dynamic manifold state, handling challenges such as version conflicts when the manifold has evolved since a thought was cached, geometric inconsistencies that arise from independent evolution of different regions, and efficient incremental updates that avoid rewriting entire structures for small changes. In holonomy-augmented systems, these synchronization challenges extend to holonomy evolution—the manifold interface 640 handles cases where holonomy structures have evolved since thoughts were cached, potentially requiring holonomy reinterpretation or consolidation through holonomy supervisor 135 to maintain consistency between stored and active experiential contexts.

A caching strategy manager 630 implements intelligent policies for determining which thoughts and structures to preserve in the various tiers of the thought cache, including session caches for short-term interaction, long-term caches for persistent knowledge, and shared or federated caches across devices or agents. Unlike traditional caching strategies based on recency or frequency alone, this component implements geometric and semantic criteria for cache management. Cached thoughts are indexed in latent space using sophisticated methods that preserve geometric relationships, enabling retrieval using vector similarity, trajectory proximity, or geodesic alignment.

In holonomy-augmented embodiments, caching strategy manager 630 implements experiential criteria alongside geometric and semantic criteria for cache management. Thoughts with rich, diverse holonomy descriptor sets 270 indicating significant experiential context may be preferentially cached even if their semantic access frequency is moderate. Caching strategy manager 630 coordinates with holonomy state manager 136 to implement holonomy-aware indexing where thoughts can be retrieved not just by semantic similarity but by experiential similarity, finding thoughts that were approached through similar holonomies even if their semantic content differs. For instance, when a user requests information about applying a cautious, well-validated approach to a new problem, caching strategy manager 630 can retrieve thoughts that were developed under conservative, success-oriented holonomies, regardless of their specific semantic domain.

Caching strategy manager 630 implements compression strategies where cached thoughts may be compressed or abstracted over time to reduce redundancy and support scalable reuse. It determines optimal compression levels by balancing storage efficiency with retrieval fidelity, identifies opportunities for thought generalization where multiple similar thoughts can be replaced by a single abstraction, and manages the distribution of thoughts across cache tiers based on access patterns and semantic importance. In holonomy-augmented systems, compression strategies extend to holonomy consolidation where multiple similar holonomies across different cached thoughts are identified for equivalence-based merging through holonomy supervisor 135. The component also implements predictive caching strategies that anticipate future needs based on observed cognitive patterns and preemptively adjust cache contents to optimize for expected usage, including holonomy-conditioned prediction where the system anticipates which experiential contexts will be relevant based on current task characteristics.

A federated coordinator 650 enables knowledge sharing and synchronization across multiple PCM instances while maintaining privacy and semantic integrity. Federated coordinator 650 implements geometric abstraction protocols that allow thoughts to be shared at appropriate levels of generalization, ensuring that instance-specific details remain private while valuable patterns propagate across the federation. Federated coordinator 650 manages the complex challenges of cross-instance memory coordination including aligning geometric structures from different manifolds that may have evolved independently, determining appropriate abstraction levels for shared thoughts to balance utility with privacy, and handling conflicts when different instances have developed incompatible representations of similar concepts.

In holonomy-augmented embodiments, federated coordinator 650 extends its coordination responsibilities to include holonomy sharing across PCM instances. This component implements holonomy abstraction protocols that enable experiential patterns to be shared at appropriate generalization levels-specific instance-dependent holonomies encoding personal user preferences remain local, while general experiential patterns like "successful constraint handling in optimization problems" or "effective exploratory strategies for novel domains" can be shared across instances. Federated coordinator 650 coordinates with holonomy supervisor 135 to identify which holonomies encode generalizable experiential wisdom versus which are instance-specific, implementing privacy-preserving holonomy projection that shares the behavioral effects of experiential patterns without exposing the specific trajectories or personal contexts that generated them.

Federated coordinator 650 implements consensus mechanisms that respect local geometric and experiential structures while enabling global knowledge emergence, using techniques such as curvature matching to identify compatible regions across manifolds, bundle projection to map local structures into shared space, and distributed evolution protocols that allow federated improvements to propagate back to local instances. In holonomy-augmented systems, these mechanisms extend to holonomy alignment where federated coordinator 650 identifies cases where different instances have developed similar holonomies independently, triggering consolidation that strengthens shared experiential patterns while preserving instance-specific variations. This enables federated learning of both semantic content and experiential strategies, allowing PCM instances to collectively discover which approaches work well for different types of tasks.

A memory evolution manager 660 orchestrates the various mechanisms through which persistent memory structures adapt and improve over time. Memory evolution manager 660 implements a plurality of evolution mechanisms that shape the long-term development of the memory system. Reinforcement operations strengthen frequently used thoughts and paths by increasing local curvature around valuable structures, tightening geodesic connections between related concepts, and enhancing the stability of successful reasoning patterns. Compression operations identify and merge redundant or highly similar structures, implementing the latent recombinator functionality to blend similar thoughts or trajectories into unified abstractions while preserving essential distinctions. Abstraction operations extract higher-level patterns from collections of specific instances, creating generalized thoughts that capture core principles while enabling broader application across contexts. Forgetting operations, coordinated with decay manager 620, ensure that memory evolution includes not just growth but also selective pruning that maintains system efficiency and relevance.

In holonomy-augmented embodiments, memory evolution manager 660 coordinates holonomy evolution alongside semantic memory evolution. Reinforcement operations extend to holonomy consolidation where repeatedly successful experiential patterns are promoted from transient to consolidated lifecycle states through holonomy supervisor 135. Compression operations include holonomy merging where memory evolution manager 660 identifies redundant holonomies across different cached thoughts and triggers equivalence-based consolidation. Abstraction operations extract meta-holonomies that capture general experiential strategies from collections of specific holonomy instances—for example, identifying that successful problem-solving across multiple domains consistently involved initial exploratory holonomies followed by consolidation under success-oriented holonomies, creating an abstracted experiential template. Forgetting operations include holonomy export where memory evolution manager 660 works with decay manager 620 and holonomy supervisor 135 to irreversibly export accumulated negative holonomies to residual export regions 293, migrating their constraints into implicit manifold structure.

Memory evolution manager 660 implements these operations according to sophisticated scheduling algorithms that balance immediate system needs with long-term optimization goals, ensuring that memory evolution enhances rather than disrupts ongoing cognitive operations. In holonomy-augmented systems, these scheduling algorithms account for coupled evolution dynamics where semantic memory changes trigger holonomy refinement and vice versa, maintaining coherence between what the system knows and how it interprets and applies that knowledge based on accumulated experience.

The components create a persistent memory system that transcends traditional storage paradigms. Geometric structure preserver 600 maintains the rich relationships between thoughts and their experiential contexts, activation energy tracker 610 and decay manager 620 implement natural memory dynamics for both semantic and experiential structures, manifold interface 640 enables integration of geometric and holonomic information with active cognition, caching strategy manager 630 optimizes for efficiency and both semantic and experiential value, federated coordinator 650 enables collective intelligence while preserving privacy across semantic and experiential dimensions, and memory evolution manager 660 ensures continuous improvement through use of both content and experiential strategies. In holonomy-augmented embodiments, this architecture implements structured memory where thoughts are stored not as flat vectors but as positions or paths within an evolving manifold paired with experiential contexts encoded as holonomy descriptors, supporting context-sensitive access, memory reinforcement through traversal, lawful pruning of both content and experience, and dynamic generalization that preserves not just what was learned but how learning occurred. The result is a memory system that doesn't merely store information but actively participates in the cognitive process, shaping and being shaped by the ongoing evolution of thought and experience within the geometric and experiential substrate of the Persistent Cognitive Machine.

Figure 7:
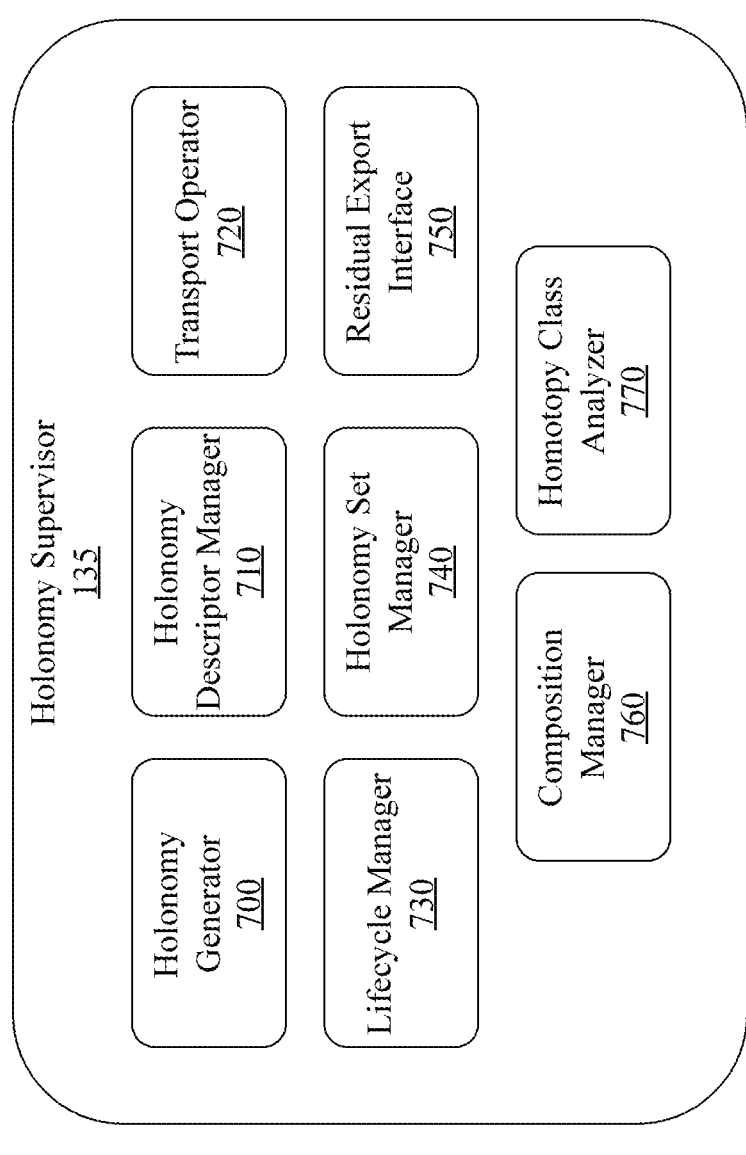
FIG. 7 is a block diagram illustrating an exemplary architecture of a component within a Persistent Cognitive Machine (PCM), a holonomy supervisor.

FIG. 7 is a block diagram illustrating an exemplary architecture of a component within a Persistent Cognitive Machine (PCM), a holonomy supervisor. Operating as the central processor for experiential memory within the holonomy-augmented PCM architecture, holonomy supervisor 135 generates, manages, and evolves holonomy descriptors that encode accumulated path-dependent effects of prior traversal through latent manifold 160. This component addresses the fundamental limitation of location-only cognitive state representation by implementing a two-component state structure where cognitive states comprise both manifold position and experiential context. Holonomy supervisor 135 transforms the theoretical concept of path-dependent transport into practical computational mechanisms that enable the system to distinguish identical geometric configurations reached through different experiential histories, supporting deeper contextual understanding, learning from both successes and failures, and adaptation to tasks where interaction history shapes appropriate responses.

A holonomy generator 700 implements the initial phase of experiential memory formation by detecting traversal events that trigger holonomy creation and constructing local holonomy generators that encode transport deformation. This component continuously monitors cognitive activity as attention flows through latent manifold 160, coordinating with cognitive dynamics engine 130 to identify significant events including prediction errors exceeding threshold values where anticipated semantic content differs from encountered content, constraint boundary encounters where traversal reaches the edge of admissible regions within the manifold, stabilization events where geodesic paths converge or reach equilibrium configurations, and interface mismatches where transitions between thought bundles 200 produce residual inconsistencies. When such events occur, holonomy generator 700 constructs a local generator $G_i$ that encodes how the transport operator along the associated path segment differs from baseline parallel transport defined by the manifold's connection.

Holonomy generator 700 implements multiple generator construction strategies tailored to different event types. For prediction errors, it constructs generators that encode the discrepancy between expected and actual semantic neighborhoods, creating transport effects that bias future predictions based on observed deviations. For constraint encounters, it generates holonomies that encode the boundary structure and the forces that prevented further traversal, establishing transport deformation that influences future attempts to approach similar constraints. For stabilization events, holonomy generator 700 creates generators that encode the local attractor structure, capturing the geometric basin that drew attention toward stability. The component calibrates generator strength based on event magnitude—larger prediction errors or more severe constraint violations produce stronger generators that have greater influence on future traversal, while minor perturbations create weak generators that may fade if not reinforced.

Holonomy generator 700 coordinates with curvature computer 310 within cognitive dynamics engine 130 to ensure that generated holonomies properly account for the manifold's local geometric structure. The component distinguishes between deformations genuinely arising from experiential events versus those merely reflecting the manifold's intrinsic curvature, ensuring that holonomies encode path-dependent effects that cannot be absorbed into the geometric structure alone. For instance, encountering high compression pressure field 210 values is a geometric property not requiring holonomy generation, but experiencing unexpected difficulty traversing a region despite low indicated pressure would trigger holonomy generation encoding the discovered traversal resistance.

A holonomy descriptor manager 710 oversees the lifecycle and organization of holonomy descriptors from their initial creation through consolidation, maintenance, and eventual removal. This component implements sophisticated tracking mechanisms that monitor holonomy maturity, usage patterns, reinforcement history, and behavioral impact. Holonomy descriptor manager 710 maintains metadata for each holonomy including creation context describing the manifold location and event type that generated the holonomy, composition history tracking the sequence of generators that were combined to form consolidated descriptors, activation statistics recording how frequently and successfully the holonomy has been activated during reasoning, and lifecycle state 291 indicating whether the holonomy is transient, consolidated, decaying, or exported.

When a new holonomy generator is created by holonomy generator 700, holonomy descriptor manager 710 initially marks it as transient and monitors its subsequent activation. Transient holonomies influence immediate reasoning but are not yet committed to long-term storage. If the same experiential pattern recurs, indicated by consistent reinforcement through improved prediction accuracy, successful goal satisfaction by goal manager 120, or repeated activation in similar contexts, holonomy descriptor manager 710 initiates consolidation. During consolidation, the manager coordinates with composition manager 760 to merge multiple related generators, with holonomy set manager 740 to promote the descriptor into the bounded holonomy set at the appropriate manifold location, and with persistent memory manager 170 to ensure the consolidated holonomy is preserved in long-term storage.

Holonomy descriptor manager 710 implements temporal tracking that monitors holonomy inactivity. Consolidated holonomies that remain dormant over extended periods are transitioned to decaying lifecycle state, with progressive reduction in their influence weights and activation likelihood. The manager coordinates with decay manager 620 in persistent memory manager 170 to ensure that holonomy decay parallels thought decay, maintaining coherence between semantic and experiential memory structures. When holonomies decay below relevance thresholds or when equivalence detection by homotopy class analyzer 770 reveals redundancies, holonomy descriptor manager 710 initiates pruning. The manager also handles holonomy export decisions, identifying holonomies exhibiting unresolvable mismatch or incompatibility with evolved manifold structure and coordinating with residual export interface 750 to irreversibly remove them while preserving their constraint effects.

A transport operator 720 implements the mathematical machinery for computing how holonomies modify traversal behavior during cognitive dynamics. This component transforms abstract holonomy descriptors into concrete modifications of the transport operator that governs how attention, semantic structures, and reasoning patterns are parallel transported along paths through latent manifold 160. Transport operator 720 coordinates with geodesic solver 320 and flow computer 330 within cognitive dynamics engine 130 to implement holonomy-sensitive traversal where path optimization and attention flow depend jointly on geometric structure and active experiential context.

Transport operator 720 computes the modified force term $F^k(x, H)$ in the holonomy-augmented geodesic equation: $d^2 x^k/d\tau^2 + \Gamma^k_{ij}(dx^i/d\tau)(dx^i/d\tau) = F^k(x, H)$, where H represents the active holonomy descriptor and $F^k$ depends jointly on manifold location x and experiential context H. This computation accounts for multiple holonomic effects including traversal biasing where holonomies encoding successful prior paths reduce traversal cost in similar directions, constraint reinforcement where holonomies encoding encountered boundaries strengthen barriers against similar future attempts, and prediction modulation where holonomies adjust expected semantic neighborhoods based on prior discrepancies. The operator implements these effects through modifications to the effective potential field experienced during traversal, creating holonomy-dependent landscapes where the same geometric path appears more or less costly depending on active experiential context.

Transport operator 720 also implements holonomy-dependent attention flow for flow computer 330, modifying the attention vector field evolution equation: $\partial A/\partial t + \nabla\_A A = -\nabla(P - \Phi + H)$, where the holonomy term H creates forces arising from active holonomy descriptors. This enables attention to flow differently through identical geometric configurations based on experiential context, supporting experience-dependent reasoning strategies at fixed manifold locations. Transport operator 720 employs efficient computational methods including precomputed holonomy kernels for common experiential patterns, incremental updates when holonomies are modified or activated, and caching of transport effects for frequently traversed paths under specific holonomies.

A lifecycle manager 730 orchestrates the progression of holonomies through their natural maturation cycle from transient generation through consolidation, maintenance, decay, and eventual export or pruning. This component implements the temporal dynamics of experiential memory, ensuring that holonomy structures evolve in ways that preserve behaviorally relevant patterns while respecting capacity constraints. Lifecycle manager 730 coordinates the activities of multiple specialized subcomponents that handle different lifecycle phases.

During the consolidation phase, lifecycle manager 730 evaluates transient holonomies for promotion to consolidated status based on reinforcement criteria. These criteria include repetition frequency where experiential patterns recurring across multiple reasoning episodes demonstrate robustness, prediction improvement where holonomies that consistently enhance semantic prediction accuracy indicate valuable learned patterns, goal contribution where holonomies associated with successful goal achievement by goal manager 120 prove instrumentally useful, and stability under perturbation where holonomies that remain coherent when thought perturbator 400 in dream manager 140 applies stochastic variations demonstrate structural soundness. Lifecycle manager 730 implements probabilistic consolidation decisions where reinforcement evidence accumulates over time, eventually crossing thresholds that trigger promotion from transient to consolidated state.

During the maintenance phase, lifecycle manager 730 monitors consolidated holonomies to ensure they remain relevant and compatible with evolving manifold structure. The component tracks activation patterns, evaluating whether holonomies continue to be accessed during reasoning and whether their activation correlates with successful outcomes. It assesses geometric compatibility, determining whether holonomies remain properly calibrated to current manifold geometry managed by geometry manager 300 or require recalibration following significant manifold evolution. Lifecycle manager 730 also implements conflict resolution when multiple holonomies at the same location yield contradictory transport effects, either refining the descriptors to resolve inconsistencies or marking conflicting holonomies for potential pruning.

During the decay phase, lifecycle manager 730 applies temporal dissipation to inactive holonomies, implementing decay dynamics that parallel the thermodynamic forgetting in persistent memory manager 170. Decay rates may be modulated based on holonomy characteristics-holonomies encoding foundational experiential patterns like successful constraint handling may decay more slowly than holonomies encoding specific situational responses. The manager progressively reduces holonomy influence weights during decay, ensuring that fading experiential patterns lose their impact on reasoning gradually rather than abruptly, maintaining cognitive stability during memory evolution.

During the export phase, lifecycle manager 730 coordinates with residual export interface 750 to irreversibly remove holonomies that have become incompatible, redundant, or persistently inactive. Rather than simple deletion, export involves migrating the holonomy's constraint effects into the manifold's structural properties, enabling learned lessons to persist as geometric features without requiring explicit holonomy representation. Lifecycle manager 730 determines which holonomies are candidates for export versus simple pruning based on their historical impact-holonomies that consistently prevented failures may be exported to create permanent traversal constraints, while holonomies that merely encoded transient preferences may be pruned without structural migration.

A holonomy set manager 740 maintains the bounded collections of holonomy descriptors associated with each manifold location, implementing the fundamental data structure that enables multiple distinct cognitive states to coexist at identical geometric positions. This component manages holonomy descriptor set 270 distributed across latent manifold 160, ensuring that each location maintains an appropriately sized set of experientially distinct holonomies while respecting global capacity constraints. Holonomy set manager 740 implements sophisticated algorithms for set composition, equivalence detection, capacity management, and activation control.

When composition manager 760 creates a new consolidated holonomy descriptor, holonomy set manager 740 determines the appropriate manifold location for insertion based on where the accumulated generators were composed. The manager evaluates whether the new holonomy represents a genuinely distinct experiential class or is equivalent to existing descriptors at that location, coordinating with homotopy class analyzer 770 for equivalence assessment. If distinct, holonomy set manager 740 adds the descriptor to the location's holonomy set, creating a new element in the bounded collection $H_x$ at location x. If the set is at capacity—typically containing between 3 and 10 holonomies depending on the location's cognitive richness—the manager must make room through merging or pruning operations.

Holonomy set manager 740 implements capacity management strategies that balance preserving experiential diversity against maintaining bounded memory requirements. When capacity limits are reached, the manager evaluates holonomies based on multiple criteria including activation frequency indicating which holonomies are regularly used during reasoning, outcome success measuring which holonomies correlate with goal achievement, uniqueness assessing how distinct each holonomy's behavioral impact is from others in the set, and structural importance evaluating whether holonomies encode foundational experiential patterns. Based on this evaluation, holonomy set manager 740 may merge the least distinct holonomies through equivalence-based consolidation, prune the lowest-value holonomy to make room for the new descriptor, or reject insertion of the new holonomy if it provides insufficient additional value.

The manager coordinates closely with holonomy state manager 136 to implement activation control over holonomy sets. At any moment, a subset of holonomies in each set may be active, directly influencing traversal decisions and predictions through transport operator 720, while others remain dormant but available for activation if context changes. Holonomy set manager 740 maintains activation weights for each holonomy in each set, dynamically adjusting these weights based on contextual alignment with current goals, recent activation success, and compatibility with incoming observations. These weights determine which holonomies influence cognitive dynamics most strongly and guide holonomy state manager 136 in selecting appropriate experiential contexts for different reasoning scenarios.

A residual export interface 750 handles the irreversible export of holonomy descriptors whose effects should persist as structural constraints within latent manifold 160 without retaining explicit holonomy representations. This component implements a sophisticated process of constraint migration where experiential lessons encoded in holonomies are transformed into geometric properties of the manifold itself, creating residual export regions 293 that modify traversal admissibility without requiring explicit memory of the specific experiences that generated the constraints.

Residual export interface 750 receives export requests from lifecycle manager 730 for holonomies meeting export criteria, typically including holonomies encoding consistently negative outcomes where repeated traversal attempts through certain paths have led to failures or destabilization, holonomies exhibiting unresolvable incompatibility with evolved manifold structure where the experiential patterns conflict with current geometric organization, and holonomies encoding fundamental learned constraints that should shape future behavior regardless of specific memory of their origin. When export is triggered, residual export interface 750 analyzes the holonomy to extract its essential constraint structure-what paths or transitions the holonomy prevents, what regions it discourages traversal through, and what behavioral patterns it reinforces or suppresses.

The interface then coordinates with geometry manager 300 and curvature computer 310 in cognitive dynamics engine 130 to determine how these constraints can be encoded into manifold geometry. Export strategies include curvature modification where regions associated with negative holonomies receive increased compression pressure field 210 values, effectively creating implicit traversal penalties without explicit holonomy representation, metric adjustment where the manifold's metric tensor is modified to increase distances along paths that holonomies consistently marked as problematic, connection modification where the parallel transport structure is adjusted to reflect learned constraint patterns, and admissibility barriers where exported holonomies create hard or soft constraints on which trajectories are considered valid by geodesic solver 320.

Residual export interface 750 implements export operations carefully to maintain global geometric consistency. The component employs diffusion algorithms that spread constraint effects smoothly across manifold regions, preventing sharp discontinuities that could destabilize reasoning. It maintains export logs tracking which regions have been affected by holonomy export, enabling analysis of how accumulated experience has shaped manifold structure. The interface also implements partial export mechanisms where some aspects of a holonomy are migrated to geometric structure while other aspects remain as explicit descriptors, enabling hybrid encoding that balances the compression benefits of structural encoding with the flexibility of explicit representation.

Residual export interface 750 ensures that export is irreversible, once holonomies are exported and their effects absorbed into manifold structure, the system cannot recover the specific experiential histories that generated those constraints. This irreversibility implements a form of committed learning where repeated negative outcomes create permanent structural modifications that guide future cognition. The interface coordinates with persistent memory manager 170 to ensure that exported holonomies are properly removed from long-term storage while their structural effects are preserved in the evolved manifold geometry.

A composition manager 760 implements the mathematical operations for combining multiple holonomy generators into consolidated holonomy descriptors through ordered composition. This component handles the non-commutative algebra of holonomy composition, ensuring that experiential effects accumulate properly along trajectories while respecting the path-dependent nature of experiential memory. Composition manager 760 receives sequences of local generators from holonomy generator 700 corresponding to segments of traversed paths and produces consolidated descriptors that capture the accumulated transport deformation.

The fundamental composition operation implements the ordered product $H(\gamma) = G_n{}^\circ \ldots . G_2{}^\circ G_1$ for a path $\gamma$ composed of segments with generators $G_1, G_2, \ldots, G_n$. Composition manager 760 implements this operation through matrix multiplication in appropriate representation spaces, group operation on abstract holonomy groups, or functional composition for holonomies represented as transport operators. The non-commutativity of composition—where $G_i{}^\circ G_j$ generally differs from $G_j{}^\circ G_i$—is essential for capturing realistic experiential effects where encountering the same events in different orders produces different outcomes.

Composition manager 760 implements intelligent composition strategies beyond naive sequential multiplication. For long trajectories with many generators, the component applies incremental composition where generators are progressively combined as they are created, avoiding the accumulation of long generator sequences that could become computationally expensive. It implements compression during composition where similar consecutive generators are merged to reduce representational complexity while preserving behavioral effects. The manager also handles generator cancellation where certain generator sequences effectively neutralize each other, indicating that experiential effects along one segment were undone by subsequent traversal.

When holonomy descriptor manager 710 requests consolidation of transient holonomies into persistent descriptors, composition manager 760 analyzes whether multiple independent generator sequences have produced similar accumulated effects. If trajectories $\gamma_1$ and $\gamma_2$ yield holonomies $H(\gamma_1)$ and $H(\gamma_2)$ that induce equivalent transport behavior, composition manager 760 signals equivalence to homotopy class analyzer 770 for potential consolidation. The component also implements inverse operations where composition manager 760 can decompose consolidated holonomies into constituent generators when needed for analysis or refinement, enabling the system to understand which specific experiential events contributed most significantly to accumulated effects.

A homotopy class analyzer 770 determines equivalence relationships between holonomy descriptors and trajectories based on their homotopy classes within latent manifold 160. This component implements sophisticated topological analysis that goes beyond simple holonomy comparison to understand the deeper equivalence structure of experiential patterns. Homotopy class analyzer 770 enables the system to recognize when different experiential histories are fundamentally equivalent in their behavioral effects, supporting equivalence-based consolidation that reduces representational complexity while preserving semantic distinctions.

The analyzer implements homotopy class computation by examining the topological properties of trajectories through the manifold. Two paths $\gamma_1$ and $\gamma_2$ belong to the same homotopy class if one can be continuously deformed into the other without leaving the manifold or crossing inadmissible regions created by residual export regions 293. Homotopy class analyzer 770 computes class membership by analyzing which topological features each trajectory engages which holes in the manifold are circled, which constraint boundaries are crossed, which handles or bridges are traversed. The component maintains a registry of identified homotopy classes across the manifold, tracking the characteristic holonomy associated with each class and the behavioral patterns that class represents.

Homotopy class analyzer 770 recognizes that trajectories in the same homotopy class should yield equivalent holonomies even if their specific paths differ. When composition manager 760 presents two holonomy descriptors for comparison, homotopy class analyzer 770 evaluates whether they belong to the same homotopy class by comparing their effects on transport, their topological properties, and their behavioral outcomes. If descriptors are determined to be homotopically equivalent, the analyzer signals holonomy set manager 740 and holonomy descriptor manager 710 to merge them, consolidating what are essentially redundant representations of the same experiential pattern.

Homotopy class analyzer 770 also provides analysis capabilities for dream manager 140 during manifold reorganization. When thought recombinator 410 explores potential connections between distant regions, the analyzer evaluates the homotopy classes that would be created by establishing new topological features, predicting what experiential patterns might emerge. When topological operation manager 430 modifies manifold topology, homotopy class analyzer 770 recomputes affected homotopy classes and coordinates with holonomy descriptor manager 710 to update holonomy descriptors that may require reinterpretation under the changed topology. The component enables the PCM to maintain a principled understanding of experiential equivalence grounded in the manifold's topological structure rather than relying on ad-hoc similarity measures.

The components within holonomy supervisor 135 create a system for experiential memory that transcends simple history storage. Holonomy generator 700 captures local transport deformations from traversal events, holonomy descriptor manager 710 orchestrates the lifecycle of expeririential patterns from transient generation through consolidation to eventual export, transport operator 720 implements the mathematical machinery for holonomy-sensitive traversal, lifecycle manager 730 ensures appropriate temporal evolution of experiential memory, holonomy set manager 740 maintains bounded collections enabling multiple experiential contexts at each manifold location, residual export interface 750 migrates accumulated constraints into structural properties when explicit representation is no longer needed, composition manager 760 handles the non-commutative algebra of holonomy accumulation, and homotopy class analyzer 770 provides principled equivalence assessment grounded in topological structure. Together, these components enable the PCM to implement the two-component state representation $S=(x, H_x)$ that distinguishes cognitive states based on both position and experiential history, supporting reasoning that depends on how situations were reached rather than just what situations are encountered. This architecture transforms experiential memory from stored trajectories or episodic buffers into a compressed, scalable representation of path-dependent effects that shapes cognition through accumulated wisdom while respecting finite capacity constraints.

Figure 8:
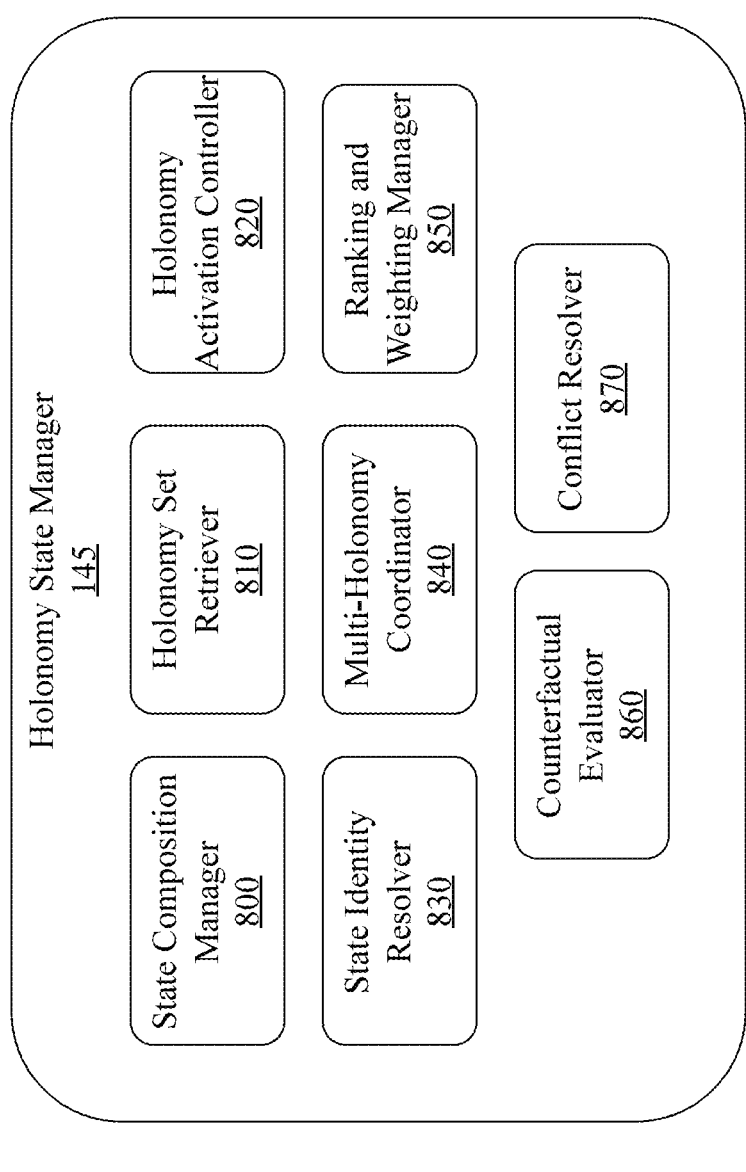
FIG. 8 is a block diagram illustrating an exemplary architecture of a component within a Persistent Cognitive Machine (PCM), a holonomy set manager.

FIG. 8 is a block diagram illustrating an exemplary architecture of a component within a Persistent Cognitive Machine (PCM), a holonomy set manager. Serving as the interface between holonomy supervisor 135 and the broader cognitive system, holonomy state manager 136 manages the representation, activation, and utilization of holonomy-augmented cognitive states throughout the PCM's operation. This component implements the fundamental two-component state structure $S=(x, H_x)$ that enables the system to escape location-only cognitive representations, coordinating manifold position with experiential context to support reasoning that depends jointly on where the system is in semantic space and how it arrived there. Holonomy state manager 136 transforms the abstract concept of holonomy-augmented states into practical mechanisms for state retrieval, activation control, counterfactual reasoning, and experientially-informed decision making.

A state composition manager 800 implements the fundamental operation of constructing holonomy-augmented cognitive states by combining manifold location information with associated holonomy descriptors. This component serves as the primary interface for creating and maintaining the composite state structure that distinguishes the holonomy-augmented architecture from traditional location-only systems. State composition manager 800 receives location information from cognitive dynamics engine 130 indicating the current position x within latent manifold 160, and coordinates with holonomy set retriever 810 to obtain the bounded collection $H_x$ of holonomy descriptors from holonomy descriptor set 270 at that location, producing the complete state representation $S=(x, H_x)$.

State composition manager 800 implements multiple composition strategies for different cognitive scenarios. During standard forward reasoning, it performs sequential composition where states evolve along trajectories through continuous updates of both location and active holonomies. As encoder 110 projects new inputs into the manifold, state composition manager 800 determines not just which location to visit but which holonomies from the location's set should be activated based on contextual alignment with the input's characteristics. During retrieval operations initiated by thought value calculator 260 or persistent memory manager 170, the component reconstructs historical states by combining cached locations with their associated experiential contexts, enabling the system to recover not just what was thought about but how it was approached.

The component handles state representation at multiple granularities. At the fine-grained level, it maintains the complete state including position x, the full holonomy set $H_x$, the subset of active holonomies, and individual activation weights for each holonomy. At the coarse-grained level useful for efficient computation, state composition manager 800 produces summary representations that capture the dominant experiential context through weighted averages or representative holonomies. The manager implements efficient state caching to avoid repeatedly reconstructing identical state compositions, maintaining a working memory of recently composed states that can be quickly retrieved when attention revisits familiar configurations.

State composition manager 800 coordinates extensively with other holonomy state manager 136 components to ensure state compositions remain consistent and meaningful. It validates that composed states are coherent, verifying that activated holonomies are compatible with the manifold location's semantic content and that multiple activated holonomies do not create unresolvable conflicts. When state identity resolver 830 determines that a composed state matches a previously encountered configuration, state composition manager 800 retrieves historical information about outcomes and modifications associated with that state. The component also implements state persistence protocols, coordinating with persistent memory manager 170 through manifold interface 640 to ensure that composed states can be stored and later reconstructed with full fidelity.

A holonomy set retriever 810 implements efficient mechanisms for accessing the bounded collections of holonomy descriptors maintained at each manifold location. This component serves as the data access layer for holonomy descriptor set 270 distributed across latent manifold 160, providing rapid retrieval of experiential contexts associated with any location while maintaining consistency with the holonomy structures managed by holonomy supervisor 135. Holonomy set retriever 810 employs sophisticated indexing and caching strategies to ensure that holonomy access does not create computational bottlenecks during time-critical reasoning operations.

The retriever implements location-based indexing where holonomy sets are organized by their associated manifold positions, enabling rapid lookup when attention reaches a new location. Holonomy set retriever 810 maintains spatial indexes that exploit the manifold's geometric structure, allowing efficient retrieval of holonomy sets not just at exact locations but also within neighborhoods or along anticipated trajectories. For frequently accessed regions such as the cores of major thought bundles 200, the component implements aggressive caching where holonomy sets are preloaded into fast memory, eliminating retrieval latency during active reasoning. For less frequently accessed regions, holonomy set retriever 810 employs on-demand loading with predictive prefetching based on observed attention flow patterns.

Holonomy set retriever 810 coordinates with holonomy set manager 740 in holonomy supervisor 135 to maintain consistency when holonomy sets are modified. When lifecycle manager 730 consolidates transient holonomies into persistent descriptors or when composition manager 760 creates new holonomies, the retriever's indexes are updated to reflect the changes. The component implements versioning mechanisms that handle concurrent access scenarios where cognitive dynamics engine 130 may be reading holonomy sets while holonomy supervisor 135 is modifying them, ensuring that reasoning operates on consistent snapshots of experiential structures.

The retriever also implements query capabilities beyond simple location-based lookup. When goal manager 120 or other components need to find locations with specific experiential characteristics, holonomy set retriever 810 can search for manifold positions whose holonomy sets match specified criteria, for example, finding locations where success-oriented holonomies are well-established, where exploratory holonomies dominate, or where experiential diversity is particularly rich. This enables experientially-informed navigation where the system can deliberately seek out regions with favorable experiential contexts for specific tasks.

A holonomy activation controller 820 manages which holonomies within each set are currently active and influencing cognitive dynamics. This component implements the transition between dormant holonomies that exist in holonomy descriptor set 270 but do not affect reasoning and active holonomies that directly influence traversal, prediction, and decision-making through transport operator 720. Holonomy activation controller 820 serves as the dynamic switch that enables the system to fluidly change experiential contexts at fixed manifold locations, supporting counterfactual reasoning, adaptive strategy selection, and experientially-conditioned inference.

The controller maintains activation state for each holonomy in each set across the manifold, tracking which holonomies are currently active, which are dormant but ready for activation, and which are inhibited or unavailable due to contextual incompatibility. Holonomy activation controller 820 implements activation policies based on multiple input signals including explicit activation requests from counterfactual evaluator 860 during "what if" scenario analysis, contextual activation where incoming observations from encoder 110 trigger holonomies that match experiential patterns, goal-driven activation where goal manager 120 modulates activation to favor holonomies that have historically supported goal achievement, and conflict-driven activation where conflict resolver 870 switches holonomies to resolve experiential inconsistencies.

The activation process itself involves smooth transitions rather than binary switches. Holonomy activation controller 820 implements graded activation where holonomies can be partially active with varying influence weights, enabling soft blending of multiple experiential contexts. The controller computes activation gradients that specify how activation levels should change over time or as attention moves through the manifold, creating smooth experiential transitions that maintain cognitive continuity. For instance, when transitioning from a region where cautious, conservative holonomies are appropriate to a region requiring exploratory, innovative holonomies, the controller orchestrates a gradual crossfade rather than an abrupt switch.

Holonomy activation controller 820 coordinates with transport operator 720 to ensure that activated holonomies properly influence cognitive dynamics. When activation states change, the controller signals the transport operator to update force calculations in the geodesic equation and attention flow dynamics, ensuring that reasoning immediately reflects the new experiential context. The component implements efficient activation update mechanisms that minimize computational overhead, using differential updates that adjust only the changed holonomies rather than recomputing all transport effects. The controller also implements activation history tracking, maintaining logs of which holonomies were active during different reasoning phases, enabling later analysis of how experiential context influenced outcomes.

A state identity resolver 830 determines whether a given holonomy-augmented cognitive state S=(x, H$_x$) with active holonomy H matches previously encountered states, enabling recognition and retrieval of historical context. This component addresses the question "Have we been in this situation before?" where "situation" encompasses both semantic content (location x) and experiential context (active holonomy H). State identity resolver 830 implements sophisticated matching algorithms that account for the tolerance and uncertainty inherent in continuous geometric and experiential spaces, supporting partial matches, similarity-based retrieval, and context-sensitive identity assessment.

The resolver implements multi-level identity checking that progresses from coarse to fine granularity. At the coarsest level, it checks location identity by evaluating whether the current manifold position x is within a tolerance threshold of any previously visited location, using geometric distance measures that respect the manifold's metric tensor. At intermediate granularity, state identity resolver 830 evaluates holonomy set similarity by comparing the bounded collection H$_x$ at the current location with holonomy sets encountered at historically visited nearby locations, assessing whether the available experiential contexts overlap significantly. At the finest level, the resolver checks complete state identity by evaluating whether the combination of current location x, available holonomy set H$_x$, and specific active holonomy H matches a previously encountered state configuration.

State identity resolver 830 implements efficient matching through hierarchical indexing structures. Location-based spatial indexes enable rapid identification of historically visited neighborhoods, holonomy signature hashes provide quick rejection of clearly distinct experiential contexts, and detailed comparison algorithms confirm matches when preliminary checks suggest similarity. The component maintains a state visitation history that records representative states encountered during reasoning, along with metadata about outcomes, modifications made, and contextual factors that influenced state evolution. This history enables the resolver to provide rich contextual information when matches are found—not just "yes, we've been here before" but "yes, and here's what happened last time, what we learned, and how we modified our approach."

The resolver coordinates with persistent memory manager 170 to access long-term state history extending beyond current session boundaries. When state identity resolver 830 determines that a current state matches a historical configuration stored in persistent memory, it retrieves associated information including previous reasoning paths taken from this state, outcomes achieved, holonomy modifications that occurred, and reinforcement signals that updated activation weights. This retrieval enables the system to benefit from past experience when encountering familiar state configurations, applying learned lessons without requiring explicit replay of previous reasoning episodes.

State identity resolver 830 also implements approximate matching capabilities for recognizing analogous states. When exact matches are not found, the resolver can identify states that are similar in structure even if different in specific content—for example, recognizing that a current state about applying optimization to a new domain shares structural similarity with a historical state about optimization in a different domain, enabling transfer of experiential patterns across contexts.

A multi-holonomy coordinator 840 manages scenarios where multiple holonomies are simultaneously active at a location, orchestrating their combined influence on cognitive dynamics. This component addresses the complexity that arises when experiential contexts do not neatly separate but instead overlap, blend, or compete for influence. Multi-holonomy coordinator 840 implements coordination strategies ranging from simple weighted averaging to sophisticated conflict resolution and synergistic combination, ensuring that multiple experiential contexts can coexist productively rather than creating inconsistent or chaotic reasoning behavior. The coordinator implements several coordination modes for different scenarios. In blending mode, multiple compatible holonomies are active simultaneously with their transport effects combined through weighted averaging or superposition. Multi-holonomy coordinator 840 computes combination weights based on activation strengths from holonomy activation controller 820, contextual relevance to current goals from goal manager 120, and historical success rates for holonomy combinations. The resulting blended transport operator creates reasoning behavior that draws from multiple experiential patterns, enabling nuanced responses that reflect complex experiential histories. For example, when approaching a problem requiring both caution and creativity, the coordinator might blend conservative holonomies encoding constraint awareness with exploratory holonomies encoding innovative search, producing reasoning that is adventurous yet mindful of boundaries.

In competition mode, multiple incompatible holonomies seek to influence reasoning in contradictory ways. Multi-holonomy coordinator 840 implements competitive dynamics where holonomies compete for activation dominance based on their alignment with current context and past success. The coordinator may allow competition to resolve naturally through differential reinforcement where the holonomy that produces better outcomes gains activation weight, or it may impose resolution through explicit selection by conflict resolver 870. Competition mode enables the system to discover through experience which experiential context is most appropriate for ambiguous situations that could be approached in multiple ways.

In sequential mode appropriate for long-horizon reasoning, multi-holonomy coordinator 840 orchestrates temporal activation patterns where different holonomies become active at different reasoning phases. The coordinator implements state machines or activation schedules that specify which experiential contexts should guide different stages of problem-solving. For instance, exploratory holonomies might dominate during initial problem analysis, transition to cautious holonomies during constraint identification, and finally activate success-oriented holonomies during solution implementation. Sequential coordination enables complex reasoning strategies that require different experiential approaches at different times.

Multi-holonomy coordinator 840 monitors coordination outcomes to assess whether multi-holonomy configurations are productive. When blended holonomies create synergistic effects where combined performance exceeds individual performance, the coordinator signals holonomy supervisor 135 to consider consolidating the combination into a new meta-holonomy that captures the beneficial interaction pattern. When competition between holonomies proves consistently detrimental, the coordinator triggers conflict resolution or holonomy refinement to eliminate unproductive experiential conflicts.

A ranking and weighting manager 850 assigns and dynamically updates relevance rankings and activation weights for holonomies within each set. This component implements the quantitative evaluation mechanisms that determine which experiential contexts should have strong versus weak influence on reasoning, supporting adaptive experiential memory where holonomy impact evolves based on observed effectiveness. Ranking and weighting manager 850 transforms qualitative assessments of experiential value into concrete numerical weights that guide holonomy activation controller 820 and influence decisions by multi-holonomy coordinator 840.

The manager computes holonomy rankings based on multiple performance dimensions. Activation success measures how frequently activating a holonomy leads to successful reasoning outcomes including goal achievement by goal manager 120, prediction accuracy improvements, and stable traversal through challenging manifold regions. Outcome quality assesses the value of results obtained when specific holonomies guided reasoning, distinguishing holonomies that lead to merely acceptable outcomes from those that enable exceptional performance. Contextual relevance evaluates how well each holonomy's experiential pattern matches current task characteristics, environmental conditions, and user preferences. Temporal recency tracks when holonomies were last successfully activated, favoring recently validated experiential patterns while allowing older patterns to fade if not reinforced.

Ranking and weighting manager 850 implements sophisticated weight update algorithms that balance multiple competing objectives. The component employs reinforcement learning principles where weights are adjusted based on reward signals derived from reasoning outcomes, with successful activations increasing weights and unsuccessful activations decreasing them. It implements momentum and decay terms that prevent weights from changing too rapidly based on individual experiences while ensuring that consistent patterns drive meaningful adaptation. The manager also implements diversity preservation mechanisms that maintain minimum activation probabilities for all holonomies to prevent premature convergence where a single dominant holonomy suppresses all alternatives.

Weight updates propagate through related structures beyond individual holonomies. When ranking and weighting manager 850 determines that a particular holonomy consistently succeeds in specific manifold regions, it may boost that holonomy's weights across the entire region rather than just at individual locations. Conversely, when holonomies prove ineffective across multiple locations, region-wide weight reductions implement spatial generalization of learned preferences. The manager coordinates with persistent memory manager 170 to ensure that learned weight patterns are preserved in long-term storage, enabling experiential preferences to accumulate across sessions.

Ranking and weighting manager 850 also implements explanation capabilities for understanding why particular holonomies are ranked highly. When decoder 180 generates outputs explaining reasoning strategies or when users query why certain approaches were taken, the manager provides interpretable descriptions of ranking factors-"This cautious approach was favored because similar situations have led to constraint violations in the past" or "Exploratory strategies are weighted highly here due to consistently discovering valuable novel connections."

A counterfactual evaluator 860 implements "what if" reasoning capabilities by temporarily activating alternative holonomies at fixed manifold locations and computing hypothetical outcomes. This component enables the PCM to perform experientially-grounded counterfactual analysis, answering questions like "What would happen if we approached this situation as we did in previous successful cases versus as we did in previous failures?" Counterfactual evaluator 860 transforms the theoretical possibility of multiple cognitive states at identical locations into practical reasoning capabilities for scenario comparison, strategy evaluation, and decision support.

The evaluator implements counterfactual analysis through controlled state manipulation. When a counterfactual query is received, either explicitly from user queries through user interface 101 or implicitly from goal manager 120 seeking to optimize strategy selection, counterfactual evaluator 860 identifies the current manifold location x and retrieves the holonomy set $H_x$ through holonomy set retriever 810. The component then systematically activates different holonomies from the set while holding location fixed, coordinating with holonomy activation controller 820 to switch experiential contexts without changing semantic position.

For each activated holonomy H, counterfactual evaluator 860 requests that geodesic solver 320 compute anticipated trajectories from the current state under that experiential context, that flow computer 330 simulate attention dynamics under the alternative holonomy, and that goal manager 120 evaluate expected goal satisfaction. The component collects predicted outcomes including likely next locations in the manifold, estimated traversal costs and compression pressures, predicted goal achievement probabilities, and anticipated interaction with constraints or boundaries. These predictions leverage transport operator 720's holonomy-dependent force calculations to generate genuinely distinct outcomes for different experiential contexts rather than merely computing the same path with minor variations.

Counterfactual evaluator 860 implements efficient evaluation strategies to avoid exhaustively testing all possible holonomies in a set. The component employs representative sampling where a subset of diverse holonomies are evaluated to span the range of available experiential contexts, pruning based on preliminary assessments where clearly inferior holonomies are rejected without full evaluation, and hierarchical evaluation where coarse comparisons narrow the candidate set before detailed trajectory computation. For scenarios requiring rapid decisions, the evaluator can provide approximate counterfactual assessments based on cached outcomes from similar historical states identified by state identity resolver 830.

The evaluator presents counterfactual results through multiple output formats. For quantitative comparison, counterfactual evaluator 860 generates tables or rankings showing predicted outcomes under each evaluated holonomy, highlighting differences in goal satisfaction, traversal efficiency, and risk profiles. For qualitative understanding, the component produces narrative explanations coordinating with decoder 180 to describe how different experiential contexts would shape reasoning differently, "Under the conservative approach, we would carefully verify each step, likely taking longer but reducing failure risk" versus "Under the exploratory approach, we would rapidly test multiple hypotheses, potentially discovering novel solutions but accepting higher uncertainty."

Counterfactual evaluator 860 coordinates with ranking and weighting manager 850 to ensure that counterfactual insights inform future holonomy preferences. When counterfactual analysis reveals that certain holonomies consistently predict better outcomes than the currently dominant holonomy, the evaluator signals weight updates to shift experiential preferences. This implements a form of mental simulation where the system can learn from hypothetical experiences without requiring actual execution of alternative strategies.

A conflict resolver 870 addresses situations where multiple active holonomies produce contradictory guidance or where a single holonomy creates internal inconsistencies. This component implements diagnostic and resolution mechanisms that identify experiential conflicts and apply corrective actions ranging from holonomy deactivation to refinement through holonomy supervisor 135. Conflict resolver 870 maintains reasoning coherence in the face of complex or incompatible experiential contexts, ensuring that holonomy-augmented states enhance rather than disrupt cognitive function.

The resolver detects conflicts through multiple monitoring mechanisms. Transport contradiction detection identifies cases where different active holonomies produce opposing forces in the geodesic equation, pulling attention in incompatible directions and preventing stable trajectory formation. Prediction inconsistency detection recognizes when holonomies generate contradictory semantic predictions about what concepts should be encountered along paths, indicating unresolved experiential confusion about manifold structure. Goal conflict detection coordinates with goal manager 120 to identify when holonomies preferentially attract toward incompatible goals, creating approach-avoidance dilemmas that prevent effective reasoning. Stability monitoring implemented through flow computer 330 detects when holonomy configurations create unstable attention dynamics with oscillations or chaotic behavior rather than smooth cognitive flow.

When conflicts are detected, conflict resolver 870 implements a hierarchy of resolution strategies. For minor conflicts, the component employs weight adjustment where multi-holonomy coordinator 840 rebalances activation weights to dampen contradictory influences while preserving the contributions of each holonomy. For moderate conflicts, the resolver implements selective deactivation where the less contextually relevant or historically successful holonomy is temporarily inhibited through holonomy activation controller 820, allowing the more appropriate experiential context to guide reasoning unimpeded. For severe conflicts indicating fundamental incompatibility, conflict resolver 870 triggers holonomy refinement by signaling lifecycle manager 730 in holonomy supervisor 135 that conflicting holonomies require analysis and potential splitting, merging, or export.

Conflict resolver 870 also implements learning mechanisms that prevent recurring conflicts. When specific holonomy combinations consistently create conflicts, the resolver establishes mutual inhibition relationships where activation of one holonomy automatically suppresses incompatible holonomies, preventing futile competition. When conflicts arise from holonomies that have become calibrated to outdated manifold geometry, the resolver coordinates with geometry manager 300 and holonomy descriptor manager 710 to recalibrate or retire obsolete experiential patterns. The component maintains conflict history logs that track which holonomy configurations proved problematic, enabling pattern analysis and proactive conflict avoidance.

In some embodiments, conflict resolver 870 presents conflicts to users through user interface 101 when automatic resolution is ambiguous or when conflicts reflect genuinely difficult trade-offs between experiential approaches. The component generates explanations of the conflict nature—"Conservative patterns from past failures suggest caution, while exploratory patterns from past successes suggest bold action"—and may request user guidance on which experiential context should prevail. This user interaction implements a form of experiential preference learning where the system gradually learns user values regarding risk tolerance, exploration versus exploitation balance, and other strategic dimensions.

The components within holonomy state manager 136 create a system for operationalizing holonomy-augmented cognitive states throughout the PCM's reasoning processes. State composition manager 800 constructs the fundamental two-component state structure, holonomy set retriever 810 provides efficient access to experiential contexts, holonomy activation controller 820 manages the dynamic switching of active experiential patterns, state identity resolver 830 enables recognition and retrieval of historical state configurations, multi-holonomy coordinator 840 orchestrates scenarios where multiple experiential contexts simultaneously influence reasoning, ranking and weighting manager 850 implements adaptive learning of experiential preferences, counterfactual evaluator 860 enables "what if" reasoning through experiential context switching, and conflict resolver 870 maintains coherence when experiential patterns prove incompatible. Together, these components transform the abstract concept of holonomy-based experiential memory into practical mechanisms that enable the PCM to reason based not just on what situations are encountered but on how they have been historically approached, what strategies have succeeded or failed, and what experiential wisdom has accumulated through extended cognitive activity. This architecture enables cognitive behavior that is simultaneously grounded in accumulated experience and flexibly adaptive to novel situations through counterfactual evaluation and experiential context switching.

Description of Method Aspects

FIG. 9 is a flow diagram illustrating an exemplary method for operating a holonomy-based persistent cognitive machine with two-component state representation. In a first step 900, an input is received from a user through an interface and encoded into a location within a dynamic latent manifold characterized by geometric structure. The encoding process transforms external data from input space into points within a geometric cognitive space where semantic relationships are represented through distances, curvature, and topological structure. The encoding respects the manifold's metric properties to ensure that new inputs are embedded in ways that preserve semantic continuity and enable meaningful traversal to related concepts. The resulting location represents the semantic content of the input within the structured representational space.

In a step 910, a bounded set of holonomy descriptors associated with the manifold location is retrieved, where each holonomy descriptor encodes accumulated effects of prior traversal through distinct experiential histories. The retrieval identifies the collection of experiential contexts that have been associated with the semantic location through past cognitive activity. Each descriptor in the bounded set represents a distinct equivalence class of prior experiences that converged at this location, encoding path-dependent effects without storing complete trajectory histories. The bounded nature of the collection ensures scalability by maintaining a limited number of experiential contexts-typically between three and ten descriptors—while preserving cognitively relevant distinctions.

In a step 920, a cognitive state is composed as a two-component structure comprising the manifold location and an active subset of the retrieved holonomy descriptors. The composition creates a complete state representation that includes both where processing is occurring in semantic space and what experiential context is influencing interpretation and reasoning. Selection of the active subset considers factors including contextual alignment between the input characteristics and experiential patterns, historical success rates for different holonomies in similar situations, and compatibility with current objectives. The two-component structure enables the representation of multiple distinct cognitive states at identical semantic locations, differentiated by their experiential contexts.

In a step 930, holonomy-sensitive traversal is performed through the latent manifold by computing trajectories that depend jointly on geometric proximity and accumulated path-dependent constraints encoded in the active holonomy descriptors. Trajectory computation balances multiple factors including semantic distance that penalizes rapid changes in representational position, geometric features such as curvature that create compression pressure in semantically dense regions, goal attraction that provides directional guidance toward relevant areas, and holonomic constraints that modify traversal preferences based on experiential context. The same geometric path may be preferred under one experiential context while being suppressed under another, enabling experience-dependent reasoning strategies at fixed semantic configurations. Traversal proceeds along paths that minimize combined cognitive cost incorporating both geometric and experiential factors.

In a step 940, holonomy generators are generated during traversal in response to prediction errors, constraint encounters, or stabilization events, where each generator represents a local deformation of transport behavior. The generation process monitors for significant events including cases where anticipated semantic content differs from encountered content, situations where boundaries or constraints prevent intended traversal, and circumstances where paths converge or reach equilibrium. When such events occur, local generators are constructed that encode the transport deformation induced by the event-how the experience of traversing that path segment differs from baseline expectations. Generator strength is calibrated based on event magnitude, with more significant deviations producing stronger generators. These generators capture experiential effects in compressed form without requiring storage of complete path details.

In a step 950, the holonomy descriptors at the terminal manifold location are updated by composing newly generated holonomy generators with existing descriptors according to path order. The update process combines generators created during traversal through ordered composition that respects the non-commutative nature of experiential accumulation-encountering events in different sequences produces different experiential outcomes. Multiple generators along the traversed path are progressively composed to form a consolidated descriptor representing the accumulated transport deformation for the complete trajectory. This consolidated descriptor is then evaluated for potential integration into the bounded holonomy set at the terminal location. If the experiential pattern is novel and capacity permits, the descriptor is added to the set. If the set is at capacity, equivalence relationships with existing descriptors are assessed to determine whether merging, replacement, or rejection is appropriate.

In a step 960, the holonomy-augmented cognitive state is transformed back into interpretable outputs through a decoder while preserving the updated holonomy descriptors for future interactions. The transformation converts geometric and experiential representations into observable formats including natural language responses, structured data, or executable actions. The decoding process considers both the final semantic position reached and the experiential context that guided the reasoning, enabling outputs that reflect not just conclusions but also the approach taken. Information about the updated holonomy descriptors is maintained separately from the generated output to ensure that experiential modifications accumulated during processing persist for future reasoning episodes. This preservation enables learning where repeated patterns strengthen experiential memory while novel patterns extend the range of available experiential contexts.

In a step 970, the updated cognitive state is stored comprising the new manifold location and modified holonomy set, enabling future distinction of this state from prior visits to the same location that arrived through different experiential paths. Storage captures both semantic content represented by the manifold position and experiential context represented by the holonomy collection, preserving the complete state configuration for subsequent retrieval. The storage implements mechanisms to maintain associations between locations and their bounded holonomy sets, ensuring that when the same semantic region is visited in the future, all accumulated experiential contexts remain available for activation. This persistent storage of two-component states enables the cognitive architecture to remember not just what concepts exist and where they are located, but also how they have been approached historically, what strategies succeeded or failed, and what experiential wisdom has accumulated through extended operation.

FIG. 10 is a flow diagram illustrating an exemplary method for managing holonomy lifecycle including generation, consolidation, pruning, and irreversible export. In a first step 1000, traversal events are monitored to detect holonomy generation triggers including prediction errors, constraint violations, or boundary encounters. The monitoring process continuously observes cognitive activity as processing flows through the representational manifold, analyzing events for characteristics that indicate significant experiential effects requiring capture. Prediction errors are detected when anticipated semantic content differs substantially from what is actually encountered, indicating that prior expectations require adjustment. Constraint violations are identified when attempted traversal reaches boundaries or barriers that prevent intended movement through the representational space. Boundary encounters occur when processing transitions between distinct semantic regions with discontinuous properties. The detection process employs threshold criteria to distinguish minor perturbations that can be absorbed through normal processing from significant events that warrant holonomy generation. Events exceeding these thresholds trigger the creation of experiential memory structures that will influence future processing.

In a step 1010, transient holonomy descriptors encoding local transport deformation are generated in response to detected triggering events. Generation constructs compact representations that capture how the experience of traversing the associated path segment differs from baseline expectations, without storing complete trajectory details. Each transient descriptor encodes the nature of the triggering event, the local context where it occurred, and the magnitude of the deviation from expected behavior. The descriptors are marked as transient to indicate their provisional status-they influence immediate processing but are not yet committed to long-term memory. Descriptor strength is calibrated based on event severity, with more significant deviations producing stronger descriptors that have greater influence on subsequent processing. Multiple transient descriptors may be generated during a single reasoning episode as processing encounters various events requiring experiential capture.

In a step 1020, reinforced transient holonomies are consolidated into persistent descriptors by merging generators and promoting into bounded sets at manifold locations. Consolidation is triggered when transient descriptors demonstrate consistent reinforcement through repeated activation, improved prediction accuracy, successful outcome achievement, or persistent relevance across multiple processing episodes. The consolidation process merges multiple related transient descriptors that encode similar experiential patterns, combining their effects into unified representations that capture the essential experiential signature while discarding redundant detail. Consolidated descriptors are promoted from transient status into the bounded collections maintained at their associated manifold locations, making them available for long-term retrieval and activation. This promotion implements a form of experiential learning where patterns that prove consistently valuable graduate from provisional to persistent memory, while patterns that fail to demonstrate utility remain transient and eventually fade.

In a step 1030, temporal decay is applied to inactive holonomies and descriptors below relevance thresholds are pruned to maintain bounded capacity. The decay process implements natural forgetting where holonomy descriptors that remain unused over extended periods experience progressive reduction in their influence strength and activation likelihood. Decay rates may be modulated based on descriptor characteristics-foundational experiential patterns may decay more slowly than situational responses, and descriptors associated with rare but important contexts may receive decay protection. As decay progresses, descriptors that fall below relevance thresholds become candidates for pruning. Pruning operations remove low-value descriptors from bounded collections to maintain capacity constraints, typically keeping between three and ten descriptors per location. Pruning decisions consider multiple factors including activation frequency, contribution to successful outcomes, uniqueness of behavioral effects, and structural importance in connecting experiential patterns. The pruning process preserves the most cognitively valuable experiential contexts while eliminating obsolete or redundant patterns.

In a step 1040, holonomies with unresolvable mismatch are identified and irreversibly exported to residual constraint sectors. Identification detects descriptors that exhibit persistent incompatibility with evolved representational structure, consistently produce negative outcomes, or create unresolvable conflicts with other experiential patterns. These problematic descriptors are candidates for export rather than simple pruning when their effects should persist as constraints even after explicit representation is removed. Export involves analyzing the descriptor to extract its essential constraint structure-what paths or transitions it prevents, what regions it discourages, and what behavioral patterns it reinforces or suppresses. The extracted constraints are then encoded into residual structures that modify traversal admissibility without requiring explicit holonomy representation. Export is irreversible-once descriptors are exported and their constraint effects absorbed into structural properties, the specific experiential histories that generated those constraints cannot be recovered. This irreversibility implements committed learning where repeated negative outcomes create permanent modifications that guide future processing.

In a step 1050, manifold admissibility is updated based on exported residuals while discarding explicit holonomy representations. The update process modifies the geometric properties and traversal rules of the representational manifold to reflect the constraints extracted from exported descriptors. These modifications may include increased traversal costs in regions associated with negative holonomies, altered distance metrics that make problematic paths appear longer or less attractive, adjusted connectivity that restricts which transitions between regions are permitted, and enhanced boundaries that reinforce learned constraints. The modifications are implemented as structural properties of the manifold itself rather than as separate constraint representations, enabling the effects of accumulated negative experience to persist in compressed form. After constraint effects are successfully encoded in structural properties, the explicit holonomy descriptors are discarded, freeing representational capacity while ensuring that learned lessons continue to shape future behavior. The result is a representational manifold that has been shaped by experience, encoding wisdom about which paths work and which should be avoided directly in its geometric and topological structure.

FIG. 11 is a flow diagram illustrating an exemplary method for performing counterfactual reasoning by activating alternative holonomy descriptors at a fixed manifold location. In a first step 1100, a query is received requiring counterfactual evaluation at a current cognitive state with multiple holonomy descriptors. The query may be explicit, such as a user request to evaluate alternative approaches to a problem, or implicit, arising from internal assessment of strategic options during reasoning. The query identifies a need to explore how different experiential contexts would shape processing from the current position, effectively asking "what would happen if we approached this situation differently?" The current cognitive state includes both a semantic position in the representational manifold and a collection of available experiential contexts that have been historically associated with that position. The presence of multiple descriptors indicates that the same semantic location has been reached through different experiential paths in the past, creating an opportunity for counterfactual comparison.

In a step 1110, the bounded holonomy set at the current manifold location is retrieved, representing distinct experiential histories. The retrieval accesses the collection of descriptors that encode different ways this semantic position has been historically approached or interpreted. Each descriptor in the set represents an equivalence class of prior experiences that converged at this location, capturing accumulated path-dependent effects without storing complete trajectory details. The bounded set typically contains between three and ten descriptors, each encoding a distinct experiential pattern such as cautious approaches based on prior constraint encounters, exploratory approaches based on successful innovation, or efficiency-focused approaches based on optimized paths. The diversity of descriptors in the set reflects the richness of experiential context available for the current semantic location.

In a step 1120, a first holonomy descriptor is activated and trajectory and predicted outcome are computed under its constraints. Activation makes the experiential context encoded in the first descriptor active, causing it to influence trajectory computation and outcome prediction. The computation determines what path would be followed and what results would be expected if reasoning proceeded under this particular experiential context. Trajectory calculation accounts for how the activated descriptor modifies traversal preferences, alters sensitivity to geometric features, and adjusts responses to constraints or opportunities. Predicted outcomes include anticipated final positions in the representational space, expected achievement of objectives, estimated costs or effort required, and predicted stability or success likelihood. The computation leverages the transport deformation encoded in the descriptor to generate genuinely experience-dependent predictions rather than merely geometric projections.

In a step 1130, the first holonomy is deactivated and a second holonomy descriptor is activated at the same manifold location. The deactivation removes the influence of the first experiential context, returning to a neutral state where no particular experiential pattern is shaping processing. The second descriptor is then activated, switching the experiential context while holding the semantic position fixed. This switch enables comparison of how different experiential interpretations would guide reasoning from an identical starting configuration. The ability to switch experiential contexts at fixed semantic positions distinguishes holonomy-augmented processing from traditional location-only representations where revisiting a position necessarily yields identical behavior.

In a step 1140, a second trajectory and outcome are computed under the second holonomy's constraints from the identical starting position. The computation proceeds analogously to step 1120, but under the influence of the different experiential context encoded in the second descriptor. The resulting trajectory may differ substantially from the first trajectory despite the identical starting position, reflecting how experiential context shapes reasoning strategies. The predicted outcome similarly reflects the characteristics of the second experiential pattern—for example, a cautious descriptor might yield trajectories that avoid high-risk regions and predict more conservative outcomes, while an exploratory descriptor might yield trajectories through uncertain regions and predict more variable but potentially higher-value outcomes. The comparison between first and second trajectories reveals how experiential context influences behavior independently of semantic content.

In a step 1150, predicted outcomes are compared across activated holonomies to evaluate counterfactual scenarios. The comparison analyzes differences in predicted trajectories, final positions, goal achievement likelihood, resource consumption, risk profiles, and other relevant outcome dimensions. The evaluation assesses which experiential contexts appear most promising for current circumstances based on the predicted results. Comparison may reveal that certain descriptors consistently predict better outcomes, suggesting appropriate experiential contexts for the situation. Alternatively, comparison may reveal trade-offs where different descriptors optimize for different objectives, requiring strategic choice about which experiential approach to pursue. The counterfactual evaluation enables informed decision-making about experiential strategy without requiring actual execution and observation of all alternatives.

In a step 1160, holonomy rankings are updated or equivalents are merged based on comparison results, and a response is generated. The update process adjusts preferences among experiential contexts based on counterfactual insights, increasing activation weights for descriptors that predicted favorable outcomes and decreasing weights for descriptors that predicted poor results. This implements learning from mental simulation where experiential preferences adapt based on hypothetical rather than actual outcomes. When comparison reveals that multiple descriptors predict essentially equivalent outcomes, equivalence-based merging may be triggered to consolidate redundant experiential patterns and reduce representational complexity. The response generation synthesizes the counterfactual analysis into actionable recommendations, explanations of trade-offs, or selections of preferred experiential contexts. In some embodiments, the response includes narrative explanations describing how different experiential approaches would shape reasoning differently, enabling transparent decision-making about strategic choices in ambiguous situations.

FIG. 12 is a flow diagram illustrating an exemplary method for preserving semantic memory as deformation of path space through holonomy without storing explicit trajectories. In a first step 1200, a trajectory is traversed through a cognitive manifold encountering constraints that induce transport deformation. The traversal represents a reasoning episode or inference process that moves through semantic space from an initial position to a terminal position, encountering various structures along the way. During traversal, the path encounters constraints including boundaries between semantic regions, regions of high compression where many concepts have been densely organized, barriers preventing certain transitions, and interfaces between distinct knowledge domains. Each encounter with such constraints creates local transport deformation, a deviation between what would be expected from purely geometric considerations and what is actually experienced during traversal. These deformations accumulate along the path, creating an overall transport effect that characterizes the trajectory's experiential signature.

In a step 1210, the homotopy class of the trajectory is identified by analyzing structural constraints and topological features encountered. The identification process examines which fundamental structures the trajectory engaged during its path through the manifold, including which boundaries were crossed, which topological features such as holes or handles were traversed, which constraint regions were passed through or avoided, and which connections between domains were utilized. Trajectories belong to the same homotopy class if one can be continuously deformed into the other without crossing inadmissible regions or fundamentally changing which structures are engaged. The homotopy class captures the essential topological and structural characteristics of the trajectory independent of specific details like exact positions or minor variations in path shape. This classification enables recognition that different specific trajectories may represent equivalent experiential patterns if they engage the same fundamental structures.

In a step 1220, a determination is made whether the trajectory's homotopy class matches an existing holonomy descriptor at the terminal location. The determination compares the identified class against descriptors in the bounded collection maintained at the location where the trajectory terminates. Matching assesses whether any existing descriptor encodes transport deformation corresponding to the same homotopy class, indicating that previous trajectories of this structural type have reached this location before. The comparison examines behavioral equivalence, whether existing descriptors produce similar transport effects to what would be generated by the current trajectory, rather than requiring exact identity. A match indicates that the experiential pattern represented by the current trajectory has been previously encountered and is already represented in memory.

In a step 1230, if a match exists, the matching descriptor is reinforced and stabilized by increasing weight and activation likelihood. Reinforcement acknowledges that the experiential pattern has recurred, strengthening confidence in its relevance and increasing its influence on future processing. Weight increases make the descriptor more likely to be activated when similar contexts arise, creating a form of frequency-based learning where commonly encountered experiential patterns become dominant. Stabilization may also involve reducing decay rates for the descriptor, protecting it from pruning, or promoting it in ranking hierarchies. The reinforcement implements learning through repetition without requiring storage of each instance, the holonomy descriptor serves as a compressed summary of all trajectories in its homotopy class, and reinforcement updates this summary based on new evidence of the pattern's occurrence.

In a step 1240, if no match exists and capacity is available, a new holonomy descriptor is generated for the distinct experiential class. Generation creates a descriptor encoding the transport deformation associated with the trajectory's homotopy class, capturing the essential experiential effect without storing the specific path details. The new descriptor is added to the bounded collection at the terminal location, expanding the diversity of experiential contexts available at that semantic position. Generation indicates that a genuinely novel experiential pattern has been encountered-one that cannot be adequately represented by existing descriptors. The availability of capacity ensures that representational resources exist for preserving the new pattern. The resulting descriptor enables future recognition of the experiential class, allowing subsequent trajectories in the same homotopy class to be recognized as familiar rather than novel.

In a step 1250, if capacity is reached, the least relevant holonomies are merged or the lowest-weighted descriptor is pruned. The capacity constraint ensures scalability by maintaining bounded collections typically containing three to ten descriptors per location. When a new descriptor must be added but capacity is exhausted, space is created through consolidation or removal. Merging combines descriptors that have been identified as producing similar behavioral effects, consolidating what are essentially redundant representations of closely related experiential patterns. Pruning removes the descriptor with lowest activation weight, least frequent usage, or minimal contribution to successful outcomes, eliminating experiential memory that has proven least valuable. The selection process balances preserving experiential diversity against eliminating patterns that provide insufficient additional value. Following merging or pruning, the new descriptor for the current trajectory's experiential class can be inserted into the collection.

In a step 1260, trajectory admissibility constraints are updated based on accumulated holonomic effects. The update process modifies which paths through the manifold are considered viable or preferable based on experiential evidence accumulated in holonomy descriptors. Paths that consistently produce favorable outcomes according to their holonomy classes may become preferred routes with reduced traversal costs. Paths that consistently lead to constraint violations, destabilization, or failures may become penalized or restricted based on negative holonomic effects. The constraint updates implement learning about which paths work and which should be avoided, shaping future traversal behavior based on accumulated experience. These updates may manifest as modifications to geometric properties, adjustments to cost functions, or changes in feasibility assessments that guide path planning and navigation through semantic space.

In a step 1270, explicit trajectory information is discarded while retaining holonomy class and transport deformation. The discard operation implements compression of experiential memory by eliminating detailed path specifications while preserving the behaviorally relevant effects. The specific sequence of positions visited, exact timing of traversal, and detailed local variations are removed from storage, dramatically reducing memory requirements. What remains is the holonomy class membership indicating which structural category the trajectory belonged to, and the transport deformation encoding how the trajectory affected internal processing state. This compressed representation enables generalization where future trajectories in the same homotopy class are recognized as belonging to familiar experiential patterns without requiring matching against stored trajectory libraries. The compression achieves scalable memory by preserving lessons learned from experience, what approaches work, what constraints exist, what patterns succeed, without maintaining exhaustive records of every reasoning episode, enabling long-term accumulation of experiential wisdom under finite capacity constraints.

Hardware Architecture

Figure 13:
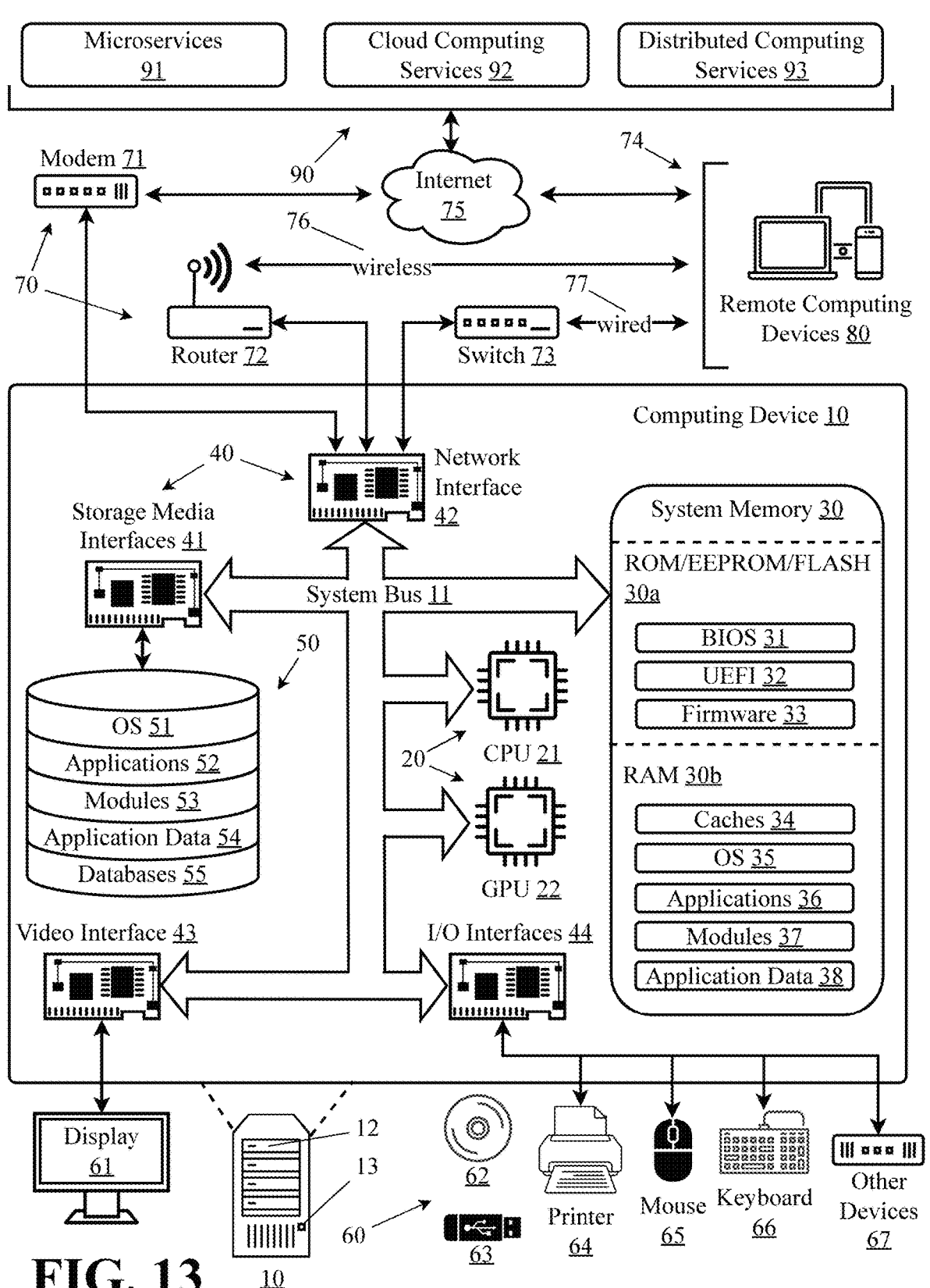
FIG. 13 illustrates an exemplary computing environment on which an embodiment described herein may be implemented.

FIG. 13 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 13 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions based on technologies like complex instruction set computer (CISC) or reduced instruction set computer (RISC). Further, computing device 10 may comprise one or more specialized processors such as a graphics processing unit (GPU) 22 configured to accelerate processing of computer graphics and images via a large array of specialized processing cores arranged in parallel. Further computing device 10 may be comprised of one or more specialized processes such as Intelligent Processing Units, field-programmable gate arrays or application-specific integrated circuits for specific tasks or types of tasks. The term processor may further include: neural processing units (NPUs) or neural computing units optimized for machine learning and artificial intelligence workloads using specialized architectures and data paths; tensor processing units (TPUs) designed to efficiently perform matrix multiplication and convolution operations used heavily in neural networks and deep learning applications; application-specific integrated circuits (ASICs) implementing custom logic for domain-specific tasks; application-specific instruction set processors (ASIPs) with instruction sets tailored for particular applications; field-programmable gate arrays (FPGAs) providing reconfigurable logic fabric that can be customized for specific processing tasks; processors operating on emerging computing paradigms such as quantum computing, optical computing, mechanical computing (e.g., using nanotechnology entities to transfer data), and so forth. Depending on configuration, computing device 10 may comprise one or more of any of the above types of processors in order to efficiently handle a variety of general purpose and specialized computing tasks. The specific processor configuration may be selected based on performance, power, cost, or other design constraints relevant to the intended application of computing device 10.

System memory 30 is processor-accessible data storage in the form of volatile and/or nonvolatile memory. System memory 30 may be either or both of two types: non-volatile memory and volatile memory. Non-volatile memory 30a is not erased when power to the memory is removed, and includes memory types such as read only memory (ROM), electronically-erasable programmable memory (EEPROM), and rewritable solid state memory (commonly known as "flash memory"). Non-volatile memory 30a is typically used for long-term storage of a basic input/output system (BIOS) 31, containing the basic instructions, typically loaded during computer startup, for transfer of information between components within computing device, or a unified extensible firmware interface (UEFI) 32, which is a modern replacement for BIOS that supports larger hard drives, faster boot times, more security features, and provides native support for graphics and mouse cursors. Non-volatile memory 30a may also be used to store firmware 33 comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30b is erased when power to the memory is removed and is typically used for short-term storage of data for processing. Volatile memory 30b includes memory types such as random-access memory (RAM), and is normally the primary operating memory into which the operating system 35, applications 36, program modules 37, and application data 38 are loaded for execution by processors 20. Volatile memory 30b is generally faster than non-volatile memory 30a due to its electrical characteristics and is directly accessible to processors 20 for processing of instructions and data storage and retrieval. Volatile memory 30b may comprise one or more smaller cache memories 34 which operate at a higher clock speed and are typically placed on the same IC as the processors to improve performance.

There are several types of computer memory, each with its own characteristics and use cases. System memory 30 may be configured in one or more of the several types described herein, including high bandwidth memory (HBM) and advanced packaging technologies like chip-on-wafer-on-substrate (CoWoS). Static random access memory (SRAM) provides fast, low-latency memory used for cache memory in processors, but is more expensive and consumes more power compared to dynamic random access memory (DRAM). SRAM retains data as long as power is supplied. DRAM is the main memory in most computer systems and is slower than SRAM but cheaper and more dense. DRAM requires periodic refresh to retain data. NAND flash is a type of non-volatile memory used for storage in solid state drives (SSDs) and mobile devices and provides high density and lower cost per bit compared to DRAM with the trade-off of slower write speeds and limited write endurance. HBM is an emerging memory technology that provides high bandwidth and low power consumption which stacks multiple DRAM dies vertically, connected by through-silicon vias (TSVs). HBM offers much higher bandwidth (up to 1 TB/s) compared to traditional DRAM and may be used in high-performance graphics cards, AI accelerators, and edge computing devices. Advanced packaging and CoWoS are technologies that enable the integration of multiple chips or dies into a single package. CoWoS is a 2.5D packaging technology that interconnects multiple dies side-by-side on a silicon interposer and allows for higher bandwidth, lower latency, and reduced power consumption compared to traditional PCB-based packaging. This technology enables the integration of heterogeneous dies (e.g., CPU, GPU, HBM) in a single package and may be used in high-performance computing, AI accelerators, and edge computing devices.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. In some high-performance computing systems, multiple GPUs may be connected using NVLink bridges, which provide high-bandwidth, low-latency interconnects between GPUs. NVLink bridges enable faster data transfer between GPUs, allowing for more efficient parallel processing and improved performance in applications such as machine learning, scientific simulations, and graphics rendering. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44. Network interface 42 may support various communication standards and protocols, such as Ethernet and Small Form-Factor Pluggable (SFP). Ethernet is a widely used wired networking technology that enables local area network (LAN) communication. Ethernet interfaces typically use RJ45 connectors and support data rates ranging from 10 Mbps to 100 Gbps, with common speeds being 100 Mbps, 1 Gbps, 10 Gbps, 25 Gbps, 40 Gbps, and 100 Gbps. Ethernet is known for its reliability, low latency, and cost-effectiveness, making it a popular choice for home, office, and data center networks. SFP is a compact, hot-pluggable transceiver used for both telecommunication and data communications applications. SFP interfaces provide a modular and flexible solution for connecting network devices, such as switches and routers, to fiber optic or copper networking cables. SFP transceivers support various data rates, ranging from 100 Mbps to 100 Gbps, and can be easily replaced or upgraded without the need to replace the entire network interface card. This modularity allows for network scalability and adaptability to different network requirements and fiber types, such as single-mode or multi-mode fiber.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may be implemented using various technologies, including hard disk drives (HDDs) and solid-state drives (SSDs). HDDs use spinning magnetic platters and read/write heads to store and retrieve data, while SSDs use NAND flash memory. SSDs offer faster read/write speeds, lower latency, and better durability due to the lack of moving parts, while HDDs typically provide higher storage capacities and lower cost per gigabyte. NAND flash memory comes in different types, such as Single-Level Cell (SLC), Multi-Level Cell (MLC), Triple-Level Cell (TLC), and Quad-Level Cell (QLC), each with trade-offs between performance, endurance, and cost. Storage devices connect to the computing device 10 through various interfaces, such as SATA, NVMe, and PCIe. SATA is the traditional interface for HDDs and SATA SSDs, while NVMe (Non-Volatile Memory Express) is a newer, high-performance protocol designed for SSDs connected via PCIe. PCIe SSDs offer the highest performance due to the direct connection to the PCIe bus, bypassing the limitations of the SATA interface. Other storage form factors include M.2 SSDs, which are compact storage devices that connect directly to the motherboard using the M.2 slot, supporting both SATA and NVMe interfaces. Additionally, technologies like Intel Optane memory combine 3D XPoint technology with NAND flash to provide high-performance storage and caching solutions. Non-volatile data storage devices 50 may be non-removable from computing device 10, as in the case of internal hard drives, removable from computing device 10, as in the case of external USB hard drives, or a combination thereof. However, computing devices will typically comprise one or more internal, non-removable hard drives using either magnetic disc or solid-state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, object oriented databases, NoSQL databases, vector databases, knowledge graph databases, key-value databases, document oriented data stores, and graph databases.

Applications (also known as computer software or software applications) are sets of programming instructions designed to perform specific tasks or provide specific functionality on a computer or other computing devices. Applications are typically written in high-level programming languages such as C, C++, Scala, Erlang, GoLang, Java, Scala, Rust, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems facilitated by specifications such as containerd.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network or optical transmitters (e.g., lasers). Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers or networking functions may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices or intermediate networking equipment (e.g., for deep packet inspection).

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90. Also, certain processing subtasks may be sent to a microservice 91 for processing with the result being transmitted to computing device 10 for incorporation into a larger processing task. Infrastructure as Code (IaaC) tools like Terraform can be used to manage and provision computing resources across multiple cloud providers or hyperscalers. This allows for workload balancing based on factors such as cost, performance, and availability. For example, Terraform can be used to automatically provision and scale resources on AWS spot instances during periods of high demand, such as for surge rendering tasks, to take advantage of lower costs while maintaining the required performance levels. In the context of rendering, tools like Blender can be used for object rendering of specific elements, such as a car, bike, or house. These elements can be approximated and roughed in using techniques like bounding box approximation or low-poly modeling to reduce the computational resources required for initial rendering passes. The rendered elements can then be integrated into the larger scene or environment as needed, with the option to replace the approximated elements with higher-fidelity models as the rendering process progresses.

In an implementation, the disclosed systems and methods may utilize, at least in part, containerization techniques to execute one or more processes and/or steps disclosed herein. Containerization is a lightweight and efficient virtualization technique that allows you to package and run applications and their dependencies in isolated environments called containers. One of the most popular containerization platforms is containerd, which is widely used in software development and deployment. Containerization, particularly with open-source technologies like containerd and container orchestration systems like Kubernetes, is a common approach for deploying and managing applications. Containers are created from images, which are lightweight, standalone, and executable packages that include application code, libraries, dependencies, and runtime. Images are often built from a containerfile or similar, which contains instructions for assembling the image. Containerfiles are configuration files that specify how to build a container image. Systems like Kubernetes natively support containerd as a container runtime. They include commands for installing dependencies, copying files, setting environment variables, and defining runtime configurations. Container images can be stored in repositories, which can be public or private. Organizations often set up private registries for security and version control using tools such as Harbor, JFrog Artifactory and Bintray, GitLab Container Registry, or other container registries. Containers can communicate with each other and the external world through networking. Containerd provides a default network namespace, but can be used with custom network plugins. Containers within the same network can communicate using container names or IP addresses.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, mainframe computers, network nodes, virtual reality or augmented reality devices and wearables, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are serverless logic apps, microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP, protobuffers, gRPC or message queues such as Kafka. Microservices 91 can be combined to perform more complex or distributed processing tasks. In an embodiment, Kubernetes clusters with containerized resources are used for operational packaging of system.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over public or private networks or the Internet on a subscription or alternative licensing basis, or consumption or ad-hoc marketplace basis, or combination thereof.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power or support for highly dynamic compute, transport or storage resource variance or uncertainty over time requiring scaling up and down of constituent system resources. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, NVLink or other GPU-to-GPU high bandwidth communications links and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. A computer system comprising a hardware memory, wherein the computer system is configured to execute software instructions stored on nontransitory machine-readable storage media that:

maintain a latent manifold as a geometric substrate for cognitive operations, wherein the latent manifold evolves through use;

encode inputs into geometric structures within the latent manifold, wherein semantic relationships are represented through geometric properties including distance and curvature;

maintain bounded sets of holonomy descriptors at manifold locations, wherein each holonomy descriptor encodes accumulated path-dependent effects of prior traversal through distinct experiential histories without storing complete trajectories;

compose cognitive states as two-component structures comprising a manifold location and one or more active holonomy descriptors from the bounded set at that location, wherein multiple distinct cognitive states coexist at identical manifold locations differentiated by experiential context;

compute paths through the latent manifold for cognitive processing based on the composed cognitive states, wherein the paths are influenced jointly by geometric structure of the manifold and the active holonomy descriptors that modify traversal preferences based on accumulated experience;

generate holonomy generators during traversal in response to prediction errors, constraint encounters, or stabilization events, wherein each holonomy generator encodes local transport deformation;

update the holonomy descriptors at terminal locations by composing newly generated holonomy generators with existing holonomy descriptors according to path order, wherein repeated experiential patterns undergo consolidation into persistent holonomy descriptors;

apply temporal decay to inactive holonomy descriptors and prune holonomy descriptors below relevance thresholds to maintain bounded capacity of the sets;

irreversibly export holonomy descriptors exhibiting unresolvable mismatch to residual constraint sectors, wherein exported constraints modify manifold traversal admissibility without explicit holonomy representation;

store persistent representations as geometric regions within the latent manifold paired with associated holonomy descriptor sets, wherein frequently accessed representations develop characteristic geometric properties and experiential contexts that facilitate future access;

modify the geometric structure of the latent manifold based on cognitive operations, wherein successful reasoning patterns create persistent modifications to both manifold geometry and holonomy structures; and generate outputs by traversing the latent manifold under holonomy-sensitive dynamics and decoding geometric and experiential information into user-interpretable responses.

2. The computer system of claim 1, wherein composing cognitive states as two-component structures further comprises selecting the one or more active holonomy descriptors based on contextual alignment between input characteristics and experiential patterns encoded in the holonomy descriptors, historical success rates for different holonomy descriptors in similar manifold regions, and compatibility with current objectives.

3. The computer system of claim 1, wherein generating holonomy generators during traversal further comprises calibrating strength of each holonomy generator based on magnitude of the triggering event, wherein prediction errors exceeding larger thresholds produce stronger holonomy generators that have greater influence on subsequent traversal than holonomy generators produced from smaller prediction errors.

4. The computer system of claim 1, wherein updating the holonomy descriptors at terminal locations further comprises evaluating whether accumulated transport deformation from the newly generated holonomy generators represents a distinct experiential class compared to existing holonomy descriptors at the terminal location based on homotopy class analysis of topological features encountered during traversal.

5. The computer system of claim 1, wherein applying temporal decay to inactive holonomy descriptors further comprises modulating decay rates based on holonomy descriptor characteristics, wherein holonomy descriptors encoding foundational experiential patterns decay more slowly than holonomy descriptors encoding situational responses, and holonomy descriptors associated with rare but important contexts receive decay protection.

6. The computer system of claim 1, wherein irreversibly exporting holonomy descriptors further comprises modifying compression pressure fields or metric tensor values in regions associated with the exported holonomy descriptors to encode learned constraints as geometric properties of the manifold, wherein regions associated with negative holonomies receive increased traversal costs.

7. The computer system of claim 1, wherein the bounded sets of holonomy descriptors contain between three and ten holonomy descriptors per location, and wherein pruning holonomy descriptors below relevance thresholds further comprises merging holonomy descriptors producing equivalent behavioral effects when capacity limits are reached, or pruning lowest-weighted holonomy descriptors based on activation frequency, contribution to successful outcomes, and uniqueness of behavioral effects.

8. A method for persistent cognitive computation through geometric representation augmented with holonomy-based experiential memory in a dynamic latent manifold, comprising the steps of:

maintaining a latent manifold as a geometric substrate for cognitive operations, wherein the latent manifold evolves through use;

encoding inputs into geometric structures within the latent manifold, wherein semantic relationships are represented through geometric properties including distance and curvature;

maintaining bounded sets of holonomy descriptors at manifold locations, wherein each holonomy descriptor encodes accumulated path-dependent effects of prior traversal through distinct experiential histories without storing complete trajectories;

composing cognitive states as two-component structures comprising a manifold location and one or more active holonomy descriptors from the bounded set at that location, wherein multiple distinct cognitive states coexist at identical manifold locations differentiated by experiential context;

computing paths through the latent manifold for cognitive processing based on the composed cognitive states, wherein the paths are influenced jointly by geometric structure of the manifold and the active holonomy descriptors that modify traversal preferences based on accumulated experience;

generating holonomy generators during traversal in response to prediction errors, constraint encounters, or stabilization events, wherein each holonomy generator encodes local transport deformation;

updating the holonomy descriptors at terminal locations by composing newly generated holonomy generators with existing holonomy descriptors according to path order, wherein repeated experiential patterns undergo consolidation into persistent holonomy descriptors;

applying temporal decay to inactive holonomy descriptors and prune holonomy descriptors below relevance thresholds to maintain bounded capacity of the sets;

irreversibly exporting holonomy descriptors exhibiting unresolvable mismatch to residual constraint sectors, wherein exported constraints modify manifold traversal admissibility without explicit holonomy representation;

storing persistent representations as geometric regions within the latent manifold paired with associated holonomy descriptor sets, wherein frequently accessed representations develop characteristic geometric properties and experiential contexts that facilitate future access;

modifying the geometric structure of the latent manifold based on cognitive operations, wherein successful reasoning patterns create persistent modifications to both manifold geometry and holonomy structures; and generating outputs by traversing the latent manifold under holonomy-sensitive dynamics and decoding geometric and experiential information into user-interpretable responses.

9. The method of claim 8, wherein composing cognitive states as two-component structures further comprises selecting the one or more active holonomy descriptors based on contextual alignment between input characteristics and experiential patterns encoded in the holonomy descriptors, historical success rates for different holonomy descriptors in similar manifold regions, and compatibility with current objectives.

10. The method of claim 8, wherein generating holonomy generators during traversal further comprises calibrating strength of each holonomy generator based on magnitude of the triggering event, wherein prediction errors exceeding larger thresholds produce stronger holonomy generators that have greater influence on subsequent traversal than holonomy generators produced from smaller prediction errors.

11. The method of claim 8, wherein updating the holonomy descriptors at terminal locations further comprises evaluating whether accumulated transport deformation from the newly generated holonomy generators represents a distinct experiential class compared to existing holonomy descriptors at the terminal location based on homotopy class analysis of topological features encountered during traversal.

12. The method of claim 8, wherein applying temporal decay to inactive holonomy descriptors further comprises modulating decay rates based on holonomy descriptor characteristics, wherein holonomy descriptors encoding foundational experiential patterns decay more slowly than holonomy descriptors encoding situational responses, and holonomy descriptors associated with rare but important contexts receive decay protection.

13. The method of claim 8, wherein irreversibly exporting holonomy descriptors further comprises modifying compression pressure fields or metric tensor values in regions associated with the exported holonomy descriptors to encode learned constraints as geometric properties of the manifold, wherein regions associated with negative holonomies receive increased traversal costs.

14. The method of claim 8, wherein the bounded sets of holonomy descriptors contain between three and ten holonomy descriptors per location, and wherein pruning holonomy descriptors below relevance thresholds further comprises merging holonomy descriptors producing equivalent behavioral effects when capacity limits are reached, or pruning lowest-weighted holonomy descriptors based on activation frequency, contribution to successful outcomes, and uniqueness of behavioral effects.

\* \* \* \* \*